(12) United States Patent
Lohse et al.

(10) Patent No.: US 10,152,141 B1
(45) Date of Patent: Dec. 11, 2018

(54) CONTROLLER MOVEMENT TRACKING WITH LIGHT EMITTERS

(71) Applicant: Osterhout Group, Inc., San Francisco, CA (US)

(72) Inventors: Robert Michael Lohse, Palo Alto, CA (US); John D. Haddick, Corte Madera, CA (US)

(73) Assignee: Osterhout Group, Inc., San Francisco, CA (US)

( * ) Notice: Subject to any disclaimer, the term of this patent is extended or adjusted under 35 U.S.C. 154(b) by 0 days.

(21) Appl. No.: 15/680,917

(22) Filed: Aug. 18, 2017

(51) Int. Cl.
  *G06F 3/03* (2006.01)
  *G02B 27/01* (2006.01)
  *G06F 3/01* (2006.01)

(52) U.S. Cl.
  CPC ....... *G06F 3/0308* (2013.01); *G02B 27/0172* (2013.01); *G06F 3/014* (2013.01); *G06F 3/0325* (2013.01); *G02B 2027/014* (2013.01); *G02B 2027/0138* (2013.01); *G02B 2027/0178* (2013.01)

(58) Field of Classification Search
  CPC ...... G06F 3/0308; G06F 3/0325; G06F 3/011; G06F 3/014; G06F 2203/0331; G02B 2027/0187; G02B 2027/0138; G02B 2027/014; G02B 27/017; G02B 27/0172
  See application file for complete search history.

(56) References Cited

U.S. PATENT DOCUMENTS

| | | |
|---|---|---|
| D327,674 S | 7/1992 | Kuo |
| D352,930 S | 11/1994 | Tsuji |
| D375,748 S | 11/1996 | Hartman |
| D376,790 S | 12/1996 | Goulet et al. |
| 5,596,451 A | 1/1997 | Handschy et al. |
| 5,717,422 A | 2/1998 | Fergason et al. |
| D392,959 S | 3/1998 | Edwards |
| 5,767,841 A | 6/1998 | Hartman |
| 5,788,195 A | 8/1998 | Rice |

(Continued)

FOREIGN PATENT DOCUMENTS

| | | |
|---|---|---|
| EP | 368898 A1 | 5/1990 |
| EP | 777867 A1 | 6/1997 |
| WO | 2016/044035 | 3/2016 |

OTHER PUBLICATIONS

US 8,743,465, 06/2014, Totani et al. (withdrawn)

(Continued)

*Primary Examiner* — Priyank Shah

(74) *Attorney, Agent, or Firm* — GTC Law Group PC & Affiliates

(57) ABSTRACT

A head-worn computer includes a camera system positioned to capture a surrounding environment in front of a user, a processor that identifies a position of a plurality of light emitters mounted on a hand-held controller from images captured by the camera system and tracks the position of the plurality of light emitters as the hand-held controller moves in the surrounding environment and interprets the tracked position as positional changes of the hand-held controller. The processor uses the position of the plurality of light emitters as markers in three dimensional space, the markers used as an anchor for virtual content presented in a see-through display of the head-worn computer.

5 Claims, 58 Drawing Sheets

(56) References Cited

U.S. PATENT DOCUMENTS

| | | |
|---|---|---|
| 5,808,800 A | 9/1998 | Handschy et al. |
| D410,638 S | 6/1999 | Sheehan et al. |
| 6,297,749 B1 | 10/2001 | Smith et al. |
| D451,892 S | 12/2001 | Carrere |
| 6,369,952 B1 | 4/2002 | Rallison et al. |
| D460,071 S | 7/2002 | Sheehan et al. |
| 6,456,438 B1 | 9/2002 | Lee et al. |
| D470,144 S | 2/2003 | Li |
| 6,535,182 B2 | 3/2003 | Stanton |
| D473,871 S | 4/2003 | Santos |
| D478,052 S | 8/2003 | Thomas |
| 6,642,945 B1 | 11/2003 | Sharpe et al. |
| 6,717,075 B1 | 4/2004 | Stavely et al. |
| 6,771,294 B1 | 8/2004 | Pulli et al. |
| 6,847,336 B1 | 1/2005 | Lemelson et al. |
| 6,956,558 B1 | 10/2005 | Rosenberg et al. |
| D512,027 S | 11/2005 | Sarasjoki et al. |
| D513,233 S | 12/2005 | Stauffer |
| 6,987,787 B1 | 1/2006 | Mick |
| D514,525 S | 2/2006 | Stauffer |
| 7,088,234 B2 | 8/2006 | Naito et al. |
| D529,467 S | 10/2006 | Rose |
| D541,226 S | 4/2007 | Wakisaka et al. |
| 7,199,934 B2 | 4/2007 | Yamasaki |
| 7,206,134 B2 | 4/2007 | Weissman et al. |
| D559,793 S | 1/2008 | Fan |
| D571,816 S | 6/2008 | Corcoran et al. |
| 7,380,936 B2 | 6/2008 | Howell et al. |
| 7,401,918 B2 | 7/2008 | Howell et al. |
| 7,481,531 B2 | 1/2009 | Howell et al. |
| 7,500,747 B2 | 3/2009 | Howell et al. |
| 7,677,723 B2 | 3/2010 | Howell et al. |
| 7,771,046 B2 | 8/2010 | Howell et al. |
| 7,777,723 B2 | 8/2010 | Namiki et al. |
| 7,792,552 B2 | 9/2010 | Thomas et al. |
| 7,806,525 B2 | 10/2010 | Howell et al. |
| 7,830,370 B2 | 11/2010 | Yamazaki et al. |
| 7,855,743 B2 | 12/2010 | Sako et al. |
| D630,213 S | 1/2011 | Fidali et al. |
| D631,881 S | 2/2011 | Quinn et al. |
| D631,882 S | 2/2011 | Odgers |
| 8,223,024 B1 | 7/2012 | Petrou |
| 8,228,315 B1 | 7/2012 | Starner et al. |
| 8,337,013 B2 | 12/2012 | Howell et al. |
| D680,112 S | 4/2013 | Monahan |
| 8,430,507 B2 | 4/2013 | Howell et al. |
| 8,434,863 B2 | 5/2013 | Howell et al. |
| D689,862 S | 9/2013 | Liu |
| D690,684 S | 10/2013 | Lee et al. |
| 8,564,883 B2 | 10/2013 | Totani et al. |
| 8,570,273 B1 | 10/2013 | Smith |
| 8,576,491 B2 | 11/2013 | Takagi et al. |
| 8,587,869 B2 | 11/2013 | Totani et al. |
| D696,668 S | 12/2013 | Chen et al. |
| D697,914 S | 1/2014 | Bates et al. |
| 8,662,686 B2 | 3/2014 | Takagi et al. |
| 8,698,157 B2 | 4/2014 | Hanamura |
| 8,711,487 B2 | 4/2014 | Takeda et al. |
| 8,743,052 B1 | 6/2014 | Keller et al. |
| 8,752,963 B2 | 6/2014 | McCulloch et al. |
| 8,770,742 B2 | 7/2014 | Howell et al. |
| 8,787,006 B2 | 7/2014 | Golko et al. |
| 8,803,867 B2 | 8/2014 | Oikawa |
| 8,823,071 B2 | 9/2014 | Oyamada |
| 8,837,880 B2 | 9/2014 | Takeda et al. |
| D716,813 S | 11/2014 | Deng |
| D718,309 S | 11/2014 | Roberts et al. |
| 8,922,530 B2 | 12/2014 | Pance |
| 8,982,471 B1 | 3/2015 | Starner et al. |
| D728,573 S | 5/2015 | Deng |
| 9,024,842 B1 | 5/2015 | Prada Gomez et al. |
| 9,046,999 B1 | 6/2015 | King et al. |
| 9,063,563 B1 | 6/2015 | Gray et al. |
| 9,064,436 B1 | 6/2015 | Patel et al. |
| 9,122,054 B2 | 9/2015 | Osterhout et al. |
| 9,141,194 B1 | 9/2015 | Starner et al. |
| 9,158,116 B1 | 10/2015 | Osterhout et al. |
| D743,963 S | 11/2015 | Osterhout |
| 9,176,582 B1 | 11/2015 | Johnson et al. |
| 9,223,136 B1 | 12/2015 | Braun et al. |
| 9,229,233 B2 | 1/2016 | Osterhout et al. |
| 9,286,728 B2 | 3/2016 | Osterhout et al. |
| 9,292,082 B1 | 3/2016 | Patel et al. |
| D753,114 S | 4/2016 | Osterhout |
| 9,324,189 B2 | 4/2016 | Vaughn et al. |
| D756,363 S | 5/2016 | Mathis |
| 9,374,655 B1 | 6/2016 | Lee et al. |
| 9,400,390 B2 | 7/2016 | Osterhout et al. |
| 9,401,540 B2 | 7/2016 | Osterhout et al. |
| 9,423,842 B2 | 8/2016 | Osterhout et al. |
| 9,523,856 B2 | 12/2016 | Osterhout et al. |
| 9,529,195 B2 | 12/2016 | Osterhout et al. |
| 9,529,199 B2 | 12/2016 | Osterhout et al. |
| 9,529,385 B2 | 12/2016 | Connor |
| 9,575,321 B2 | 2/2017 | Osterhout et al. |
| 9,682,622 B2 | 6/2017 | Kim et al. |
| 9,690,763 B1 | 6/2017 | Lee et al. |
| D794,637 S | 8/2017 | Osterhout |
| 9,810,906 B2 | 11/2017 | Osterhout et al. |
| 9,939,934 B2 | 4/2018 | Osterhout et al. |
| 2001/0017614 A1 | 8/2001 | Hara et al. |
| 2002/0024675 A1 | 2/2002 | Foxlin et al. |
| 2002/0148655 A1 | 10/2002 | Cho et al. |
| 2003/0142065 A1 | 7/2003 | Pahlavan |
| 2003/0234823 A1 | 12/2003 | Sato et al. |
| 2004/0003453 A1 | 1/2004 | Urakawa et al. |
| 2004/0024287 A1 | 2/2004 | Patton et al. |
| 2004/0027312 A1 | 2/2004 | Owada et al. |
| 2004/0032392 A1 | 2/2004 | Chi et al. |
| 2004/0046736 A1* | 3/2004 | Pryor .................. A63F 13/02 |
| | | 345/156 |
| 2004/0080541 A1 | 4/2004 | Saiga et al. |
| 2004/0130522 A1 | 7/2004 | Lin et al. |
| 2004/0150631 A1 | 8/2004 | Fleck et al. |
| 2004/0224765 A1 | 11/2004 | Martinez et al. |
| 2005/0156915 A1 | 7/2005 | Fisher et al. |
| 2006/0017654 A1 | 1/2006 | Romo et al. |
| 2006/0047339 A1 | 3/2006 | Brown et al. |
| 2006/0132457 A1 | 6/2006 | Rimas-Ribikauskas et al. |
| 2006/0132924 A1 | 6/2006 | Mimran et al. |
| 2006/0170652 A1 | 8/2006 | Bannai et al. |
| 2006/0178827 A1 | 8/2006 | Aoyama et al. |
| 2006/0279549 A1 | 12/2006 | Zhang et al. |
| 2006/0288233 A1 | 12/2006 | Kozlay et al. |
| 2007/0003168 A1 | 1/2007 | Oliver et al. |
| 2007/0004451 A1 | 1/2007 | Anderson et al. |
| 2007/0038960 A1 | 2/2007 | Rekimoto et al. |
| 2007/0058868 A1 | 3/2007 | Seino et al. |
| 2007/0075989 A1 | 4/2007 | Cohen et al. |
| 2007/0120836 A1 | 5/2007 | Yamaguchi et al. |
| 2007/0132662 A1 | 6/2007 | Morita et al. |
| 2007/0153639 A1 | 7/2007 | Lafever et al. |
| 2007/0156364 A1 | 7/2007 | Rothkopf |
| 2007/0178950 A1 | 8/2007 | Lewis et al. |
| 2007/0229458 A1 | 10/2007 | Moon |
| 2007/0236450 A1 | 10/2007 | Colgate et al. |
| 2008/0005702 A1 | 1/2008 | Skourup et al. |
| 2008/0066973 A1 | 3/2008 | Furuki et al. |
| 2008/0121441 A1 | 5/2008 | Sheets et al. |
| 2008/0186255 A1 | 8/2008 | Cohen et al. |
| 2009/0183929 A1 | 7/2009 | Zhang et al. |
| 2009/0251441 A1 | 10/2009 | Edgecomb et al. |
| 2009/0279180 A1 | 11/2009 | Amitai et al. |
| 2010/0001572 A1 | 1/2010 | Masunaga et al. |
| 2010/0085325 A1 | 4/2010 | King-Smith et al. |
| 2010/0134848 A1 | 6/2010 | Lynggaard et al. |
| 2010/0182561 A1 | 7/2010 | Ikeda |
| 2010/0194682 A1 | 8/2010 | Orr et al. |
| 2010/0309097 A1 | 12/2010 | Raviv et al. |
| 2011/0006982 A1 | 1/2011 | Rhee et al. |
| 2011/0109587 A1 | 5/2011 | Ferencz et al. |
| 2011/0199305 A1 | 8/2011 | Suh |
| 2011/0213664 A1 | 9/2011 | Osterhout et al. |
| 2011/0221658 A1 | 9/2011 | Haddick et al. |

(56) References Cited

U.S. PATENT DOCUMENTS

| | | |
|---|---|---|
| 2011/0221672 A1 | 9/2011 | Osterhout et al. |
| 2011/0227820 A1 | 9/2011 | Haddick et al. |
| 2011/0285638 A1 | 11/2011 | Harris et al. |
| 2012/0026088 A1 | 2/2012 | Goran et al. |
| 2012/0049759 A1 | 3/2012 | Pezzutti et al. |
| 2012/0062445 A1 | 3/2012 | Haddick et al. |
| 2012/0062594 A1 | 3/2012 | Campbell et al. |
| 2012/0068913 A1 | 3/2012 | Bar-Zeev et al. |
| 2012/0075168 A1 | 3/2012 | Osterhout et al. |
| 2012/0113514 A1 | 5/2012 | Rodman |
| 2012/0133885 A1 | 5/2012 | Howell et al. |
| 2012/0139915 A1 | 6/2012 | Muikaichi et al. |
| 2012/0212499 A1 | 8/2012 | Haddick et al. |
| 2012/0218301 A1 | 8/2012 | Miller |
| 2012/0229248 A1 | 9/2012 | Parshionikar et al. |
| 2012/0249741 A1 | 10/2012 | Maciocci et al. |
| 2012/0256944 A1 | 10/2012 | Crumly et al. |
| 2012/0302347 A1 | 11/2012 | Nicholson |
| 2012/0327040 A1 | 12/2012 | Simon et al. |
| 2013/0002545 A1 | 1/2013 | Heinrich et al. |
| 2013/0002724 A1 | 1/2013 | Heinrich et al. |
| 2013/0009907 A1 | 1/2013 | Rosenberg et al. |
| 2013/0027341 A1 | 1/2013 | Mastandrea et al. |
| 2013/0038729 A1 | 2/2013 | Chang |
| 2013/0120224 A1 | 5/2013 | Cajigas et al. |
| 2013/0135244 A1 | 5/2013 | Lynch et al. |
| 2013/0169560 A1 | 7/2013 | Cederlund et al. |
| 2013/0222270 A1 | 8/2013 | Winkler et al. |
| 2013/0234914 A1 | 9/2013 | Fujimaki et al. |
| 2013/0249849 A1 | 9/2013 | Wong et al. |
| 2013/0249946 A1 | 9/2013 | Kimura |
| 2013/0288761 A1 | 10/2013 | Santos et al. |
| 2013/0300637 A1 | 11/2013 | Smits et al. |
| 2013/0336528 A1 | 12/2013 | Itani et al. |
| 2014/0063473 A1 | 3/2014 | Pasolini |
| 2014/0078043 A1 | 3/2014 | Kim et al. |
| 2014/0111838 A1 | 4/2014 | Han et al. |
| 2014/0115520 A1 | 4/2014 | Itani et al. |
| 2014/0165000 A1 | 6/2014 | Fleizach et al. |
| 2014/0168716 A1 | 6/2014 | King et al. |
| 2014/0191942 A1 | 7/2014 | Kobayashi et al. |
| 2014/0204062 A1 | 7/2014 | Goto et al. |
| 2014/0240103 A1 | 8/2014 | Lake et al. |
| 2014/0240223 A1 | 8/2014 | Lake et al. |
| 2014/0266988 A1 | 9/2014 | Fisher et al. |
| 2014/0279528 A1 | 9/2014 | Slaby et al. |
| 2014/0285631 A1 | 9/2014 | Janky et al. |
| 2014/0306866 A1 | 10/2014 | Miller et al. |
| 2014/0320383 A1 | 10/2014 | Goto et al. |
| 2014/0320389 A1 | 10/2014 | Scavezze et al. |
| 2014/0363797 A1 | 12/2014 | Hu et al. |
| 2015/0012581 A1 | 1/2015 | Park et al. |
| 2015/0016777 A1 | 1/2015 | Abovitz et al. |
| 2015/0040040 A1 | 2/2015 | Finocchio et al. |
| 2015/0085333 A1 | 3/2015 | Theytaz |
| 2015/0123887 A1 | 5/2015 | Shadle et al. |
| 2015/0128251 A1 | 5/2015 | Yoon et al. |
| 2015/0143297 A1 | 5/2015 | Wheeler et al. |
| 2015/0156716 A1 | 6/2015 | Raffle et al. |
| 2015/0185476 A1 | 7/2015 | Lee |
| 2015/0202962 A1 | 7/2015 | Habashima et al. |
| 2015/0205119 A1 | 7/2015 | Osterhout et al. |
| 2015/0205132 A1 | 7/2015 | Osterhout et al. |
| 2015/0205348 A1 | 7/2015 | Nortrup et al. |
| 2015/0205349 A1 | 7/2015 | Nortrup et al. |
| 2015/0205351 A1 | 7/2015 | Osterhout et al. |
| 2015/0205373 A1 | 7/2015 | Osterhout et al. |
| 2015/0205378 A1 | 7/2015 | Osterhout |
| 2015/0205384 A1 | 7/2015 | Osterhout et al. |
| 2015/0205385 A1 | 7/2015 | Osterhout et al. |
| 2015/0205387 A1 | 7/2015 | Osterhout et al. |
| 2015/0205388 A1 | 7/2015 | Osterhout |
| 2015/0205401 A1 | 7/2015 | Osterhout |
| 2015/0205402 A1 | 7/2015 | Osterhout |
| 2015/0205566 A1 | 7/2015 | Osterhout |
| 2015/0206173 A1 | 7/2015 | Nortrup et al. |
| 2015/0212324 A1 | 7/2015 | Osterhout |
| 2015/0212327 A1 | 7/2015 | Osterhout et al. |
| 2015/0212647 A1 | 7/2015 | Kim et al. |
| 2015/0213584 A1 | 7/2015 | Ishikawa et al. |
| 2015/0226966 A1 | 8/2015 | Osterhout |
| 2015/0226967 A1 | 8/2015 | Osterhout et al. |
| 2015/0228099 A1 | 8/2015 | Osterhout |
| 2015/0228119 A1 | 8/2015 | Osterhout et al. |
| 2015/0228120 A1 | 8/2015 | Osterhout et al. |
| 2015/0229019 A1 | 8/2015 | Osterhout |
| 2015/0241963 A1 | 8/2015 | Nortrup et al. |
| 2015/0241964 A1 | 8/2015 | Nortrup et al. |
| 2015/0241965 A1 | 8/2015 | Nortrup et al. |
| 2015/0241966 A1 | 8/2015 | Nortrup et al. |
| 2015/0243039 A1 | 8/2015 | Holz |
| 2015/0260986 A1 | 9/2015 | Nortrup |
| 2015/0277116 A1 | 10/2015 | Richards et al. |
| 2015/0277120 A1 | 10/2015 | Border |
| 2015/0277559 A1 | 10/2015 | Vescovi |
| 2015/0293738 A1 | 10/2015 | Lee |
| 2015/0302646 A1 | 10/2015 | Osterhout et al. |
| 2015/0302647 A1 | 10/2015 | Osterhout et al. |
| 2015/0309317 A1 | 10/2015 | Osterhout et al. |
| 2015/0309534 A1 | 10/2015 | Osterhout |
| 2015/0309995 A1 | 10/2015 | Osterhout |
| 2015/0338661 A1 | 11/2015 | Osterhout et al. |
| 2015/0346496 A1 | 12/2015 | Haddick et al. |
| 2015/0346511 A1 | 12/2015 | Osterhout et al. |
| 2015/0355468 A1 | 12/2015 | Osterhout et al. |
| 2015/0356772 A1 | 12/2015 | Osterhout et al. |
| 2015/0356775 A1 | 12/2015 | Osterhout et al. |
| 2015/0356776 A1 | 12/2015 | Osterhout et al. |
| 2015/0356777 A1 | 12/2015 | Osterhout et al. |
| 2015/0356778 A1 | 12/2015 | Osterhout et al. |
| 2015/0356779 A1 | 12/2015 | Osterhout et al. |
| 2015/0363975 A1 | 12/2015 | Osterhout et al. |
| 2016/0018640 A1 | 1/2016 | Haddick et al. |
| 2016/0018641 A1 | 1/2016 | Haddick et al. |
| 2016/0018642 A1 | 1/2016 | Haddick et al. |
| 2016/0018645 A1 | 1/2016 | Haddick et al. |
| 2016/0018646 A1 | 1/2016 | Osterhout et al. |
| 2016/0018647 A1 | 1/2016 | Osterhout et al. |
| 2016/0018648 A1 | 1/2016 | Osterhout et al. |
| 2016/0018649 A1 | 1/2016 | Osterhout et al. |
| 2016/0018650 A1 | 1/2016 | Haddick et al. |
| 2016/0018651 A1 | 1/2016 | Haddick et al. |
| 2016/0018652 A1 | 1/2016 | Haddick et al. |
| 2016/0018653 A1 | 1/2016 | Haddick et al. |
| 2016/0018654 A1 | 1/2016 | Haddick et al. |
| 2016/0019715 A1 | 1/2016 | Haddick et al. |
| 2016/0019719 A1 | 1/2016 | Osterhout et al. |
| 2016/0021304 A1 | 1/2016 | Osterhout |
| 2016/0025974 A1 | 1/2016 | Osterhout et al. |
| 2016/0025977 A1 | 1/2016 | Osterhout |
| 2016/0025979 A1 | 1/2016 | Border et al. |
| 2016/0025980 A1 | 1/2016 | Osterhout et al. |
| 2016/0026239 A1 | 1/2016 | Border et al. |
| 2016/0027211 A1 | 1/2016 | Osterhout et al. |
| 2016/0027414 A1 | 1/2016 | Osterhout et al. |
| 2016/0056647 A1 | 2/2016 | Choi |
| 2016/0062118 A1 | 3/2016 | Osterhout |
| 2016/0078278 A1 | 3/2016 | Moore et al. |
| 2016/0080897 A1 | 3/2016 | Moore et al. |
| 2016/0085072 A1 | 3/2016 | Haddick et al. |
| 2016/0085278 A1 | 3/2016 | Osterhout et al. |
| 2016/0098086 A1 | 4/2016 | Li |
| 2016/0109709 A1 | 4/2016 | Osterhout |
| 2016/0109713 A1 | 4/2016 | Osterhout |
| 2016/0116738 A1 | 4/2016 | Osterhout et al. |
| 2016/0116745 A1 | 4/2016 | Osterhout et al. |
| 2016/0131904 A1 | 5/2016 | Border et al. |
| 2016/0131911 A1 | 5/2016 | Border et al. |
| 2016/0132082 A1 | 5/2016 | Border et al. |
| 2016/0133201 A1 | 5/2016 | Border et al. |
| 2016/0140766 A1 | 5/2016 | Balachandreswaran et al. |
| 2016/0161743 A1 | 6/2016 | Osterhout et al. |

(56) References Cited

U.S. PATENT DOCUMENTS

| | | |
|---|---|---|
| 2016/0161747 A1 | 6/2016 | Osterhout |
| 2016/0170207 A1 | 6/2016 | Haddick et al. |
| 2016/0171769 A1 | 6/2016 | Haddick et al. |
| 2016/0187658 A1 | 6/2016 | Osterhout et al. |
| 2016/0202946 A1 | 7/2016 | Osterhout et al. |
| 2016/0246055 A1 | 8/2016 | Border et al. |
| 2016/0286203 A1 | 9/2016 | Border et al. |
| 2016/0299569 A1 | 10/2016 | Gautreaux et al. |
| 2016/0329634 A1 | 11/2016 | Osterhout et al. |
| 2016/0375306 A1 | 12/2016 | Gu et al. |
| 2017/0017323 A1 | 1/2017 | Yu et al. |
| 2017/0024007 A1 | 1/2017 | Pelis et al. |
| 2017/0024035 A1 | 1/2017 | Pelis et al. |
| 2017/0031395 A1 | 2/2017 | Osterhout et al. |
| 2017/0075155 A1 | 3/2017 | Oikawa et al. |
| 2017/0100664 A1 | 4/2017 | Osterhout et al. |
| 2017/0123492 A1 | 5/2017 | Marggraff et al. |
| 2017/0153672 A1 | 6/2017 | Shin et al. |
| 2017/0160812 A1 | 6/2017 | Park |
| 2017/0185214 A1 | 6/2017 | Kojima et al. |
| 2017/0187855 A1 | 6/2017 | Hoellwarth |
| 2017/0293351 A1 | 10/2017 | Li |
| 2017/0322416 A1 | 11/2017 | Osterhout |
| 2017/0322627 A1 | 11/2017 | Osterhout |
| 2017/0322641 A1 | 11/2017 | Osterhout |
| 2017/0324860 A1 | 11/2017 | Novet |
| 2017/0336872 A1 | 11/2017 | Osterhout |
| 2017/0345194 A1* | 11/2017 | Park ................... G06T 3/20 |
| 2017/0358139 A1* | 12/2017 | Balan ............. G02B 27/0172 |
| 2018/0011571 A1 | 1/2018 | Colgate et al. |
| 2018/0108179 A1* | 4/2018 | Tomlin et al. ..... G02B 27/0172 |

OTHER PUBLICATIONS

"Audio Spotlight", by Holosonics, http://www.holosonics.com, accessed Jul. 3, 2014, 3 pages.

"Genius Ring Mice", http://www.geniusnet.com/Genius/wSite/productCompare/compare.jsp, Dec. 23, 2014, 1 page.

"Meet Nod, the Bluetooth Ring That Wants to Replace Your Mouse", http://www.pcmag.com/article2/0,2817,2457238,00.asp, Apr. 29, 2014, 6 pages.

"Sound from Ultrasound", Wikipedia entry, http://en.m.wikipedia.org/wiki/Sound_from_ultrasound, accessed Jul. 3, 2014, 13 pages.

Huang, Jin-Bin, "Image Completion Using Planar Structure Guidelines", ACM Transactions on Graphics, vol. 33, No. 4, Article 129, Jul. 2014, 1-10.

Janin, Adam L. et al., "Calibration of Head-Mounted Displays for Augmented Reality Applications", Research and Technology Boeing Computer Services MS 7L-48 P.O. Box 24346 Seattle, WA 98124-0346 Virtual Reality Annual International Symposium, 1993., 1993 IEEE,, 1993, 10 Pages.

Lang, Manuel et al., ""Nonlinear Disparity Mapping for Stereoscopic 3D"", Jul. 2010, 1-10.

Logbar Inc.,, "Ring: Shortcut Everything", https://www.kickstarter.com/projects/1761670738/ring-shortcut-everything, Jun. 2012, 22 pages.

Mastandrea, Nick, "Mycestro, The Next Generation 3D Mouse", https://www.kickstarter.com/projects/mycestro/mycestrotm-the-next-generation-3d-mouse, Dec. 2014, 22 pages.

Walton, Zach, "Wear This Smartphone Controller on Your Finger", http://www.webpronews.com/wear-this-smartphone-controller-on-your-finger-2012-06, 5 pages.

Ye, Hui et al., "High Quality Voice Morphing", Cambridge University Engineering Department Trumpington Street, Cambridge, England, CB2 1PZ, 2004, I-9-I-11.

U.S. Appl. No. 15/446,025, filed Mar. 1, 2017, Pending.
U.S. Appl. No. 15/347,958, filed Nov. 10, 2016, Pending.
U.S. Appl. No. 15/785,505, filed Oct. 17, 2017, Pending.

* cited by examiner

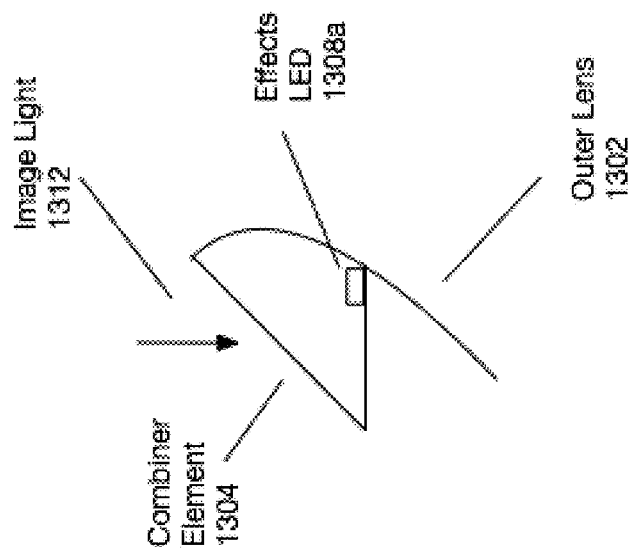

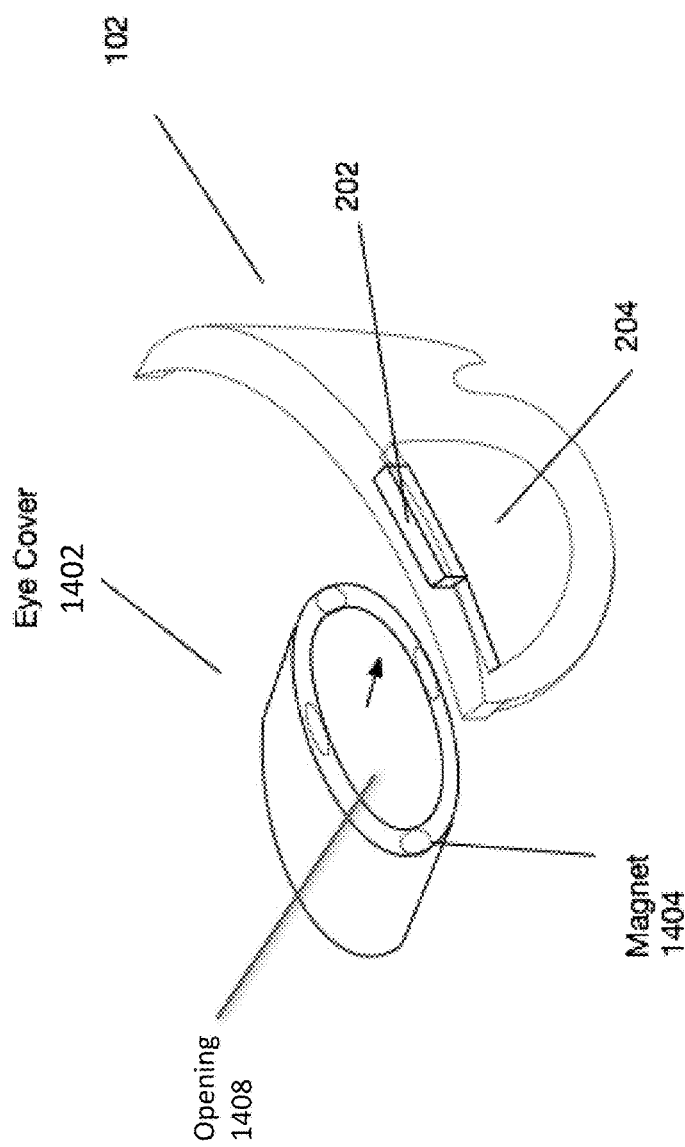

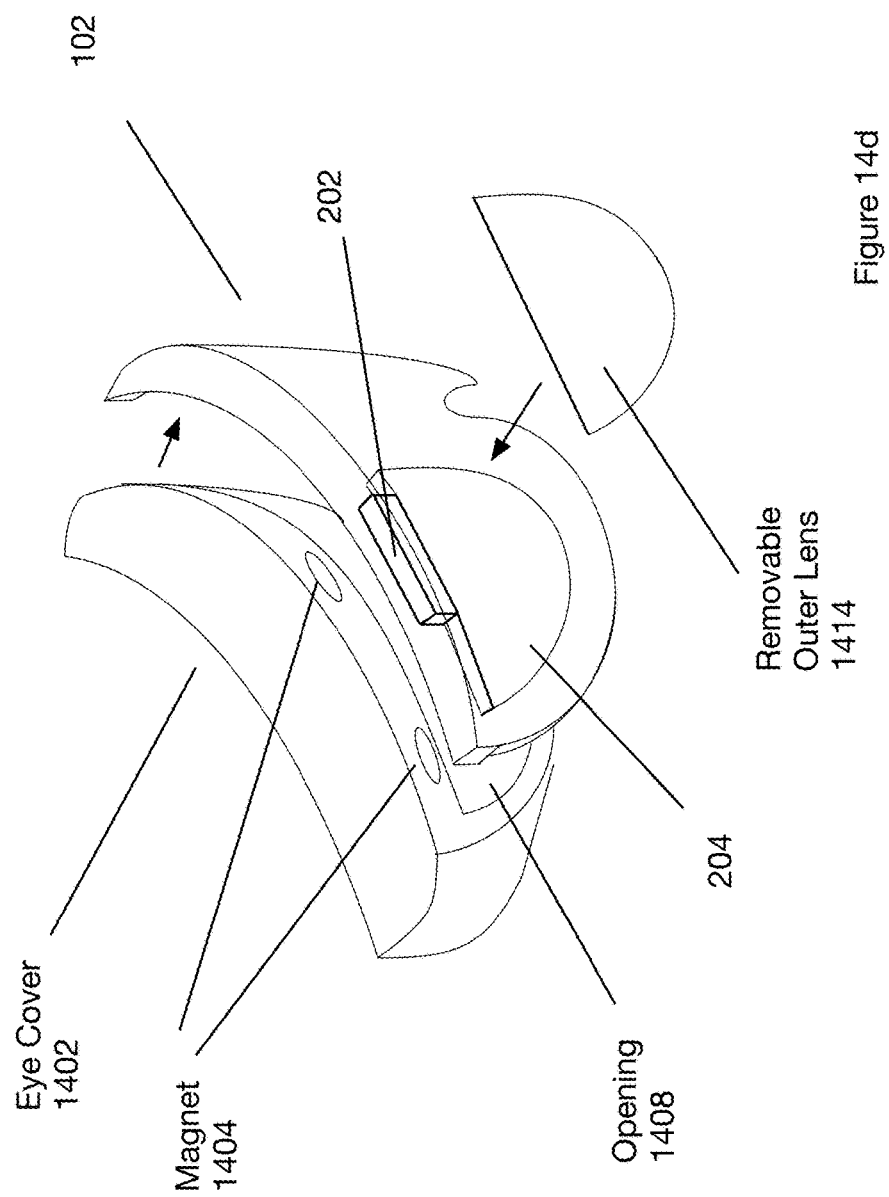

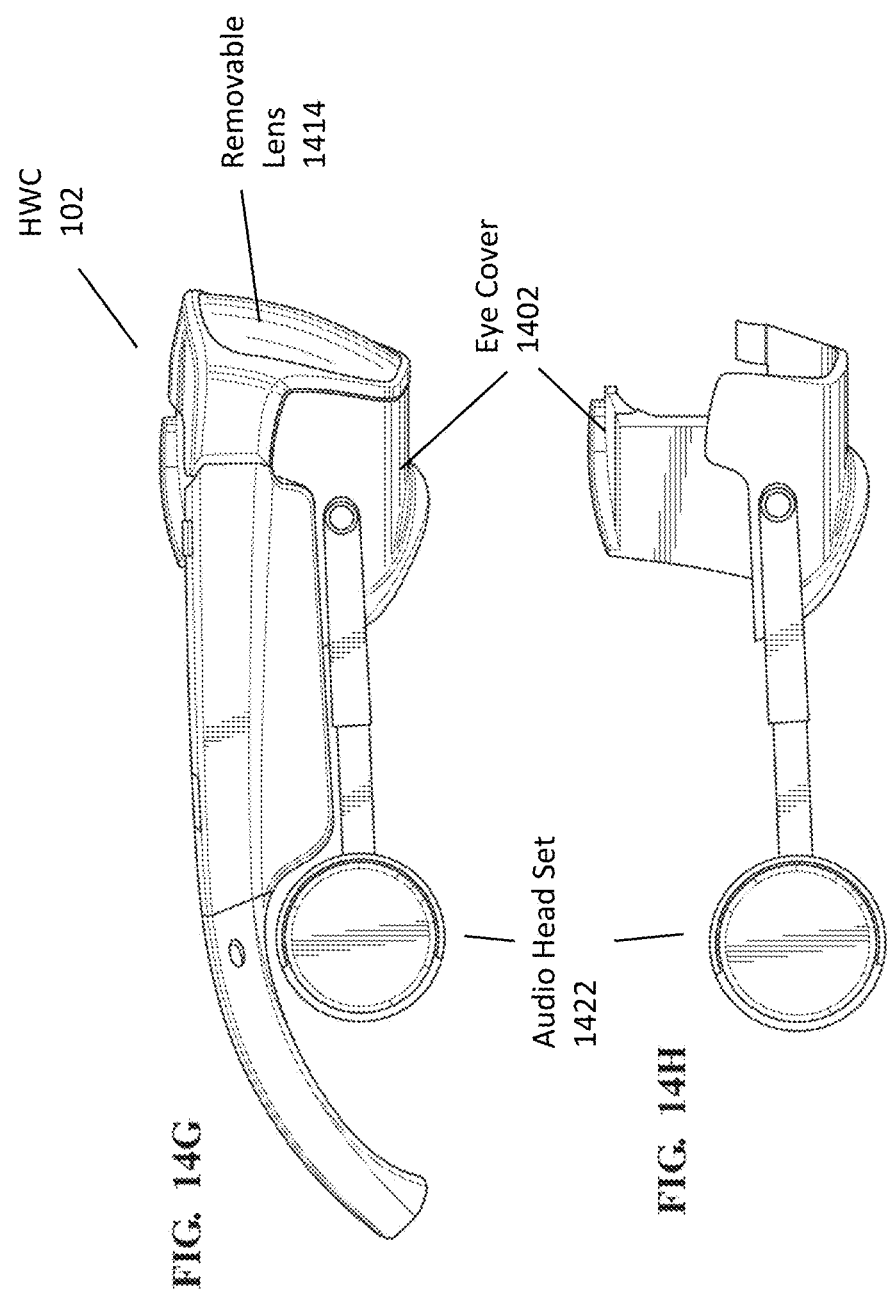

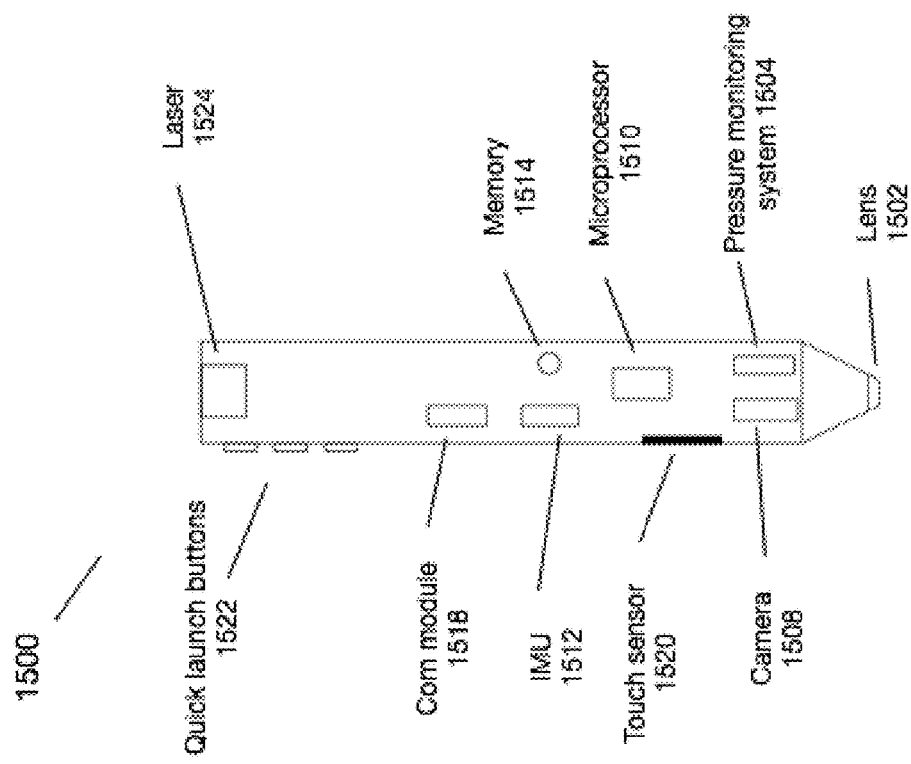

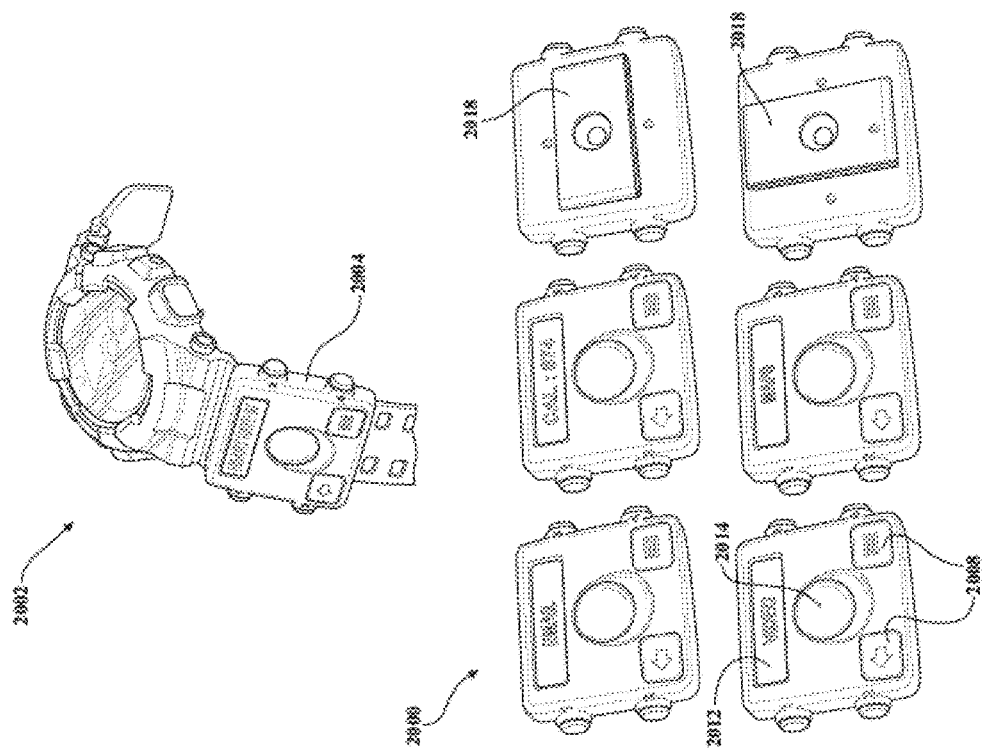

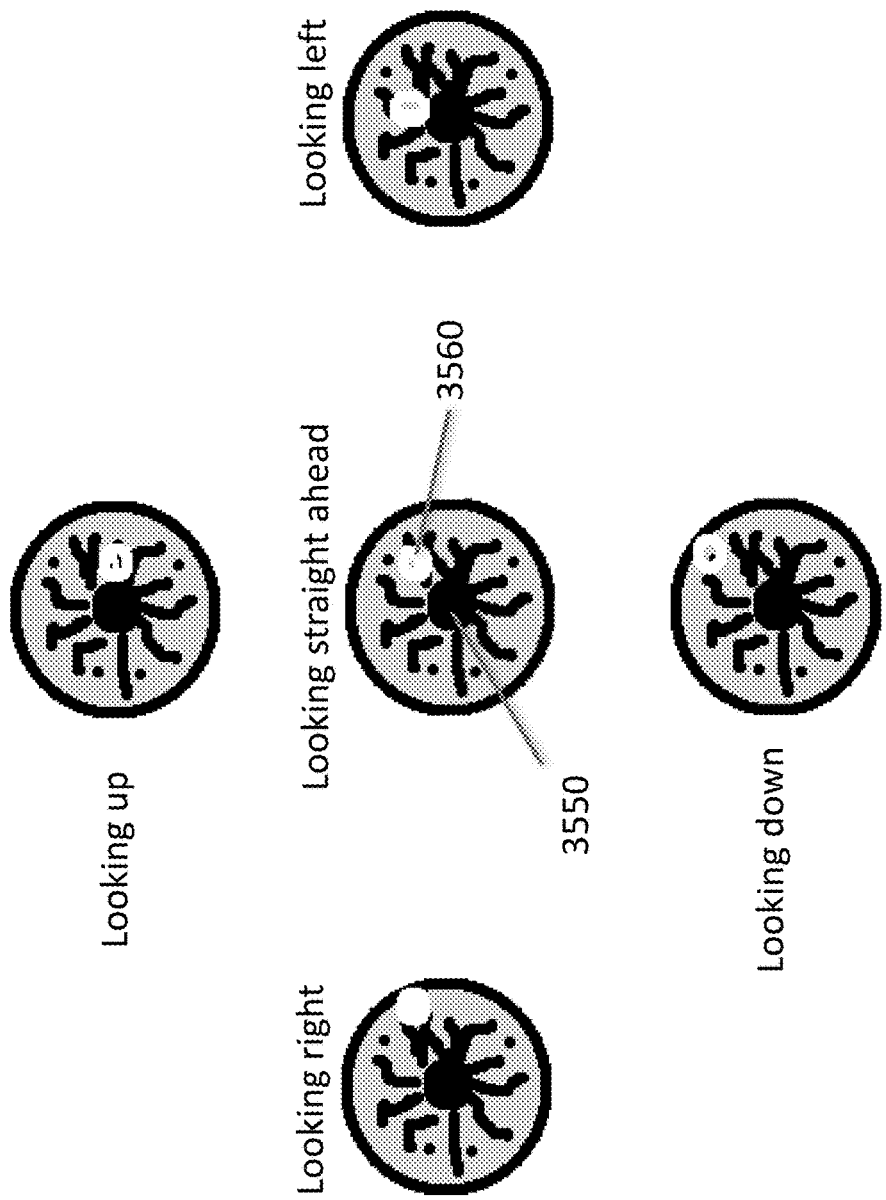

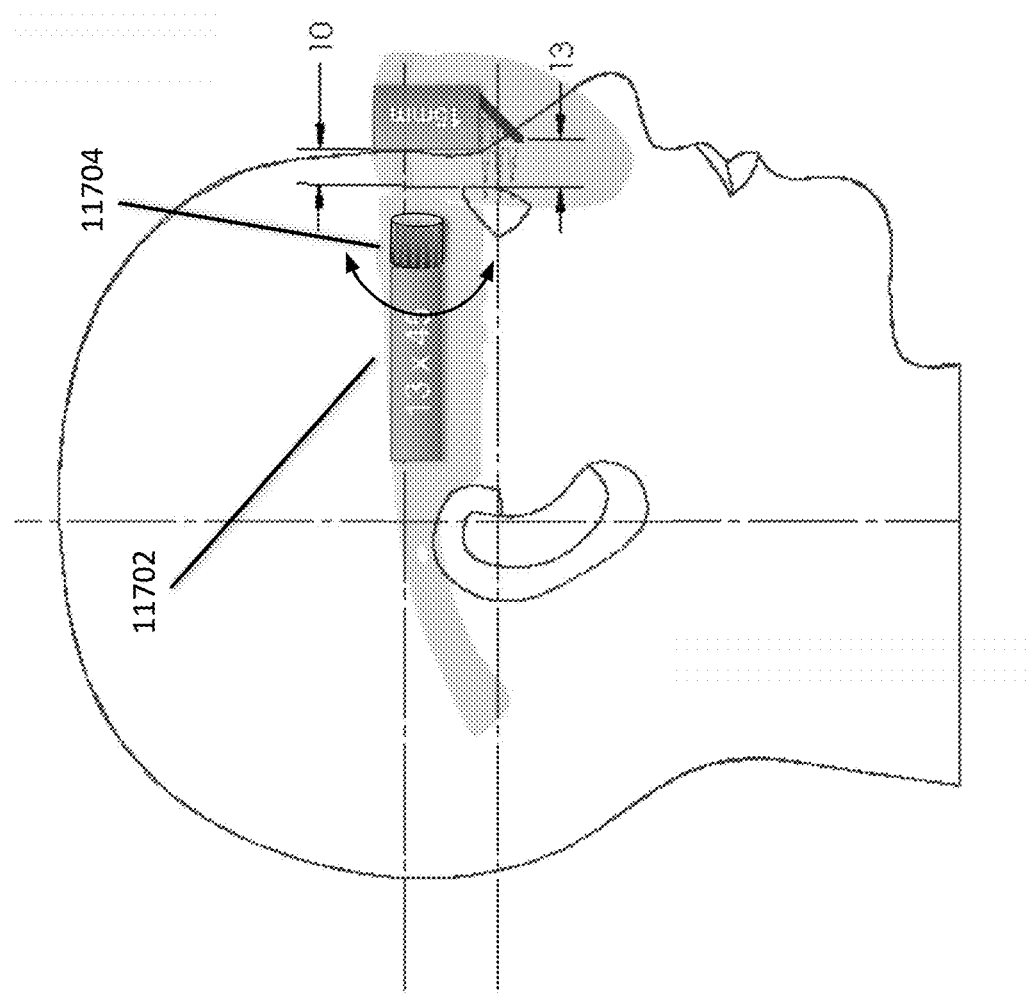

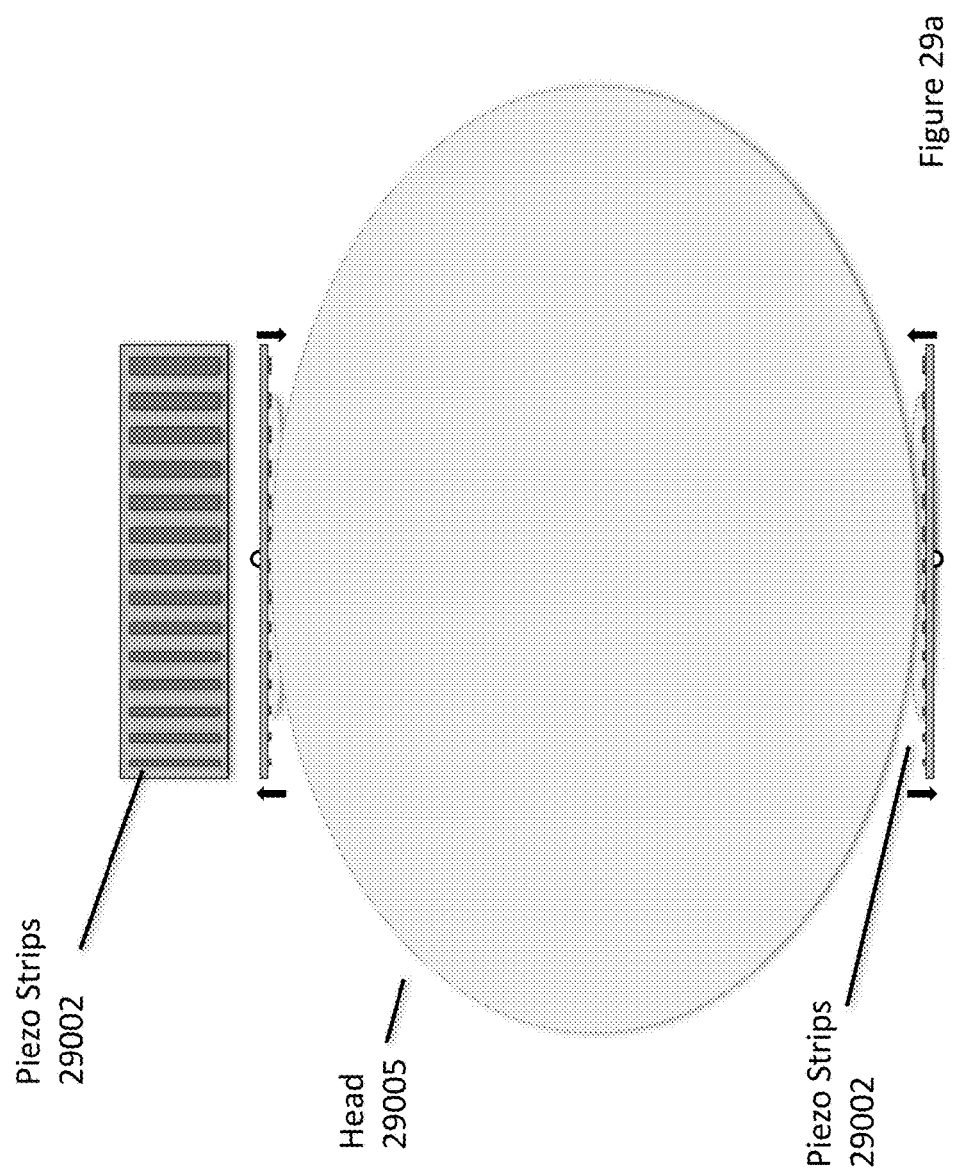

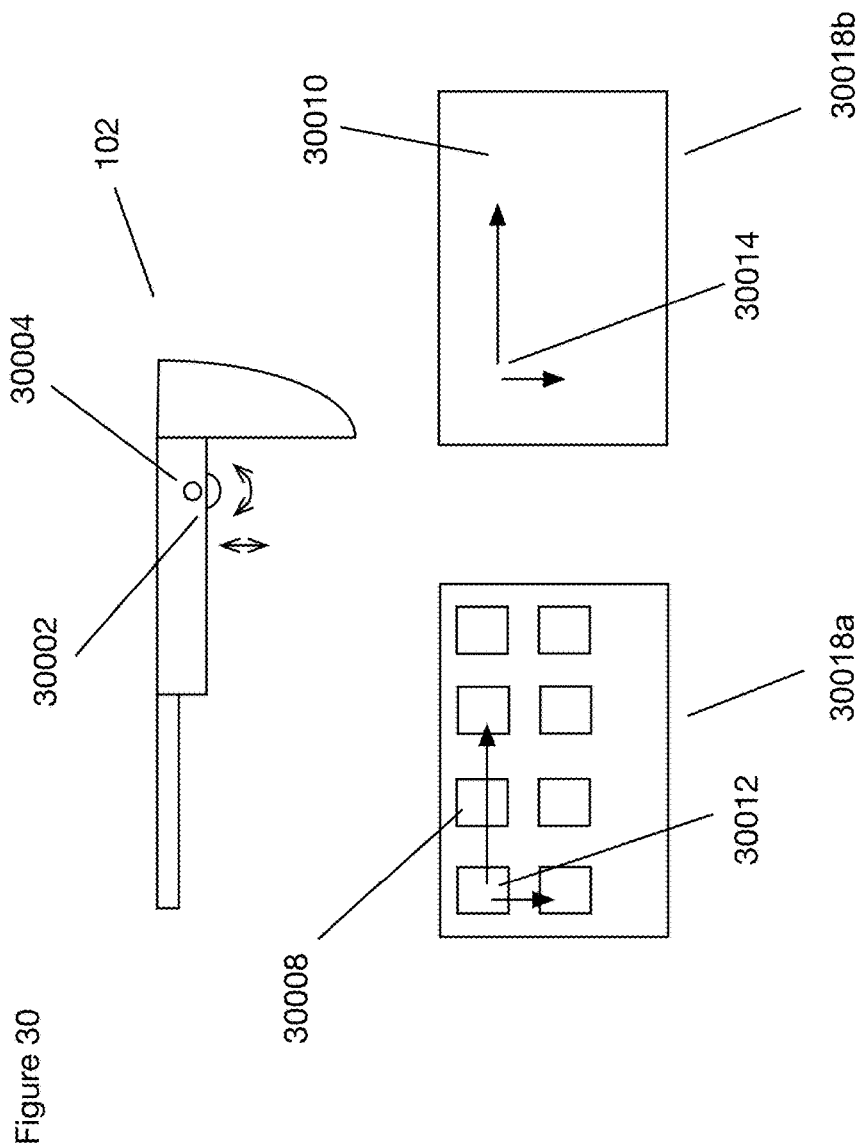

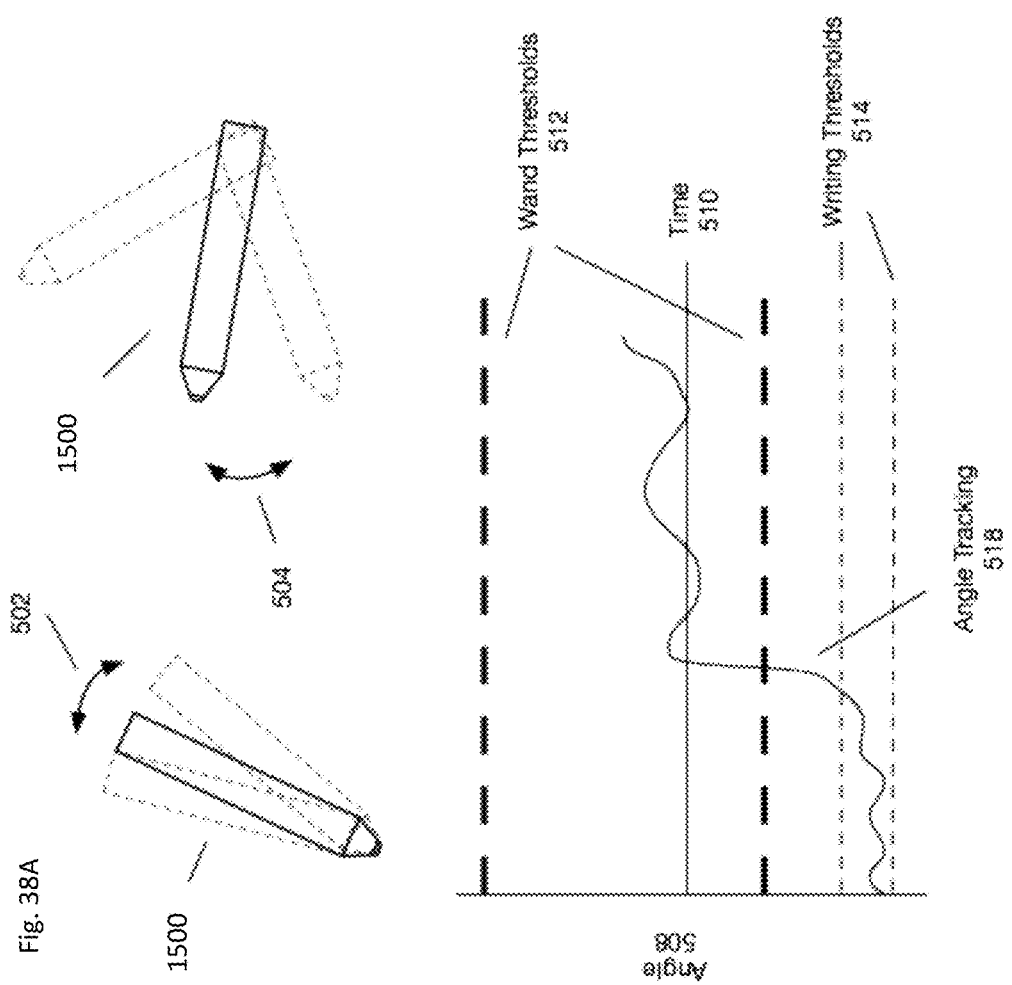

CONTROLLER MOVEMENT TRACKING WITH LIGHT EMITTERS

BACKGROUND

Field of the Disclosure

This disclosure relates to user interfaces for head-worn computer systems.

Description of Related Art

Head mounted displays (HMDs) and particularly HMDs that provide a see-through view of the environment are valuable instruments. The presentation of content in the see-through display can be a complicated operation when attempting to ensure that the user experience is optimized. Improved systems and methods for presenting content in the see-through display are required to improve the user experience.

SUMMARY

Aspects of the present disclosure relate to user interface methods and systems for head-worn computer systems.

These and other systems, methods, objects, features, and advantages of the present disclosure will be apparent to those skilled in the art from the following detailed description of the preferred embodiment and the drawings.

All documents mentioned herein are hereby incorporated in their entirety by reference.

BRIEF DESCRIPTION OF THE DRAWINGS

Embodiments are described with reference to the following Figures. The same numbers may be used throughout to reference like features and components that are shown in the Figures:

FIGS. 13a to 13c illustrate peripheral lighting systems in accordance with the principles of the present disclosure.

FIGS. 14a to 14h illustrate light suppression systems in accordance with the principles of the present disclosure.

FIG. 15 illustrates an external user interface in accordance with the principles of the present disclosure.

FIG. 16 illustrates external user interfaces in accordance with the principles of the present disclosure.

FIG. 19 illustrates eye glint in the prediction of eye direction analysis in accordance with the principles of the present disclosure.

FIG. 27 illustrates a user interface in accordance with the principles of the present disclosure.

FIGS. 29 and 29a illustrate haptic systems in accordance with the principles of the present disclosure.

FIGS. 30 and 31 illustrate user interface systems in accordance with the principles of the present disclosure.

FIGS. 38a to 38c illustrate user interface mode selection systems in accordance with the principles of the present disclosure.

While the disclosure has been described in connection with certain preferred embodiments, other embodiments would be understood by one of ordinary skill in the art and are encompassed herein.

DETAILED DESCRIPTION OF THE PREFERRED EMBODIMENT(S)

Aspects of the present disclosure relate to head-worn computing ("HWC") systems. HWC involves, in some instances, a system that mimics the appearance of head-worn glasses or sunglasses. The glasses may be a fully developed computing platform, such as including computer displays presented in each of the lenses of the glasses to the eyes of the user. In embodiments, the lenses and displays may be configured to allow a person wearing the glasses to see the environment through the lenses while also seeing, simultaneously, digital imagery, which forms an overlaid image that is perceived by the person as a digitally augmented image of the environment, or augmented reality ("AR").

HWC involves more than just placing a computing system on a person's head. The system may need to be designed as a lightweight, compact and fully functional computer display, such as wherein the computer display includes a high resolution digital display that provides a high level of emersion comprised of the displayed digital content and the see-through view of the environmental surroundings. User interfaces and control systems suited to the HWC device may be required that are unlike those used for a more conventional computer such as a laptop. For the HWC and associated systems to be most effective, the glasses may be equipped with sensors to determine environmental conditions, geographic location, relative positioning to other points of interest, objects identified by imaging and movement by the user or other users in a connected group, compass heading, head tilt, where the user is looking and the like. The HWC may then change the mode of operation to match the conditions, location, positioning, movements, and the like, in a method generally referred to as a contextually aware HWC. The glasses also may need to be connected, wirelessly or otherwise, to other systems either locally or through a network. Controlling the glasses may be achieved through the use of an external device, automatically through contextually gathered information, through user gestures captured by the glasses sensors, and the like. Each technique may be further refined depending on the software application being used in the glasses. The glasses may further be used to control or coordinate with external devices that are associated with the glasses.

Figure 1:
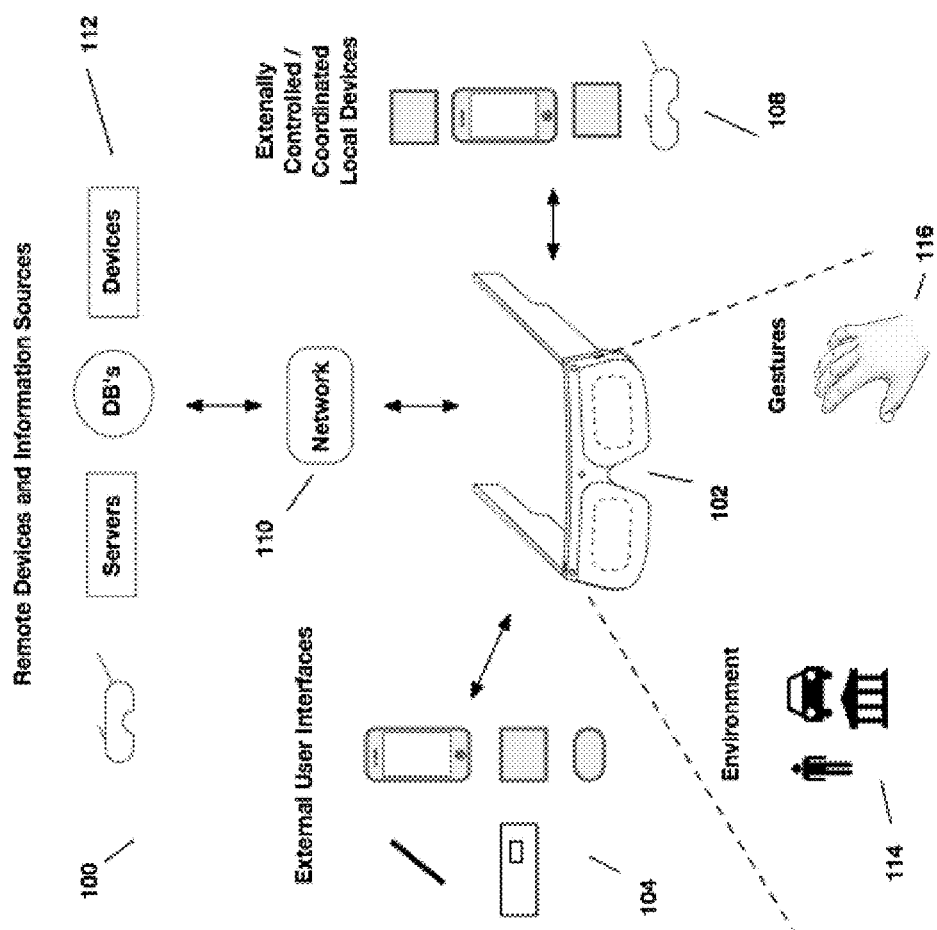
FIG. 1 illustrates a head worn computing system in accordance with the principles of the present disclosure.

Referring to FIG. 1, an overview of the HWC system 100 is presented. As shown, the HWC system 100 comprises a HWC 102, which in this instance is configured as glasses to be worn on the head with sensors such that the HWC 102 is aware of the objects and conditions in the environment 114. In this instance, the HWC 102 also receives and interprets control inputs such as gestures and movements 116. The HWC 102 may communicate with external user interfaces 104. The external user interfaces 104 may provide a physical user interface to take control instructions from a user of the HWC 102 and the external user interfaces 104 and the HWC 102 may communicate bi-directionally to affect the user's command and provide feedback to the external device 108. The HWC 102 may also communicate bi-directionally with externally controlled or coordinated local devices 108. For example, an external user interface 104 may be used in connection with the HWC 102 to control an externally controlled or coordinated local device 108. The externally controlled or coordinated local device 108 may provide feedback to the HWC 102 and a customized GUI may be presented in the HWC 102 based on the type of device or specifically identified device 108. The HWC 102 may also interact with remote devices and information sources 112 through a network connection 110. Again, the external user interface 104 may be used in connection with the HWC 102 to control or otherwise interact with any of the remote devices 108 and information sources 112 in a similar way as when the external user interfaces 104 are used to control or otherwise interact with the externally controlled or coordinated local devices 108. Similarly, HWC 102 may interpret gestures 116 (e.g. captured from forward, downward, upward, rearward facing sensors such as camera(s), range finders, IR sensors, etc.) or environmental conditions sensed in the environment 114 to control either local or remote devices 108 or 112.

We will now describe each of the main elements depicted on FIG. 1 in more detail; however, these descriptions are intended to provide general guidance and should not be construed as limiting. Additional description of each element may also be further described herein.

The HWC 102 is a computing platform intended to be worn on a person's head. The HWC 102 may take many different forms to fit many different functional requirements. In some situations, the HWC 102 will be designed in the form of conventional glasses. The glasses may or may not have active computer graphics displays. In situations where the HWC 102 has integrated computer displays the displays may be configured as see-through displays such that the digital imagery can be overlaid with respect to the user's view of the environment 114. There are a number of see-through optical designs that may be used, including ones that have a reflective display (e.g. LCoS, DLP), emissive displays (e.g. OLED, LED), hologram, TIR waveguides, and the like. In embodiments, lighting systems used in connection with the display optics may be solid state lighting systems, such as LED, OLED, quantum dot, quantum dot LED, etc. In addition, the optical configuration may be monocular or binocular. It may also include vision corrective optical components. In embodiments, the optics may be packaged as contact lenses. In other embodiments, the HWC 102 may be in the form of a helmet with a see-through shield, sunglasses, safety glasses, goggles, a mask, fire helmet with see-through shield, police helmet with see through shield, military helmet with see-through shield, utility form customized to a certain work task (e.g. inventory control, logistics, repair, maintenance, etc.), and the like.

The HWC 102 may also have a number of integrated computing facilities, such as an integrated processor, integrated power management, communication structures (e.g. cell net, WiFi, Bluetooth, local area connections, mesh connections, remote connections (e.g. client server, etc.)), and the like. The HWC 102 may also have a number of positional awareness sensors, such as GPS, electronic compass, altimeter, tilt sensor, IMU, and the like. It may also have other sensors such as a camera, rangefinder, hyperspectral camera, Geiger counter, microphone, spectral illumination detector, temperature sensor, chemical sensor, biologic sensor, moisture sensor, ultrasonic sensor, and the like.

The HWC 102 may also have integrated control technologies. The integrated control technologies may be contextual based control, passive control, active control, user control, and the like. For example, the HWC 102 may have an integrated sensor (e.g. camera) that captures user hand or body gestures 116 such that the integrated processing system can interpret the gestures and generate control commands for the HWC 102. In another example, the HWC 102 may have sensors that detect movement (e.g. a nod, head shake, and the like) including accelerometers, gyros and other inertial measurements, where the integrated processor may interpret the movement and generate a control command in response. The HWC 102 may also automatically control itself based on measured or perceived environmental conditions. For example, if it is bright in the environment the HWC 102 may increase the brightness or contrast of the displayed image. In embodiments, the integrated control technologies may be mounted on the HWC 102 such that a user can interact with it directly. For example, the HWC 102 may have a button(s), touch capacitive interface, and the like.

As described herein, the HWC 102 may be in communication with external user interfaces 104. The external user interfaces may come in many different forms. For example, a cell phone screen may be adapted to take user input for control of an aspect of the HWC 102. The external user interface may be a dedicated UI (e.g. air mouse, finger mounted mouse), such as a keyboard, touch surface, button(s), joy stick, and the like. In embodiments, the external controller may be integrated into another device such as a ring, watch, bike, car, and the like. In each case, the external user interface 104 may include sensors (e.g. IMU, accelerometers, compass, altimeter, and the like) to provide additional input for controlling the HWD 104.

As described herein, the HWC 102 may control or coordinate with other local devices 108. The external devices 108 may be an audio device, visual device, vehicle, cell phone, computer, and the like. For instance, the local external device 108 may be another HWC 102, where information may then be exchanged between the separate HWCs 108.

Similar to the way the HWC 102 may control or coordinate with local devices 106, the HWC 102 may control or coordinate with remote devices 112, such as the HWC 102 communicating with the remote devices 112 through a network 110. Again, the form of the remote device 112 may have many forms. Included in these forms is another HWC 102. For example, each HWC 102 may communicate its GPS position such that all the HWCs 102 know where all of HWC 102 are located.

Figure 2:
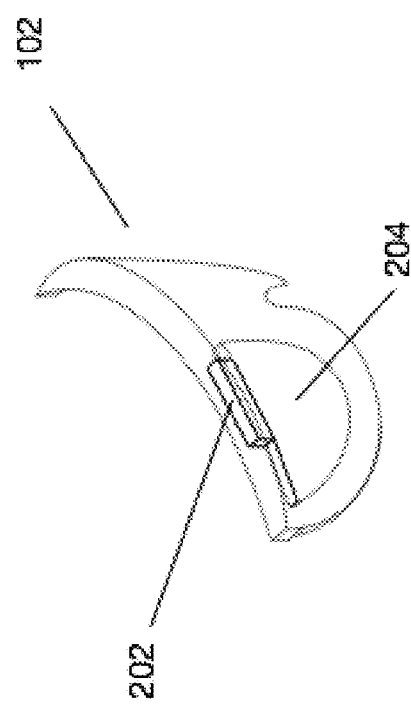
FIG. 2 illustrates a head worn computing system with optical system in accordance with the principles of the present disclosure.

FIG. 2 illustrates a HWC 102 with an optical system that includes an upper optical module 202 and a lower optical module 204. While the upper and lower optical modules 202 and 204 will generally be described as separate modules, it should be understood that this is illustrative only and the present disclosure includes other physical configurations, such as that when the two modules are combined into a single module or where the elements making up the two modules are configured into more than two modules. In embodiments, the upper module 202 includes a computer controlled display (e.g. LCoS, FLCoS, DLP, OLED, backlit LCD, etc.) and image light delivery optics. In embodiments, the lower module includes eye delivery optics that are configured to receive the upper module's image light and deliver the image light to the eye of a wearer of the HWC. In FIG. 2, it should be noted that while the upper and lower optical modules 202 and 204 are illustrated in one side of the HWC such that image light can be delivered to one eye of the wearer, that it is envisioned by the present disclosure that embodiments will contain two image light delivery systems, one for each eye.

Figure 3:
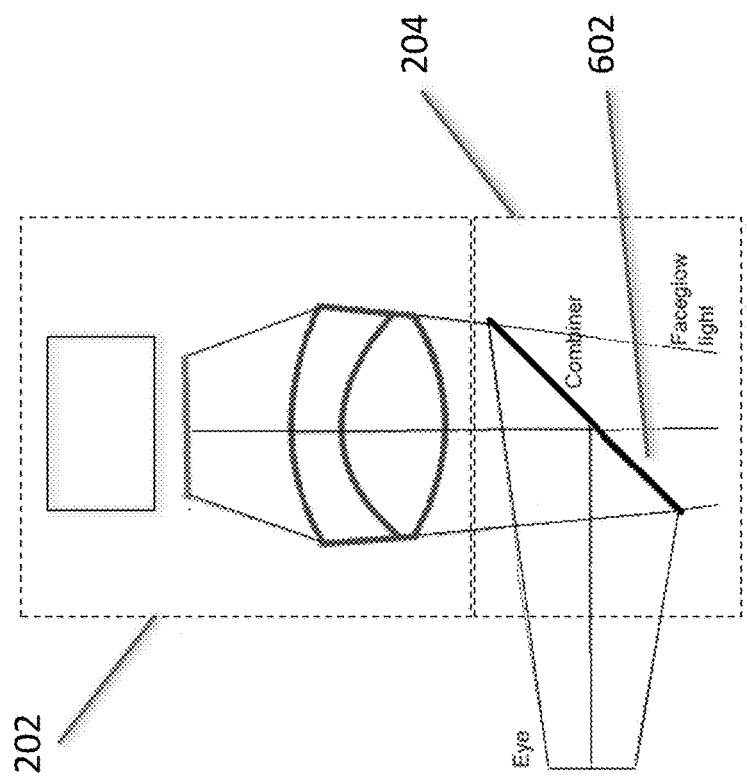
FIG. 3 illustrates upper and lower optical modules in accordance with the principles of the present disclosure.

FIG. 3 illustrates a combination of an upper optical module 202 with a lower optical module 204. In this embodiment, the image light projected from the upper optical module 202 may or may not be polarized. The image light is reflected off a flat combiner element 602 such that it is directed towards the user's eye. Wherein, the combiner element 602 is a partial mirror that reflects image light while transmitting a substantial portion of light from the environment so the user can look through the combiner element and see the environment surrounding the HWC.

The combiner 602 may include a holographic pattern, to form a holographic mirror. If a monochrome image is desired, there may be a single wavelength reflection design for the holographic pattern on the surface of the combiner 602. If the intention is to have multiple colors reflected from the surface of the combiner 602, a multiple wavelength holographic mirror maybe included on the combiner surface. For example, in a three-color embodiment, where red, green and blue pixels are generated in the image light, the holographic mirror may be reflective to wavelengths substantially matching the wavelengths of the red, green and blue light provided in the image light. This configuration can be used as a wavelength specific mirror where pre-determined wavelengths of light from the image light are reflected to the user's eye. This configuration may also be made such that substantially all other wavelengths in the visible pass through the combiner element 602 so the user has a substantially clear view of the environmental surroundings when looking through the combiner element 602. The transparency between the user's eye and the surrounding may be approximately 80% when using a combiner that is a holographic mirror. Wherein holographic mirrors can be made using lasers to produce interference patterns in the holographic material of the combiner where the wavelengths of the lasers correspond to the wavelengths of light that are subsequently reflected by the holographic mirror.

In another embodiment, the combiner element 602 may include a notch mirror comprised of a multilayer coated substrate wherein the coating is designed to substantially reflect the wavelengths of light provided in the image light by the light source and substantially transmit the remaining wavelengths in the visible spectrum. For example, in the case where red, green and blue light is provided by the light source in the upper optics to enable full color images to be provided to the user, the notch mirror is a tristimulus notch mirror wherein the multilayer coating is designed to substantially reflect narrow bands of red, green and blue light that are matched to the what is provided by the light source and the remaining visible wavelengths are substantially transmitted through the coating to enable a view of the environment through the combiner. In another example where monochrome images are provided to the user, the notch mirror is designed to reflect a single narrow band of light that is matched to the wavelength range of the image light provided by the upper optics while transmitting the remaining visible wavelengths to enable a see-thru view of the environment. The combiner 602 with the notch mirror would operate, from the user's perspective, in a manner similar to the combiner that includes a holographic pattern on the combiner element 602. The combiner, with the tristimulus notch mirror, would reflect image light associated with pixels, to the eye because of the match between the reflective wavelengths of the notch mirror and the wavelengths or color of the image light, and the wearer would simultaneously be able to see with high clarity the environmental surroundings. The transparency between the user's eye and the surrounding may be approximately 80% when using the tristimulus notch mirror. In addition, the image provided with the notch mirror combiner can provide higher contrast images than the holographic mirror combiner because the notch mirror acts in a purely reflective manner compared to the holographic mirror which operates through diffraction, and as such the notch mirror is subject to less scattering of the imaging light by the combiner. In another embodiment, the combiner element 602 may include a simple partial mirror that reflects a portion (e.g. 50%) of all wavelengths of light in the visible.

Image light can escape through the combiner 602 and may produce face glow from the optics shown in FIG. 3, as the escaping image light is generally directed downward onto the cheek of the user. When using a holographic mirror combiner or a tristimulus notch mirror combiner, the escaping light can be trapped to avoid face glow. In embodiments, if the image light is polarized before the combiner, a linear polarizer can be laminated, or otherwise associated, to the combiner, with the transmission axis of the polarizer oriented relative to the polarized image light so that any escaping image light is absorbed by the polarizer. In embodiments, the image light would be polarized to provide S polarized light to the combiner for better reflection. As a result, the linear polarizer on the combiner would be oriented to absorb S polarized light and pass P polarized light. This provides the preferred orientation of polarized sunglasses as well.

If the image light is unpolarized, a microlouvered film such as a privacy filter can be used to absorb the escaping image light while providing the user with a see-thru view of the environment. In this case, the absorbance or transmittance of the microlouvered film is dependent on the angle of the light. Where steep angle light is absorbed and light at less of an angle is transmitted. For this reason, in an embodiment, the combiner with the microlouver film is angled at greater than 45 degrees to the optical axis of the image light (e.g. the combiner can be oriented at 50 degrees so the image light from the file lens is incident on the combiner at an oblique angle.

Figure 4:
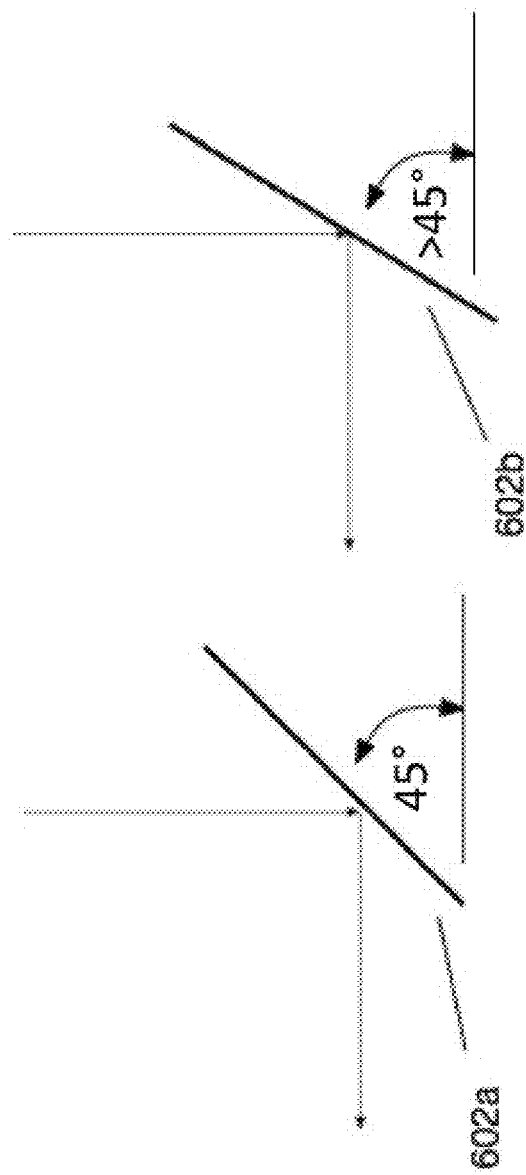
FIG. 4 illustrates angles of combiner elements in accordance with the principles of the present disclosure.

FIG. 4 illustrates an embodiment of a combiner element 602 at various angles when the combiner element 602 includes a holographic mirror. Normally, a mirrored surface reflects light at an angle equal to the angle that the light is incident to the mirrored surface. Typically, this necessitates that the combiner element be at 45 degrees, 602a, if the light is presented vertically to the combiner so the light can be reflected horizontally towards the wearer's eye. In embodiments, the incident light can be presented at angles other than vertical to enable the mirror surface to be oriented at other than 45 degrees, but in all cases wherein a mirrored surface is employed (including the tristimulus notch mirror described previously), the incident angle equals the reflected angle. As a result, increasing the angle of the combiner 602a requires that the incident image light be presented to the combiner 602a at a different angle which positions the upper optical module 202 to the left of the combiner as shown in FIG. 4. In contrast, a holographic mirror combiner, included in embodiments, can be made such that light is reflected at a different angle from the angle that the light is incident onto the holographic mirrored surface. This allows freedom to select the angle of the combiner element 602b independent of the angle of the incident image light and the angle of the light reflected into the wearer's eye. In embodiments, the angle of the combiner element 602b is greater than 45 degrees (shown in FIG. 4) as this allows a more laterally compact HWC design. The increased angle of the combiner element 602b decreases the front to back width of the lower optical module 204 and may allow for a thinner HWC display (i.e. the furthest element from the wearer's eye can be closer to the wearer's face).

Figure 5:
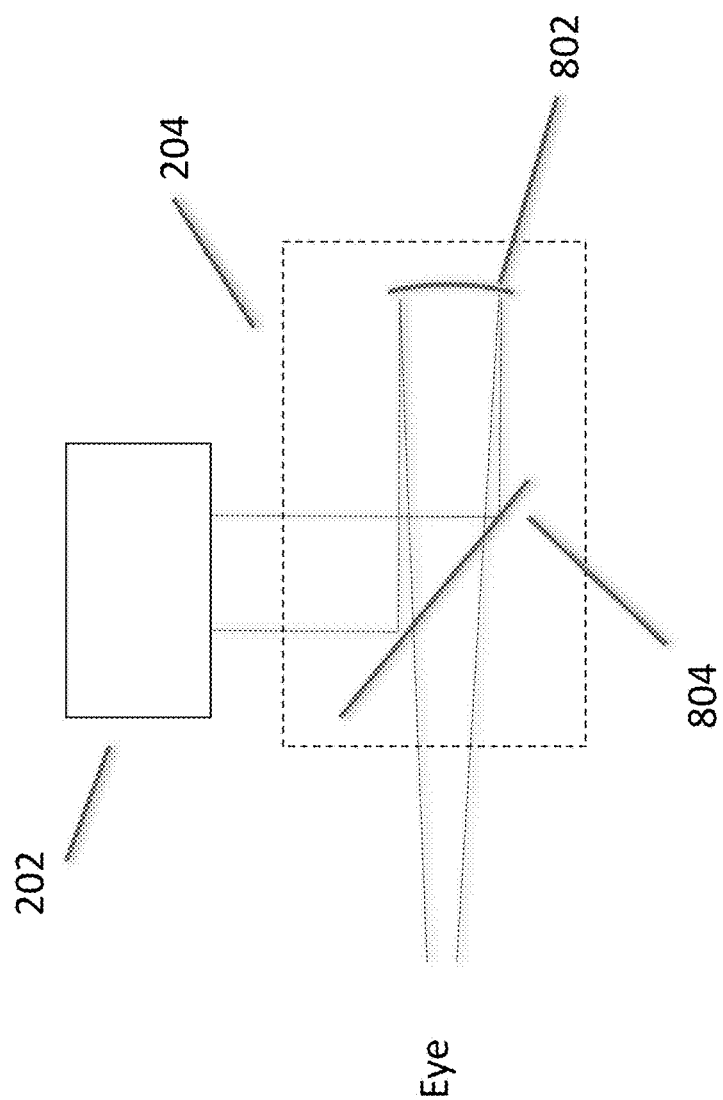
FIG. 5 illustrates upper and lower optical modules in accordance with the principles of the present disclosure.

FIG. 5 illustrates another embodiment of a lower optical module 204. In this embodiment, polarized or unpolarized image light provided by the upper optical module 202, is directed into the lower optical module 204. The image light reflects off a partial mirror 804 (e.g. polarized mirror, notch mirror, holographic mirror, etc.) and is directed toward a curved partially reflective mirror 802. The curved partial mirror 802 then reflects the image light back towards the user's eye, which passes through the partial mirror 804. The user can also see through the partial mirror 804 and the curved partial mirror 802 to see the surrounding environment. As a result, the user perceives a combined image comprised of the displayed image light overlaid onto the see-thru view of the environment. In a preferred embodiment, the partial mirror 804 and the curved partial mirror 802 are both non-polarizing so that the transmitted light from the surrounding environment is unpolarized so that rainbow interference patterns are eliminated when looking at polarized light in the environment such as provided by a computer monitor or in the reflected light from a lake.

While many of the embodiments of the present disclosure have been referred to as upper and lower modules containing certain optical components, it should be understood that the image light production and management functions described in connection with the upper module may be arranged to direct light in other directions (e.g. upward, sideward, etc.). In embodiments, it may be preferred to mount the upper module 202 above the wearer's eye, in which case the image light would be directed downward. In other embodiments it may be preferred to produce light from the side of the wearer's eye, or from below the wearer's eye. In addition, the lower optical module is generally configured to deliver the image light to the wearer's eye and allow the wearer to see through the lower optical module, which may be accomplished through a variety of optical components.

Figure 6:
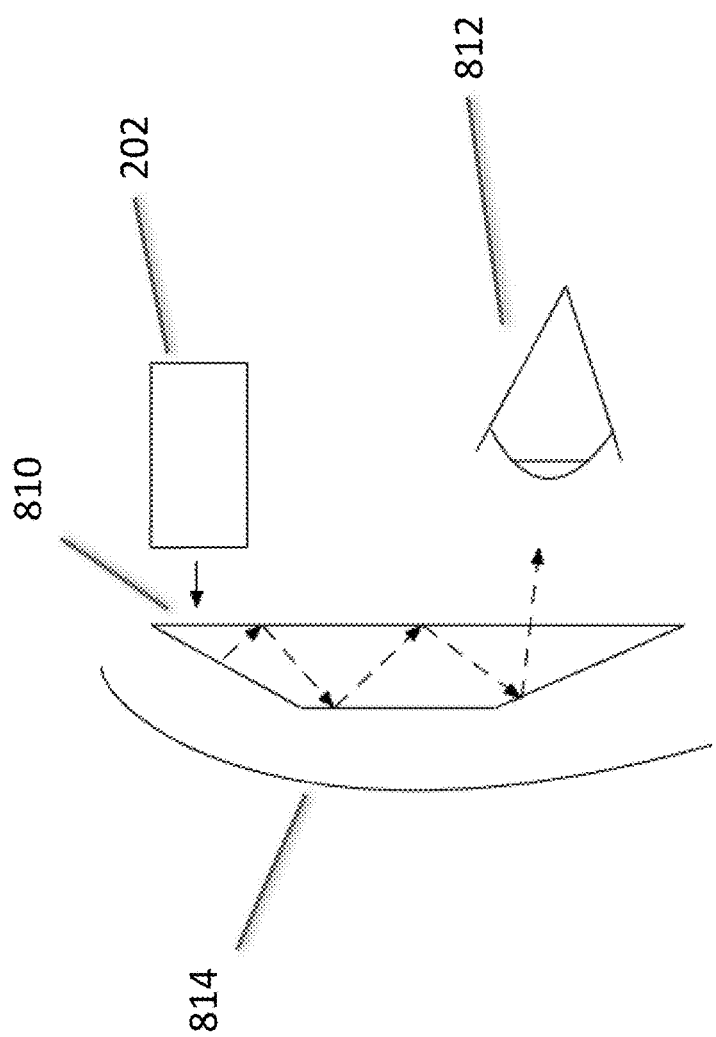
FIG. 6 illustrates upper and lower optical modules in accordance with the principles of the present disclosure.

FIG. 6 illustrates an embodiment of the present disclosure where the upper optical module 202 is arranged to direct image light into a total internal reflection (TIR) waveguide 810. In this embodiment, the upper optical module 202 is positioned above the wearer's eye 812 and the light is directed horizontally into the TIR waveguide 810. The TIR waveguide is designed to internally reflect the image light in a series of downward TIR reflections until it reaches the portion in front of the wearer's eye, where the light passes out of the TIR waveguide 812 in a direction toward the wearer's eye. In this embodiment, an outer shield 814 may be positioned in front of the TIR waveguide 810.

Figure 7:
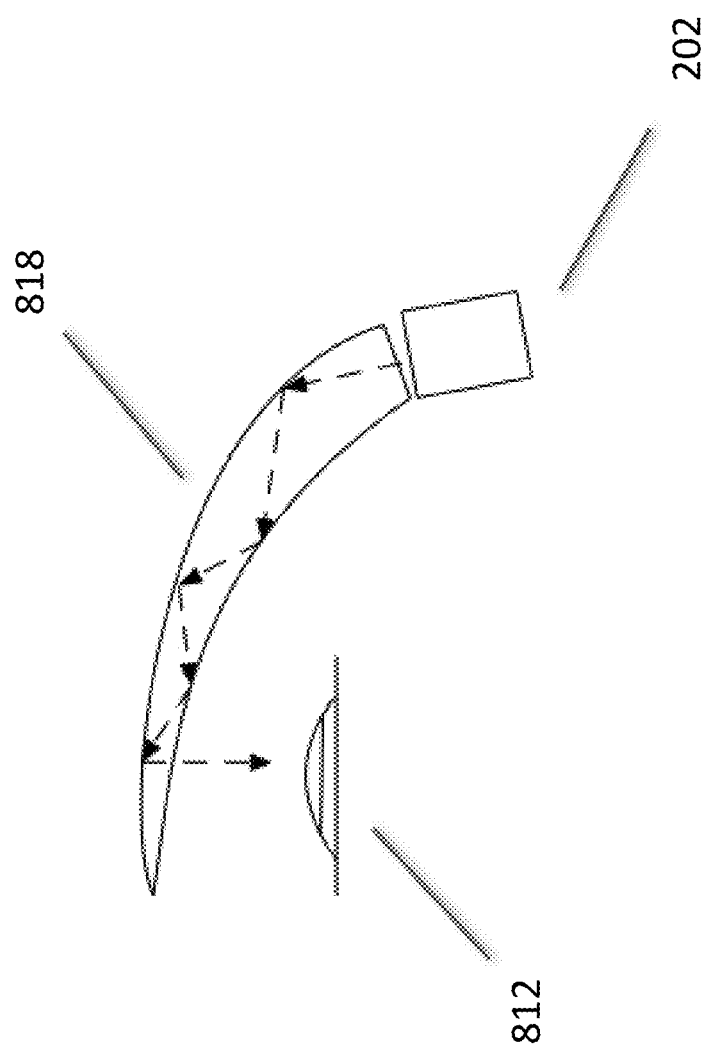
FIG. 7 illustrates upper and lower optical modules in accordance with the principles of the present disclosure.

FIG. 7 illustrates an embodiment of the present disclosure where the upper optical module 202 is arranged to direct image light into a TIR waveguide 818. In this embodiment, the upper optical module 202 is arranged on the side of the TIR waveguide 818. For example, the upper optical module may be positioned in the arm or near the arm of the HWC when configured as a pair of head worn glasses. The TIR waveguide 818 is designed to internally reflect the image light in a series of TIR reflections until it reaches the portion in front of the wearer's eye, where the light passes out of the TIR waveguide 818 in a direction toward the wearer's eye 812.

Figure 8:
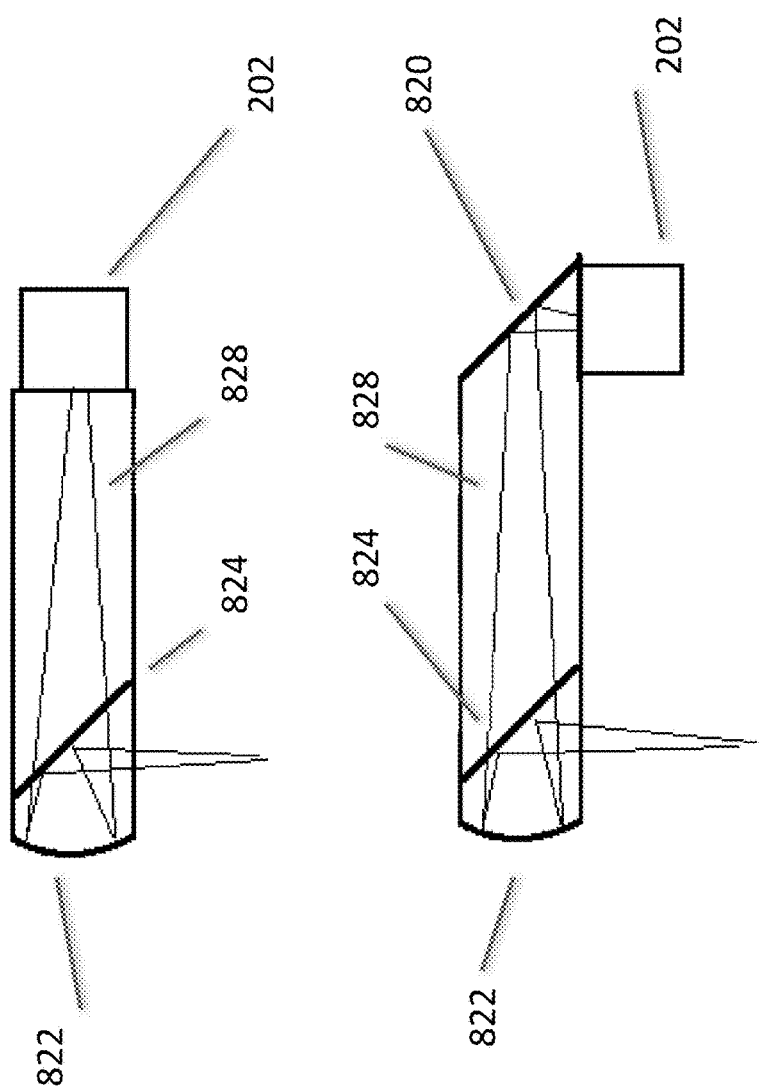
FIG. 8 illustrates upper and lower optical modules in accordance with the principles of the present disclosure.

FIG. 8 illustrates yet further embodiments of the present disclosure where an upper optical module 202 directs polarized image light into an optical guide 828 where the image light passes through a polarized reflector 824, changes polarization state upon reflection of the optical element 822 which includes a ¼ wave film for example and then is reflected by the polarized reflector 824 towards the wearer's eye, due to the change in polarization of the image light. The upper optical module 202 may be positioned behind the optical guide 828 wherein the image light is directed toward a mirror 820 that reflects the image light along the optical guide 828 and towards the polarized reflector 824. Alternatively, in other embodiments, the upper optical module 202 may direct the image light directly along the optical guide 828 and towards the polarized reflector 824. It should be understood that the present disclosure comprises other optical arrangements intended to direct image light into the wearer's eye.

Figure 9:
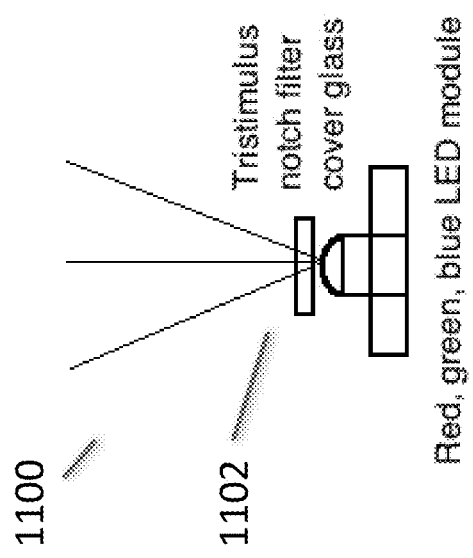
FIGS. 9, 10a, 10b and 11 illustrate light sources and filters in accordance with the principles of the present disclosure.
Figure 10A:
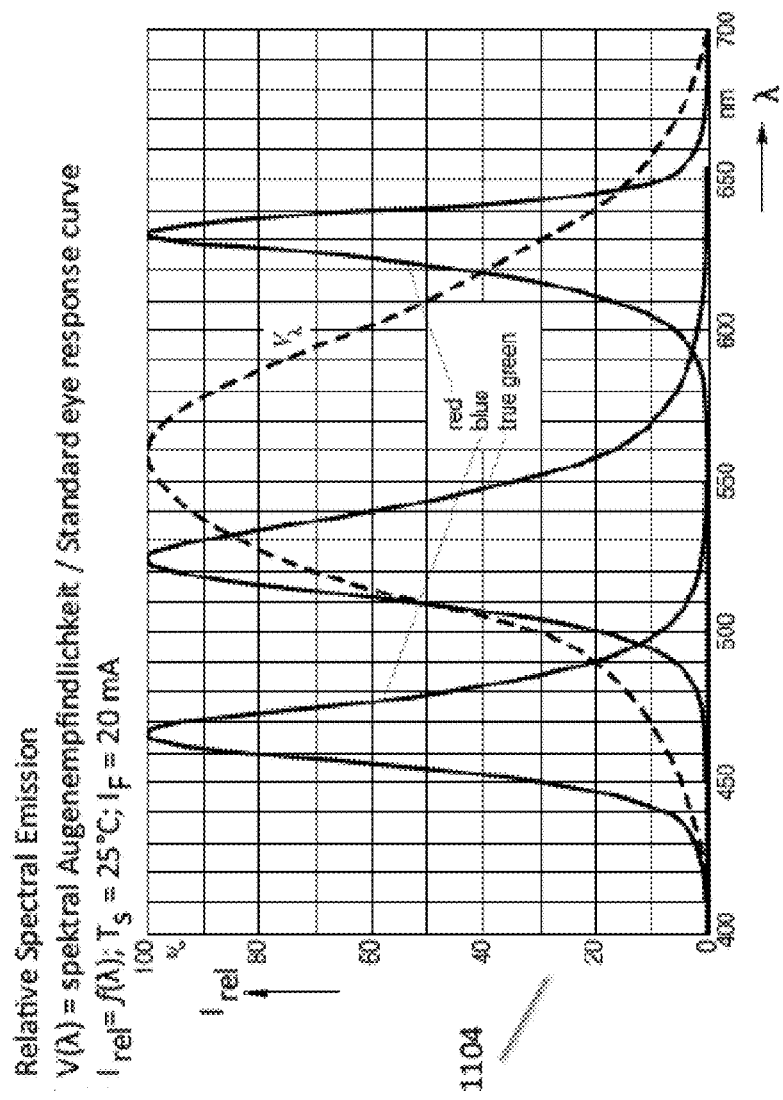
Figure 10B:
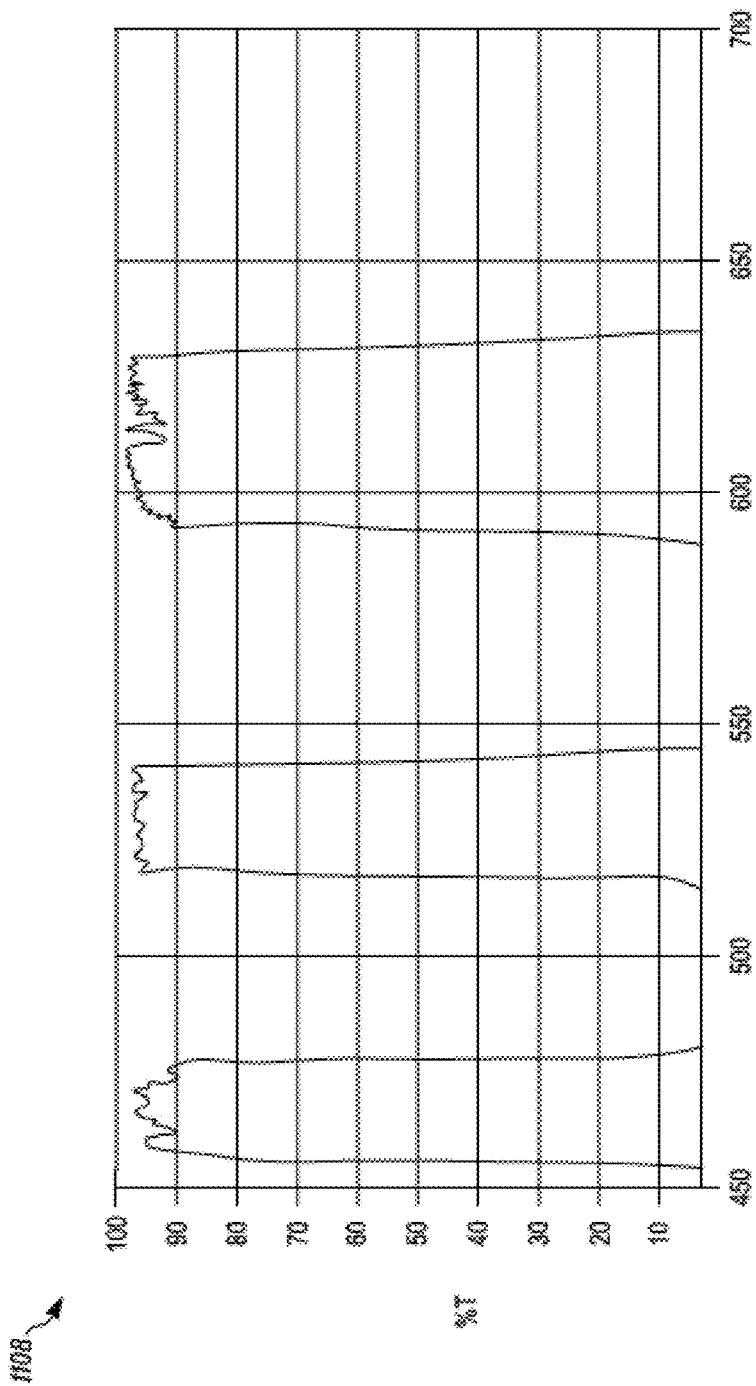
Figure 11:
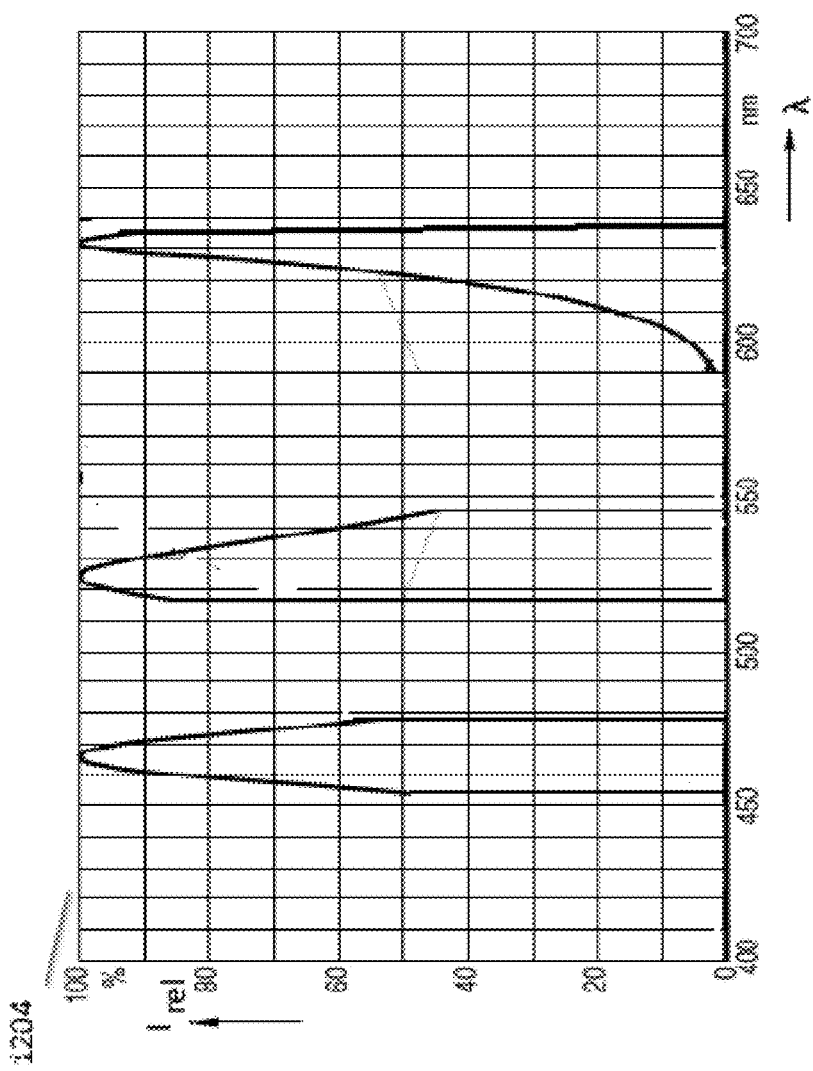

FIG. 9 illustrates a light source 1100 that may be used in association with the upper optics module 202. In embodiments, the light source 1100 may provide light to a backlighting optical system that is associated with the light source 1100 and which serves to homogenize the light and thereby provide uniform illuminating light to an image source in the upper optics. In embodiments, the light source 1100 includes a tristimulus notch filter 1102. The tristimulus notch filter 1102 has narrow band pass filters for three wavelengths, as indicated in FIG. 10b in a transmission graph 1108. The graph shown in FIG. 10a, as 1104 illustrates an output of three different colored LEDs. One can see that the bandwidths of emission are narrow, but they have long tails. The tristimulus notch filter 1102 can be used in connection with such LEDs to provide a light source 1100 that emits narrow filtered wavelengths of light as shown in FIG. 11 as the transmission graph 1110. Wherein the clipping effects of the tristimulus notch filter 1102 can be seen to have cut the tails from the LED emission graph 1104 to provide narrower wavelength bands of light to the upper optical module 202. The light source 1100 can be used in connection with a matched combiner 602 that includes a holographic mirror or tristimulus notch mirror that substantially reflects the narrow bands of image light toward the wearer's eye with a reduced amount of image light that does not get reflected by the combiner, thereby improving efficiency of the head-worn computer (HWC) or head-mounted display (HMD) and reducing escaping light that can cause faceglow.

Figure 12A:
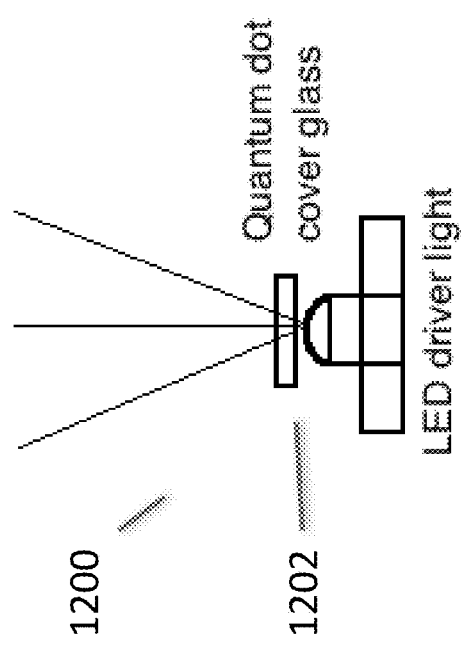
FIGS. 12a to 12c illustrate light sources and quantum dot systems in accordance with the principles of the present disclosure.
Figure 12B:
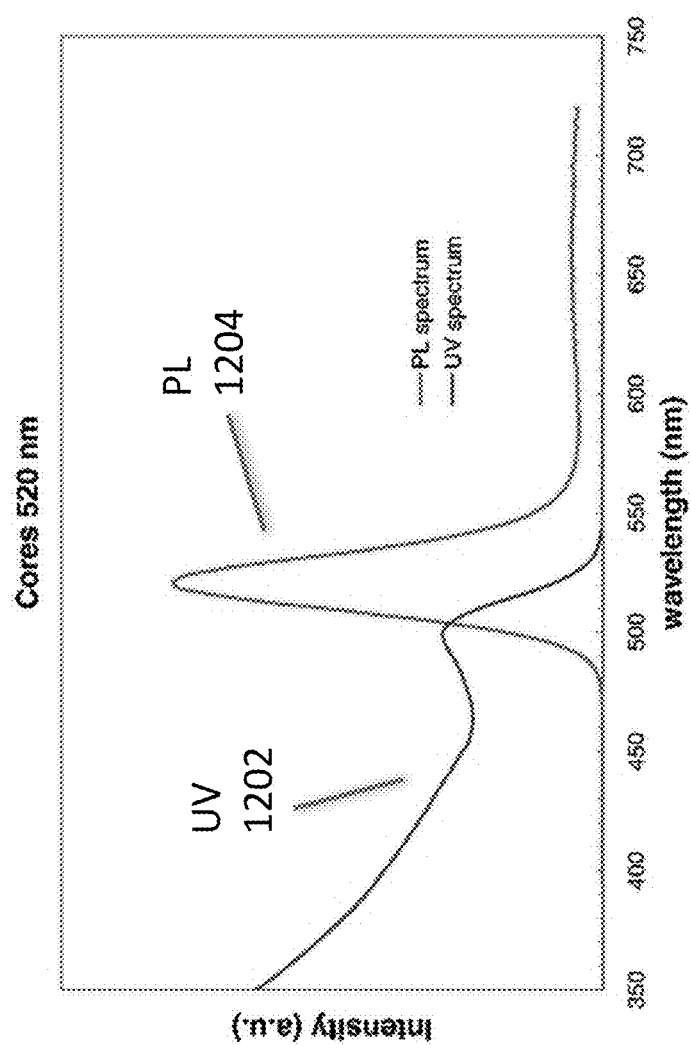
Figure 12C:
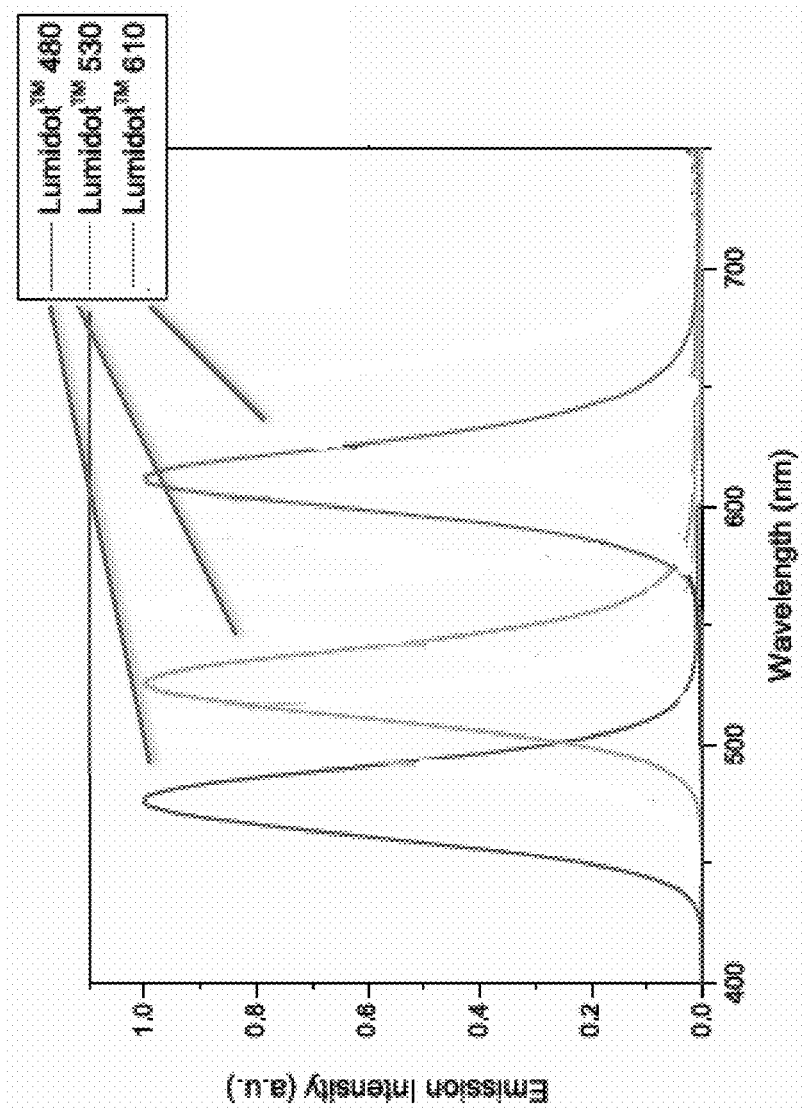

FIG. 12a illustrates another light source 1200 that may be used in association with the upper optics module 202. In embodiments, the light source 1200 may provide light to a backlighting optical system that homogenizes the light prior to illuminating the image source in the upper optics as described previously herein. In embodiments, the light source 1200 includes a quantum dot cover glass 1202. Where the quantum dots absorb light of a shorter wavelength and emit light of a longer wavelength (FIG. 12b shows an example wherein a UV spectrum applied to a quantum dot results in the quantum dot emitting a narrow band shown as a PL spectrum 1204) that is dependent on the material makeup and size of the quantum dot. As a result, quantum dots in the quantum dot cover glass 1202 can be tailored to provide one or more bands of narrow bandwidth light (e.g. red, green and blue emissions dependent on the different quantum dots included as illustrated in the graph shown in FIG. 12c where three different quantum dots are used. In embodiments, the LED driver light emits UV light, deep blue or blue light. For sequential illumination of different colors, multiple light sources 1200 would be used where each light source 1200 would include a quantum dot cover glass 1202 with at least one type of quantum dot selected to emit at one of each of the desired colors. The light source 1100 can be used in connection with a combiner 602 with a holographic mirror or tristimulus notch mirror to provide narrow bands of image light that are reflected toward the wearer's eye with less wasted image light that does not get reflected.

Another aspect of the present disclosure relates to the generation of peripheral image lighting effects for a person wearing a HWC. In embodiments, a solid-state lighting system (e.g. LED, OLED, etc), or other lighting system, may be included inside the optical elements of a lower optical module 204. The solid-state lighting system may be arranged such that lighting effects outside of a field of view (FOV) associated with displayed digital content is presented to create an immersive effect for the person wearing the HWC. To this end, the lighting effects may be presented to any portion of the HWC that is visible to the wearer. The solid-state lighting system may be digitally controlled by an integrated processor on the HWC. In embodiments, the integrated processor will control the lighting effects in coordination with digital content that is presented within the FOV of the HWC. For example, a movie, picture, game, or other content, may be displayed or playing within the FOV of the HWC. The content may show a bomb blast on the right side of the FOV and at the same moment, the solid-state lighting system inside of the upper module optics may flash quickly in concert with the FOV image effect. The effect may not be fast, it may be more persistent to indicate, for example, a general glow or color on one side of the user. The solid state lighting system may be color controlled, with red, green and blue LEDs, for example, such that color control can be coordinated with the digitally presented content within the field of view.

Figure 13A:
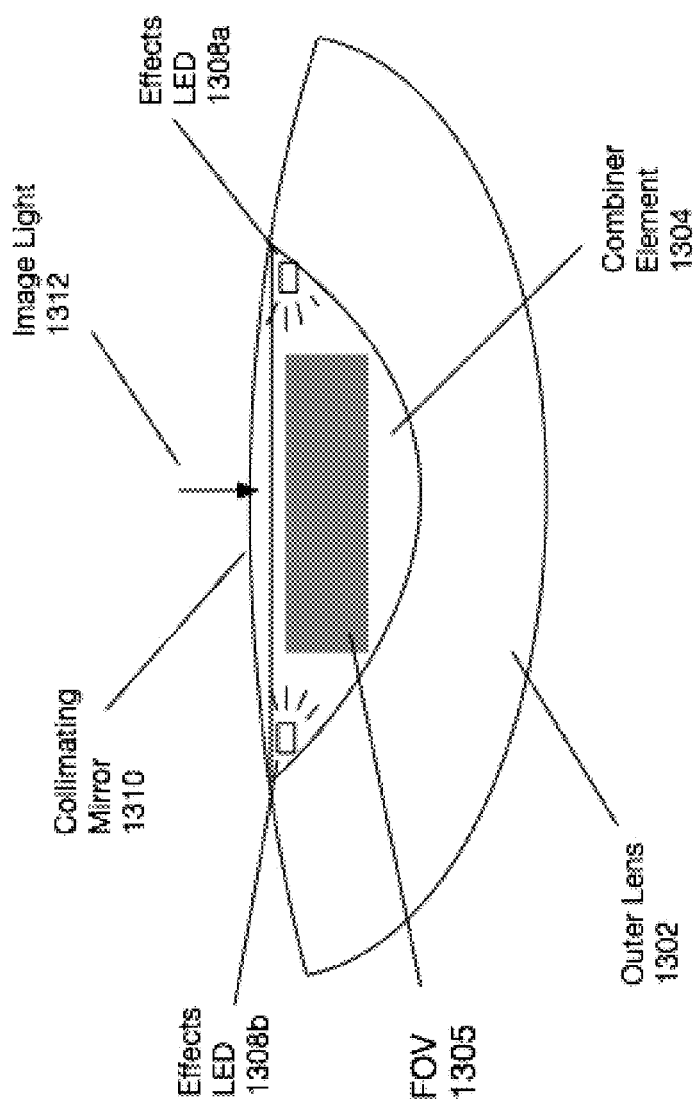

FIG. 13a illustrates optical components of a lower optical module 204 together with an outer lens 1302. FIG. 13a also shows an embodiment including effects LED's 1308a and 1308b. FIG. 13a illustrates image light 1312, as described herein elsewhere, directed into the upper optical module where it will reflect off of the combiner element 1304, as described herein elsewhere. The combiner element 1304 in this embodiment is angled towards the wearer's eye at the top of the module and away from the wearer's eye at the bottom of the module, as also illustrated and described in connection with FIG. 8 (e.g. at a 45 degree angle). The image light 1312 provided by an upper optical module 202 (not shown in FIG. 13a) reflects off of the combiner element 1304 towards the collimating mirror 1310, away from the wearer's eye, as described herein elsewhere. The image light 1312 then reflects and focuses off of the collimating mirror 1304, passes back through the combiner element 1304, and is directed into the wearer's eye. The wearer can also view the surrounding environment through the transparency of the combiner element 1304, collimating mirror 1310, and outer lens 1302 (if it is included). As described herein elsewhere, the image light may or may not be polarized and the see-through view of the surrounding environment is preferably non-polarized to provide a view of the surrounding environment that does not include rainbow interference patterns if the light from the surrounding environment is polarized such as from a computer monitor or reflections from a lake. The wearer will generally perceive that the image light forms an image in the FOV 1305. In embodiments, the outer lens 1302 may be included. The outer lens 1302 is an outer lens that may or may not be corrective and it may be designed to conceal the lower optical module components in an effort to make the HWC appear to be in a form similar to standard glasses or sunglasses.

In the embodiment illustrated in FIG. 13a, the effects LEDs 1308a and 1308b are positioned at the sides of the combiner element 1304 and the outer lens 1302 and/or the collimating mirror 1310. In embodiments, the effects LEDs 1308a are positioned within the confines defined by the combiner element 1304 and the outer lens 1302 and/or the collimating mirror. The effects LEDs 1308a and 1308b are also positioned outside of the FOV 1305 associated with the displayed digital content. In this arrangement, the effects LEDs 1308a and 1308b can provide lighting effects within the lower optical module outside of the FOV 1305. In embodiments the light emitted from the effects LEDs 1308a and 1308b may be polarized and the outer lens 1302 may include a polarizer such that the light from the effects LEDs 1308a and 1308b will pass through the combiner element 1304 toward the wearer's eye and will be absorbed by the outer lens 1302. This arrangement provides peripheral lighting effects to the wearer in a more private setting by not transmitting the lighting effects through the front of the HWC into the surrounding environment. However, in other embodiments, the effects LEDs 1308a and 1308b may be non-polarized so the lighting effects provided are made to be purposefully viewable by others in the environment for entertainment such as giving the effect of the wearer's eye glowing in correspondence to the image content being viewed by the wearer.

Figure 13B:
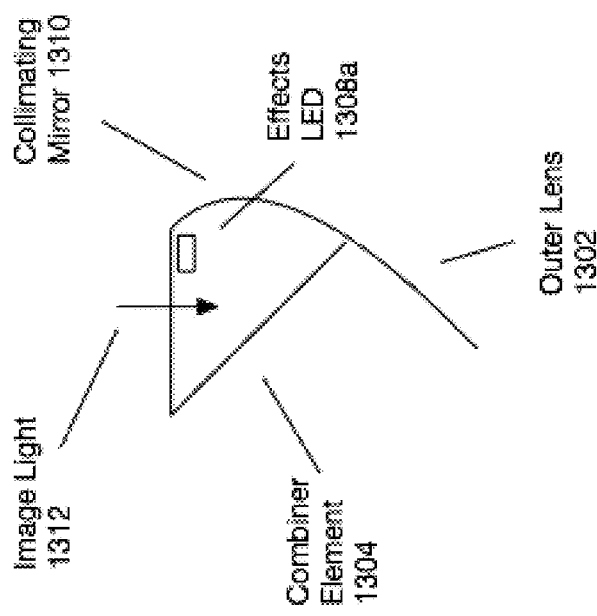

FIG. 13b illustrates a cross section of the embodiment described in connection with FIG. 13a. As illustrated, the effects LED 1308a is located in the upper-front area inside of the optical components of the lower optical module. It should be understood that the effects LED 1308a position in the described embodiments is only illustrative and alternate placements are encompassed by the present disclosure. Additionally, in embodiments, there may be one or more effects LEDs 1308a in each of the two sides of HWC to provide peripheral lighting effects near one or both eyes of the wearer.

FIG. 13c illustrates an embodiment where the combiner element 1304 is angled away from the eye at the top and towards the eye at the bottom (e.g. in accordance with the holographic or notch filter embodiments described herein). In this embodiment, the effects LED 1308a may be located on the outer lens 1302 side of the combiner element 1304 to provide a concealed appearance of the lighting effects. As with other embodiments, the effects LED 1308a of FIG. 13c may include a polarizer such that the emitted light can pass through a polarized element associated with the combiner element 1304 and be blocked by a polarized element associated with the outer lens 1302. Alternatively the effects LED 13087a can be configured such that at least a portion of the light is reflected away from the wearer's eye so that it is visible to people in the surrounding environment. This can be accomplished for example by using a combiner 1304 that is a simple partial mirror so that a portion of the image light 1312 is reflected toward the wearer's eye and a first portion of the light from the effects LED 13087a is transmitted toward the wearer's eye and a second portion of the light from the effects LED 1308a is reflected outward toward the surrounding environment.

FIGS. 14a, 14b, 14c and 14d show illustrations of a HWC that includes eye covers 1402 to restrict loss of image light to the surrounding environment and to restrict the ingress of stray light from the environment. Where the eye covers 1402 can be removably attached to the HWC with magnets 1404. Another aspect of the present disclosure relates to automatically configuring the lighting system(s) used in the HWC 102. In embodiments, the display lighting and/or effects lighting, as described herein, may be controlled in a manner suitable for when an eye cover 1402 is attached or removed from the HWC 102. For example, at night, when the light in the environment is low, the lighting system(s) in the HWC may go into a low light mode to further control any amounts of stray light escaping from the HWC and the areas around the HWC. Covert operations at night, while using night vision or standard vision, may require a solution which prevents as much escaping light as possible so a user may clip on the eye cover(s) 1402 and then the HWC may go into a low light mode. The low light mode may, in some embodiments, only go into a low light mode when the eye cover 1402 is attached if the HWC identifies that the environment is in low light conditions (e.g. through environment light level sensor detection). In embodiments, the low light level may be determined to be at an intermediate point between full and low light dependent on environmental conditions.

Another aspect of the present disclosure relates to automatically controlling the type of content displayed in the HWC when eye covers 1402 are attached or removed from the HWC. In embodiments, when the eye cover(s) 1402 is attached to the HWC, the displayed content may be restricted in amount or in color amounts. For example, the display(s) may go into a simple content delivery mode to restrict the amount of information displayed. This may be done to reduce the amount of light produced by the display(s). In an embodiment, the display(s) may change from color displays to monochrome displays to reduce the amount of light produced. In an embodiment, the monochrome lighting may be red to limit the impact on the wearer's eyes to maintain an ability to see better in the dark.

Another aspect of the present disclosure relates to a system adapted to quickly convert from a see-through system to a non-see-through or very low transmission see-through system for a more immersive user experience. The conversion system may include replaceable lenses, an eye cover, and optics adapted to provide user experiences in both modes. The outer lenses, for example, may be 'blacked-out' with an opaque cover 1412 to provide an experience where all of the user's attention is dedicated to the digital content and then the outer lenses may be switched out for high see-through lenses so the digital content is augmenting the user's view of the surrounding environment. Another aspect of the disclosure relates to low transmission outer lenses that permit the user to see through the outer lenses but remain dark enough to maintain most of the user's attention on the digital content. The slight see-through can provide the user with a visual connection to the surrounding environment and this can reduce or eliminate nausea and other problems associated with total removal of the surrounding view when viewing digital content.

FIG. 14d illustrates a head-worn computer system 102 with a see-through digital content display 204 adapted to include a removable outer lens 1414 and a removable eye cover 1402. The eye cover 1402 may be attached to the head-worn computer 102 with magnets 1404 or other attachment systems (e.g. mechanical attachments, a snug friction fit between the arms of the head-worn computer 102, etc.). The eye cover 1402 may be attached when the user wants to cut stray light from escaping the confines of the head-worn computer, create a more immersive experience by removing the otherwise viewable peripheral view of the surrounding environment, etc. The removable outer lens 1414 may be of several varieties for various experiences. It may have no transmission or a very low transmission to create a dark background for the digital content, creating an immersive experience for the digital content. It may have a high transmission so the user can see through the see-through display and the outer lens 1414 to view the surrounding environment, creating a system for a heads-up display, augmented reality display, assisted reality display, etc. The outer lens 1414 may be dark in a middle portion to provide a dark background for the digital content (i.e. dark backdrop behind the see-through field of view from the user's perspective) and a higher transmission area elsewhere. The outer lenses 1414 may have a transmission in the range of 2 to 5%, 5 to 10%, 10 to 20% for the immersion effect and above 10% or 20% for the augmented reality effect, for example. The outer lenses 1414 may also have an adjustable transmission to facilitate the change in system effect. For example, the outer lenses 1414 may be electronically adjustable tint lenses (e.g. liquid crystal or have crossed polarizers with an adjustment for the level of cross).

In embodiments, the eye cover 1402 may have areas of transparency or partial transparency to provide some visual connection with the user's surrounding environment. This may also reduce or eliminate nausea or other feelings associated with the complete removal of the view of the surrounding environment.

Figure 14A:
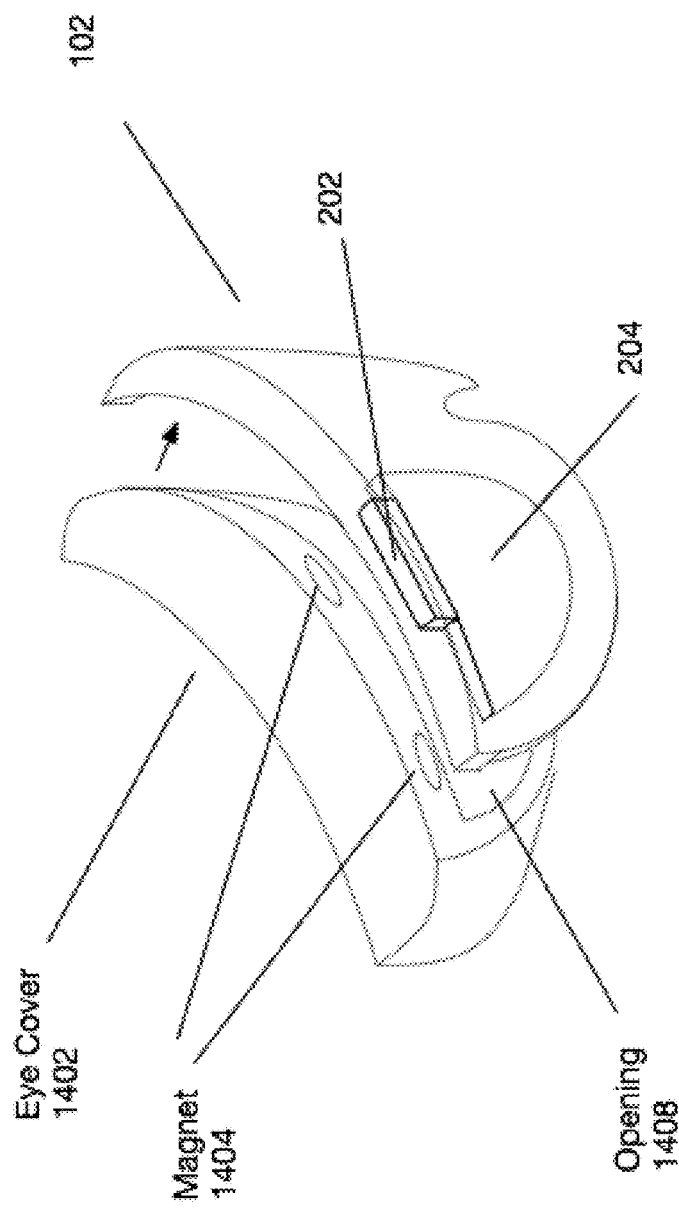
Figure 14C:
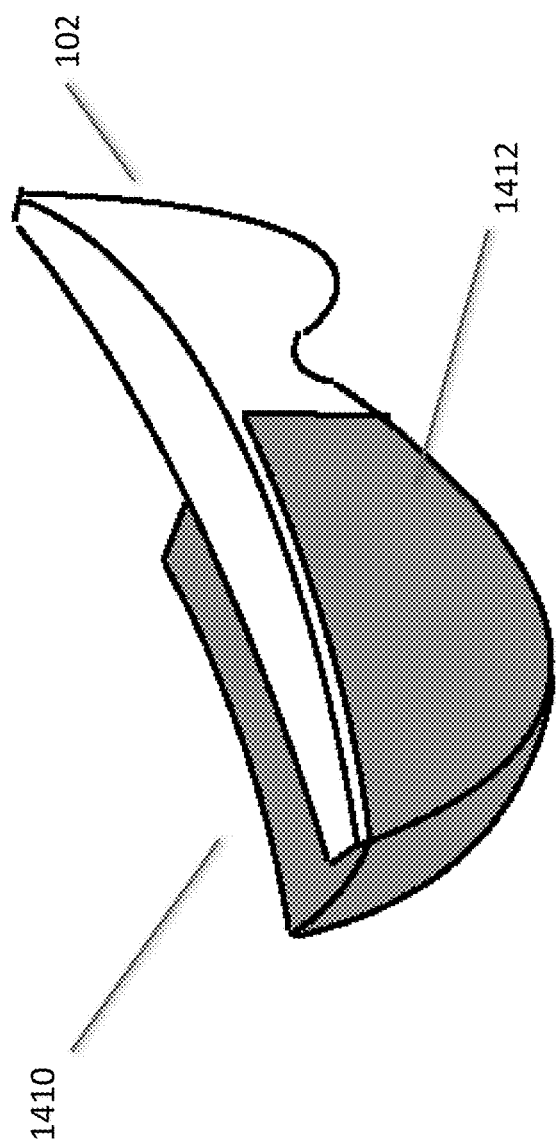
Figure 14E:
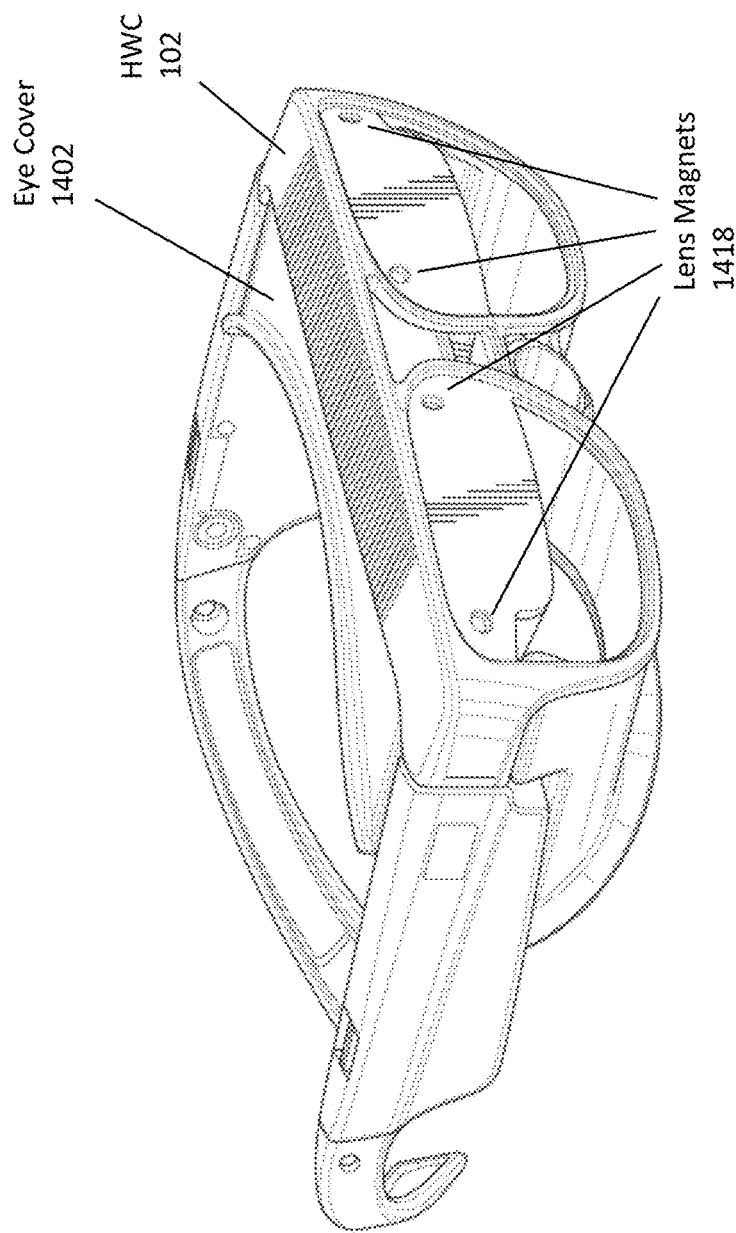

FIG. 14e illustrates a HWC 102 assembled with an eye cover 1402 without outer lenses in place. The outer lenses, in embodiments, may be held in place with magnets 1418 for ease of removal and replacement. In embodiments, the outer lenses may be held in place with other systems, such as mechanical systems.

Figure 14F:
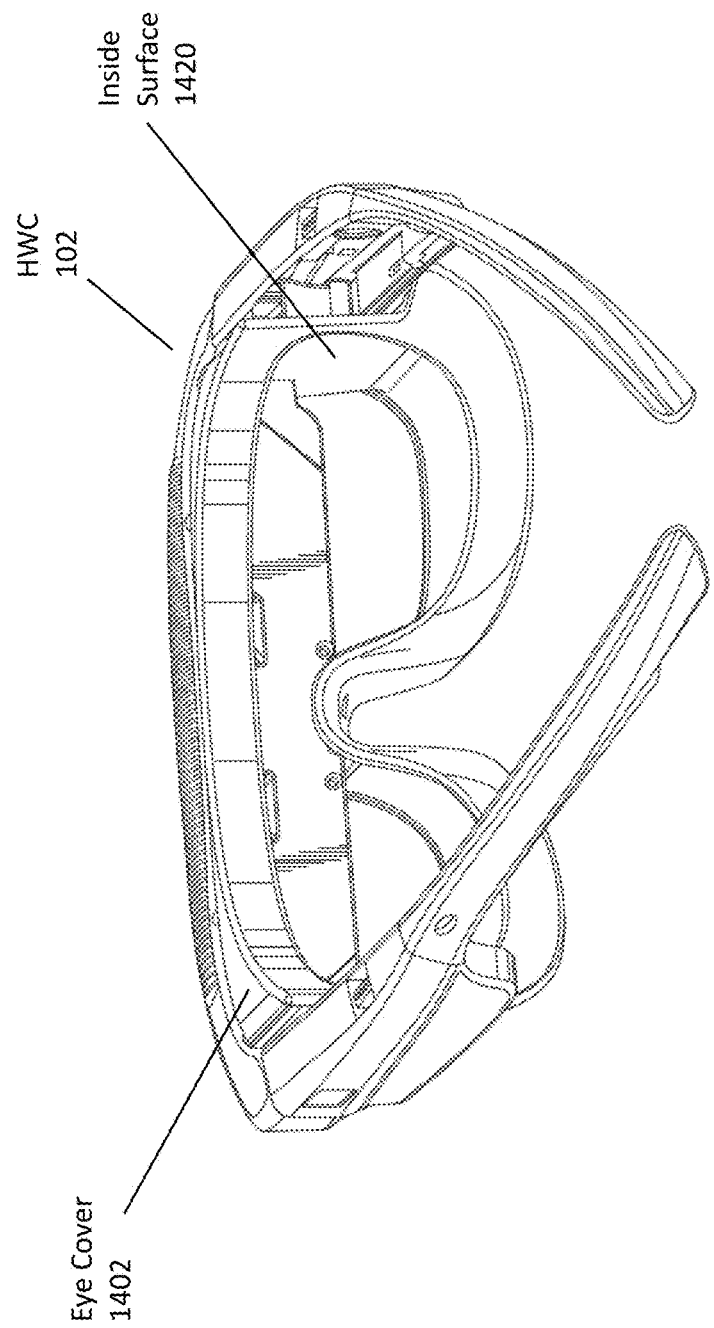

Another aspect of the present disclosure relates to an effects system that generates effects outside of the field of view in the see-through display of the head-worn computer. The effects may be, for example, lighting effects, sound effects, tactile effects (e.g. through vibration), air movement effects, etc. In embodiments, the effect generation system is mounted on the eye cover 1402. For example, a lighting system (e.g. LED(s), OLEDs, etc.) may be mounted on an inside surface 1420, or exposed through the inside surface 1420, as illustrated in FIG. 14f, such that they can create a lighting effect (e.g. a bright light, colored light, subtle color effect) in coordination with content being displayed in the field of view of the see-through display. The content may be a movie or a game, for example, and an explosion may happen on the right side of the content, as scripted, and matching the content, a bright flash may be generated by the effects lighting system to create a stronger effect. As another example, the effects system may include a vibratory system mounted near the sides or temples, or otherwise, and when the same explosion occurs, the vibratory system may generate a vibration on the right side to increase the user experience indicating that the explosion had a real sound wave creating the vibration. As yet a further example, the effects system may have an air system where the effect is a puff of air blown onto the user's face. This may create a feeling of closeness with some fast moving object in the content. The effects system may also have speakers directed towards the user's ears or an attachment for ear buds, etc.

In embodiments, the effects generated by the effects system may be scripted by an author to coordinate with the content. In embodiments, sensors may be placed inside of the eye cover to monitor content effects (e.g. a light sensor to measure strong lighting effects or peripheral lighting effects) that would than cause an effect(s) to be generated.

The effects system in the eye cover may be powered by an internal battery and the battery, in embodiments, may also provide additional power to the head-worn computer 102 as a back-up system. In embodiments, the effects system is powered by the batteries in the head-worn computer. Power may be delivered through the attachment system (e.g. magnets, mechanical system) or a dedicated power system.

The effects system may receive data and/or commands from the head-worn computer through a data connection that is wired or wireless. The data may come through the attachment system, a separate line, or through Bluetooth or other short range communication protocol, for example.

In embodiments, the eye cover 1402 is made of reticulated foam, which is very light and can contour to the user's face. The reticulated foam also allows air to circulate because of the open-celled nature of the material, which can reduce user fatigue and increase user comfort. The eye cover 1402 may be made of other materials, soft, stiff, pliable, etc. and may have another material on the periphery that contacts the face for comfort. In embodiments, the eye cover 1402 may include a fan to exchange air between an external environment and an internal space, where the internal space is defined in part by the face of the user. The fan may operate very slowly and at low power to exchange the air to keep the face of the user cool. In embodiments the fan may have a variable speed controller and/or a temperature sensor may be positioned to measure temperature in the internal space to control the temperature in the internal space to a specified range, temperature, etc. The internal space is generally characterized by the space confined space in front of the user's eyes and upper cheeks where the eye cover encloses the area.

Another aspect of the present disclosure relates to flexibly mounting an audio headset on the head-worn computer 102 and/or the eye cover 1402. In embodiments, the audio headset is mounted with a relatively rigid system that has flexible joint(s) (e.g. a rotational joint at the connection with the eye cover, a rotational joint in the middle of a rigid arm, etc.) and extension(s) (e.g. a telescopic arm) to provide the user with adjustability to allow for a comfortable fit over, in or around the user's ear. In embodiments, the audio headset is mounted with a flexible system that is more flexible throughout, such as with a wire-based connection.

FIG. 14g illustrates a head-worn computer 102 with removable lenses 1414 along with a mounted eye cover 1402. The head-worn computer, in embodiments, includes a see-through display (as disclosed herein). The eye cover 1402 also includes a mounted audio headset 1422. The mounted audio headset 1422 in this embodiment is mounted to the eye cover 1402 and has audio wire connections (not shown). In embodiments, the audio wires' connections may connect to an internal wireless communication system (e.g. Bluetooth, NFC, WiFi) to make connection to the processor in the head-worn computer. In embodiments, the audio wires may connect to a magnetic connector, mechanical connector or the like to make the connection.

FIG. 14h illustrates an unmounted eye cover 1402 with a mounted audio headset 1422. As illustrated, the mechanical design of the eye cover is adapted to fit onto the head-worn computer to provide visual isolation or partial isolation and the audio headset.

In embodiments, the eye cover 1402 may be adapted to be removably mounted on a head-worn computer 102 with a see-through computer display. An audio headset 1422 with an adjustable mount may be connected to the eye cover, wherein the adjustable mount may provide extension and rotation to provide a user of the head-worn computer with a mechanism to align the audio headset with an ear of the user. In embodiments, the audio headset includes an audio wire connected to a connector on the eye cover and the eye cover connector may be adapted to removably mate with a connector on the head-worn computer. In embodiments, the audio headset may be adapted to receive audio signals from the head-worn computer 102 through a wireless connection (e.g. Bluetooth, WiFi). As described elsewhere herein, the head-worn computer 102 may have a removable and replaceable front lens 1414. The eye cover 1402 may include a battery to power systems internal to the eye cover 1402. The eye cover 1402 may have a battery to power systems internal to the head-worn computer 102.

In embodiments, the eye cover 1402 may include a fan adapted to exchange air between an internal space, defined in part by the user's face, and an external environment to cool the air in the internal space and the user's face. In embodiments, the audio headset 1422 may include a vibratory system (e.g. a vibration motor, piezo motor, etc. in the armature and/or in the section over the ear) adapted to provide the user with a haptic feedback coordinated with digital content presented in the see-through computer display. In embodiments, the head-worn computer 102 includes a vibratory system adapted to provide the user with a haptic feedback coordinated with digital content presented in the see-through computer display.

In embodiments, the eye cover 1402 is adapted to be removably mounted on a head-worn computer with a see-through computer display. The eye cover 1402 may also include a flexible audio headset mounted to the eye cover 1402, wherein the flexibility provides the user of the head-worn computer 102 with a mechanism to align the audio headset with an ear of the user. In embodiments, the flexible audio headset is mounted to the eye cover 1402 with a magnetic connection. In embodiments, the flexible audio headset may be mounted to the eye cover 1402 with a mechanical connection.

In embodiments, the audio headset 1422 may be spring or otherwise loaded such that the head set presses inward towards the user's ears for a more secure fit.

Referring to FIG. 15, we now turn to describe a particular external user interface 104, referred to generally as a pen 1500. The pen 1500 is a specially designed external user interface 104 and can operate as a user interface, to many different styles of HWC 102. The pen 1500 generally follows the form of a conventional pen, which is a familiar user handled device and creates an intuitive physical interface for many of the operations to be carried out in the HWC system 100. The pen 1500 may be one of several user interfaces 104 used in connection with controlling operations within the HWC system 100. For example, the HWC 102 may watch for and interpret hand gestures 116 as control signals, where the pen 1500 may also be used as a user interface with the same HWC 102. Similarly, a remote keyboard may be used as an external user interface 104 in concert with the pen 1500. The combination of user interfaces or the use of just one control system generally depends on the operation(s) being executed in the HWC's system 100.

While the pen 1500 may follow the general form of a conventional pen, it contains numerous technologies that enable it to function as an external user interface 104. FIG. 15 illustrates technologies comprised in the pen 1500. As can be seen, the pen 1500 may include a camera 1508, which is arranged to view through lens 1502. The camera may then be focused, such as through lens 1502, to image a surface upon which a user is writing or making other movements to interact with the HWC 102. There are situations where the pen 1500 will also have an ink, graphite, or other system such that what is being written can be seen on the writing surface. There are other situations where the pen 1500 does not have such a physical writing system so there is no deposit on the writing surface, where the pen would only be communicating data or commands to the HWC 102. The lens 1502 configuration is described in greater detail herein. The function of the camera 1508 is to capture information from an unstructured writing surface such that pen strokes can be interpreted as intended by the user. To assist in the predication of the intended stroke path, the pen 1500 may include a sensor, such as an IMU 1512. Of course, the IMU could be included in the pen 1500 in its separate parts (e.g. gyro, accelerometer, etc.) or an IMU could be included as a single unit. In this instance, the IMU 1512 is used to measure and predict the motion of the pen 1500. In turn, the integrated microprocessor 1510 would take the IMU information and camera information as inputs and process the information to form a prediction of the pen tip movement.

The pen 1500 may also include a pressure monitoring system 1504, such as to measure the pressure exerted on the lens 1502. As will be described in greater detail herein, the pressure measurement can be used to predict the user's intention for changing the weight of a line, type of a line, type of brush, click, double click, and the like. In embodiments, the pressure sensor may be constructed using any force or pressure measurement sensor located behind the lens 1502, including for example, a resistive sensor, a current sensor, a capacitive sensor, a voltage sensor such as a piezoelectric sensor, and the like.

The pen 1500 may also include a communications module 1518, such as for bi-directional communication with the HWC 102. In embodiments, the communications module 1518 may be a short distance communication module (e.g. Bluetooth). The communications module 1518 may be security matched to the HWC 102. The communications module 1518 may be arranged to communicate data and commands to and from the microprocessor 1510 of the pen 1500. The microprocessor 1510 may be programmed to interpret data generated from the camera 1508, IMU 1512, and pressure sensor 1504, and the like, and then pass a command onto the HWC 102 through the communications module 1518, for example. In another embodiment, the data collected from any of the input sources (e.g. camera 1508, IMU 1512, pressure sensor 1504) by the microprocessor may be communicated by the communication module 1518 to the HWC 102, and the HWC 102 may perform data processing and prediction of the user's intention when using the pen 1500. In yet another embodiment, the data may be further passed on through a network 110 to a remote device 112, such as a server, for the data processing and prediction. The commands may then be communicated back to the HWC 102 for execution (e.g. display writing in the glasses display, make a selection within the UI of the glasses display, control a remote external device 112, control a local external device 108), and the like. The pen may also include memory 1514 for long or short term uses.

The pen 1500 may also include a number of physical user interfaces, such as quick launch buttons 1522, a touch sensor 1520, and the like. The quick launch buttons 1522 may be adapted to provide the user with a fast way of jumping to a software application in the HWC system 100. For example, the user may be a frequent user of communication software packages (e.g. email, text, Twitter, Instagram, Facebook, Google+, and the like), and the user may program a quick launch button 1522 to command the HWC 102 to launch an application. The pen 1500 may be provided with several quick launch buttons 1522, which may be user programmable or factory programmable. The quick launch button 1522 may be programmed to perform an operation. For example, one of the buttons may be programmed to clear the digital display of the HWC 102. This would create a fast way for the user to clear the screens on the HWC 102 for any reason, such as for example to better view the environment. The quick launch button functionality will be discussed in further detail below. The touch sensor 1520 may be used to take gesture style input from the user. For example, the user may be able to take a single finger and run it across the touch sensor 1520 to affect a page scroll.

The pen 1500 may also include a laser pointer 1524. The laser pointer 1524 may be coordinated with the IMU 1512 to coordinate gestures and laser pointing. For example, a user may use the laser 1524 in a presentation to help with guiding the audience with the interpretation of graphics and the IMU 1512 may, either simultaneously or when the laser 1524 is off, interpret the user's gestures as commands or data input.

FIG. 16 illustrates yet another embodiment of the present disclosure. FIG. 16 illustrates a watchband clip-on controller 2000. The watchband clip-on controller may be a controller used to control the HWC 102 or devices in the HWC system 100. The watchband clip-on controller 2000 has a fastener 2018 (e.g. rotatable clip) that is mechanically adapted to attach to a watchband, as illustrated at 2004.

The watchband controller 2000 may have quick launch interfaces 2008 (e.g. to launch applications and choosers as described herein), a touch pad 2014 (e.g. to be used as a touch style mouse for GUI control in a HWC 102 display) and a display 2012. The clip 2018 may be adapted to fit a wide range of watchbands so it can be used in connection with a watch that is independently selected for its function. The clip, in embodiments, is rotatable such that a user can position it in a desirable manner. In embodiments the clip may be a flexible strap. In embodiments, the flexible strap may be adapted to be stretched to attach to a hand, wrist, finger, device, weapon, and the like.

In embodiments, the watchband controller may be configured as a removable and replaceable watchband. For example, the controller may be incorporated into a band with a certain width, segment spacing's, etc. such that the watchband, with its incorporated controller, can be attached to a watch body. The attachment, in embodiments, may be mechanically adapted to attach with a pin upon which the watchband rotates. In embodiments, the watchband controller may be electrically connected to the watch and/or watch body such that the watch, watch body and/or the watchband controller can communicate data between them.

The watchband controller 2000 may have 3-axis motion monitoring (e.g. through an IMU, accelerometers, magnetometers, gyroscopes, etc.) to capture user motion. The user motion may then be interpreted for gesture control.

In embodiments, the watchband controller 2000 may comprise fitness sensors and a fitness computer. The sensors may track heart rate, calories burned, strides, distance covered, and the like. The data may then be compared against performance goals and/or standards for user feedback.

Figure 17:
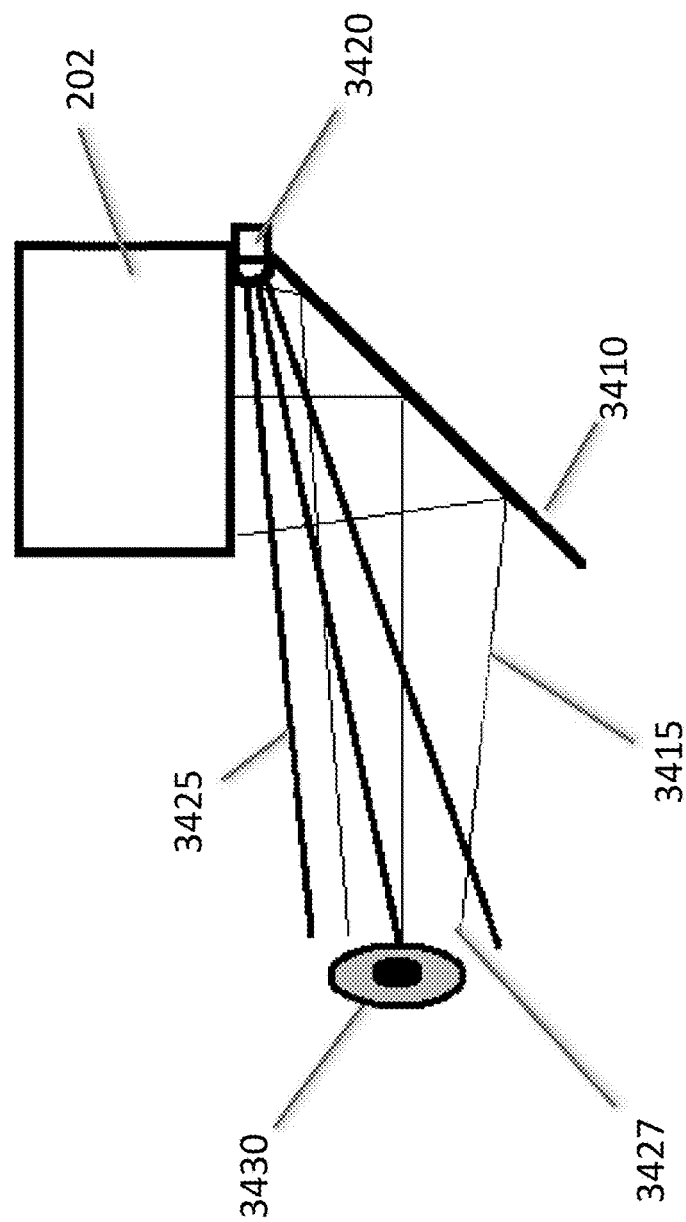
FIGS. 17 and 18 illustrate structured eye lighting systems according to the principles of the present disclosure.
Figure 18:
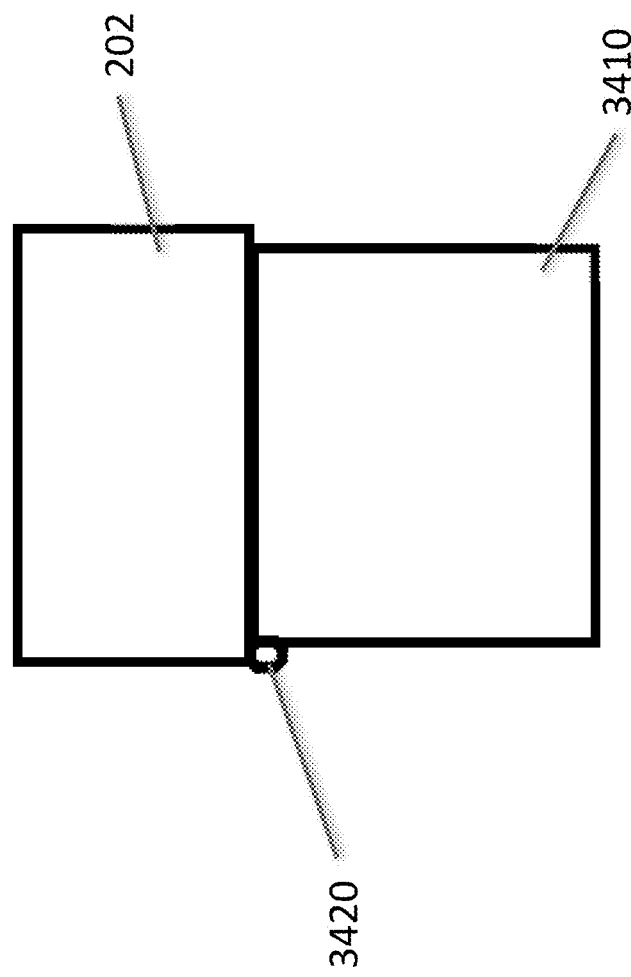

In embodiments directed to capturing images of the wearer's eye, light to illuminate the wearer's eye can be provided by several different sources including: light from the displayed image (i.e. image light); light from the environment that passes through the combiner or other optics; light provided by a dedicated eye light, etc. FIGS. 17 and 18 show illustrations of dedicated eye illumination lights 3420. FIG. 17 shows an illustration from a side view in which the dedicated illumination eye light 3420 is positioned at a corner of the combiner 3410 so that it doesn't interfere with the image light 3415. The dedicated eye illumination light 3420 is pointed so that the eye illumination light 3425 illuminates the eyebox 3427 where the eye 3430 is located when the wearer is viewing displayed images provided by the image light 3415. FIG. 18 shows an illustration from the perspective of the eye of the wearer to show how the dedicated eye illumination light 3420 is positioned at the corner of the combiner 3410. While the dedicated eye illumination light 3420 is shown at the upper left corner of the combiner 3410, other positions along one of the edges of the combiner 3410, or other optical or mechanical components, are possible as well. In other embodiments, more than one dedicated eye light 3420 with different positions can be used. In an embodiment, the dedicated eye light 3420 is an infrared light that is not visible by the wearer (e.g. 800 nm) so that the eye illumination light 3425 doesn't interfere with the displayed image perceived by the wearer.

In embodiments, the eye imaging camera is inline with the image light optical path, or part of the image light optical path. For example, the eye camera may be positioned in the upper module to capture eye image light that reflects back through the optical system towards the image display. The eye image light may be captured after reflecting off of the image source (e.g. in a DLP configuration where the mirrors can be positioned to reflect the light towards the eye image light camera), a partially reflective surface may be placed along the image light optical path such that when the eye image light reflects back into the upper or lower module that it is reflected in a direction that the eye imaging camera can capture light eye image light. In other embodiments, the eye image light camera is positioned outside of the image light optical path. For example, the camera(s) may be positioned near the outer lens of the platform.

FIG. 19 shows a series of illustrations of captured eye images that show the eye glint (i.e. light that reflects off the front of the eye) produced by a dedicated eye light mounted adjacent to the combiner as previously described herein. In this embodiment of the disclosure, captured images of the wearer's eye are analyzed to determine the relative positions of the iris 3550, pupil, or other portion of the eye, and the eye glint 3560. The eye glint is a reflected image of the dedicated eye light 3420 when the dedicated light is used. FIG. 19 illustrates the relative positions of the iris 3550 and the eye glint 3560 for a variety of eye positions. By providing a dedicated eye light 3420 in a fixed position, combined with the fact that the human eye is essentially spherical, or at least a reliably repeatable shape, the eye glint provides a fixed reference point against which the determined position of the iris can be compared to determine where the wearer is looking, either within the displayed image or within the see-through view of the surrounding environment. By positioning the dedicated eye light 3420 at a corner of the combiner 3410, the eye glint 3560 is formed away from the iris 3550 in the captured images. As a result, the positions of the iris and the eye glint can be determined more easily and more accurately during the analysis of the captured images, since they do not interfere with one another. In a further embodiment, the combiner includes an associated cut filter that prevents infrared light from the environment from entering the HWC and the eye camera is an infrared camera, so that the eye glint 3560 is only provided by light from the dedicated eye light. For example, the combiner can include a low pass filter that passes visible light while reflecting infrared light from the environment away from the eye camera, reflecting infrared light from the dedicated eye light toward the user's eye and the eye camera can include a high pass filter that absorbs visible light associated with the displayed image while passing infrared light associated with the eye image.

In an embodiment of the eye imaging system, the lens for the eye camera is designed to take into account the optics associated with the upper module 202 and the lower module 204. This is accomplished by designing the eye camera to include the optics in the upper module 202 and optics in the lower module 204, so that a high MTF image is produced, at the image sensor in the eye camera, of the wearer's eye. In yet a further embodiment, the eye camera lens is provided with a large depth of field to eliminate the need for focusing the eye camera to enable sharp images of the eye to be captured. Where a large depth of field is typically provided by a high f/# lens (e.g. f/#>5). In this case, the reduced light gathering associated with high f/# lenses is compensated by the inclusion of a dedicated eye light to enable a bright image of the eye to be captured. Further, the brightness of the dedicated eye light can be modulated and synchronized with the capture of eye images so that the dedicated eye light has a reduced duty cycle and the brightness of infrared light on the wearer's eye is reduced.

Figure 20B:
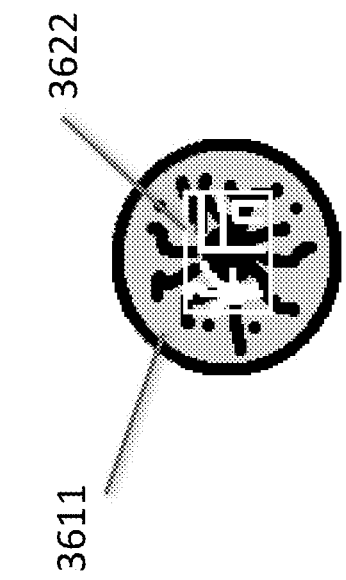
FIG. 20b illustrates a digital content presentation reflection off of the wearer's eye that may be analyzed in accordance with the principles of the present disclosure.
Figure 20A:
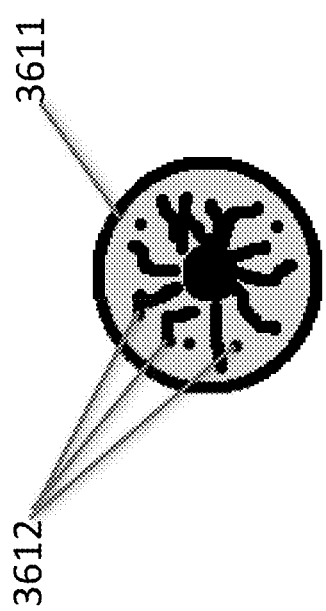
FIG. 20a illustrates eye characteristics that may be used in personal identification through analysis of a system according to the principles of the present disclosure.

In a further embodiment, FIG. 20a shows an illustration of an eye image that is used to identify the wearer of the HWC. In this case, an image of the wearer's eye 3611 is captured and analyzed for patterns of identifiable features 3612. The patterns are then compared to a database of eye images to determine the identity of the wearer. After the identity of the wearer has been verified, the operating mode of the HWC and the types of images, applications, and information to be displayed can be adjusted and controlled in correspondence to the determined identity of the wearer. Examples of adjustments to the operating mode depending on who the wearer is determined to be or not be include: making different operating modes or feature sets available, shutting down or sending a message to an external network, allowing guest features and applications to run, etc.

FIG. 20b is an illustration of another embodiment using eye imaging, in which the sharpness of the displayed image is determined based on the eye glint produced by the reflection of the displayed image from the wearer's eye surface. By capturing images of the wearer's eye 3611, an eye glint 3622, which is a small version of the displayed image can be captured and analyzed for sharpness. If the displayed image is determined to not be sharp, then an automated adjustment to the focus of the HWC optics can be performed to improve the sharpness. This ability to perform a measurement of the sharpness of a displayed image at the surface of the wearer's eye can provide a very accurate measurement of image quality. Having the ability to measure and automatically adjust the focus of displayed images can be very useful in augmented reality imaging where the focus distance of the displayed image can be varied in response to changes in the environment or changes in the method of use by the wearer.

An aspect of the present disclosure relates to controlling the HWC 102 through interpretations of eye imagery. In embodiments, eye-imaging technologies, such as those described herein, are used to capture an eye image or a series of eye images for processing. The image(s) may be processed to determine a user intended action, an HWC predetermined reaction, or other action. For example, the imagery may be interpreted as an affirmative user control action for an application on the HWC 102. Or, the imagery may cause, for example, the HWC 102 to react in a pre-determined way such that the HWC 102 is operating safely, intuitively, etc.

Figure 21:
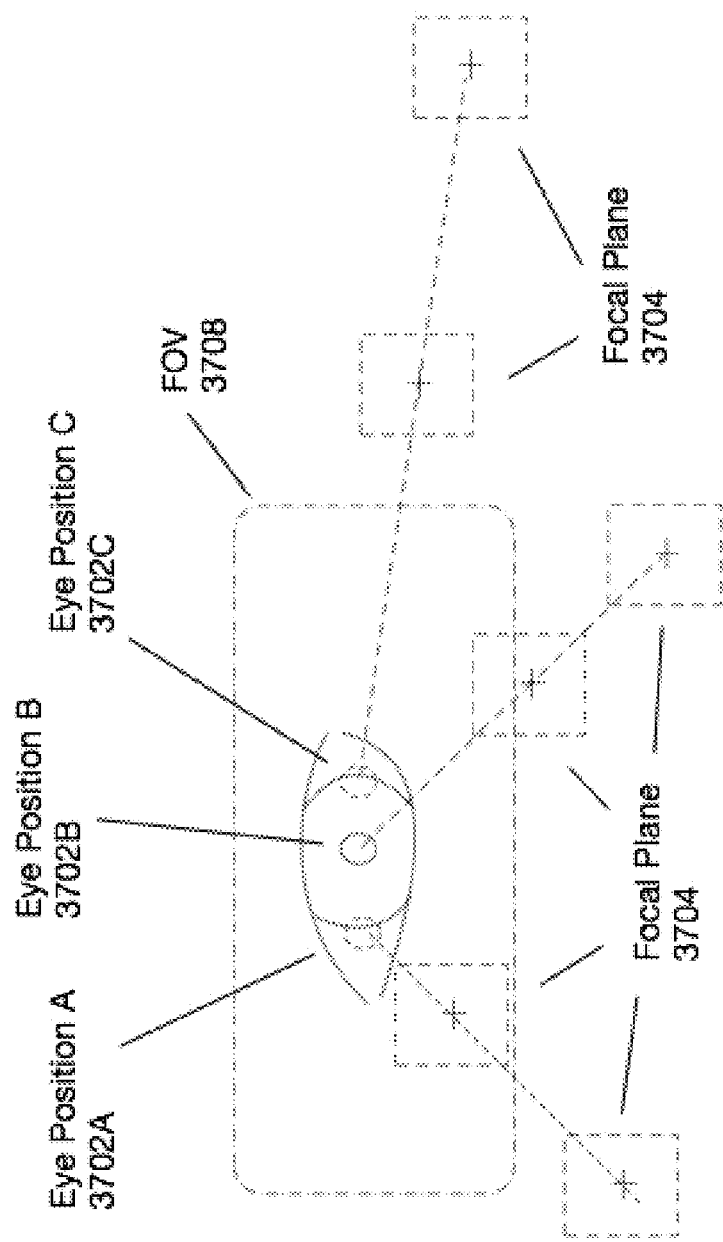
FIG. 21 illustrates eye imaging along various virtual target lines and various focal planes in accordance with the principles of the present disclosure.

FIG. 21 illustrates an eye imagery process that involves imaging the HWC 102 wearer's eye(s) and processing the images (e.g. through eye imaging technologies described herein) to determine in what position 3702 the eye is relative to its neutral or forward looking position and/or the FOV 3708. The process may involve a calibration step where the user is instructed, through guidance provided in the FOV of the HWC 102, to look in certain directions such that a more accurate prediction of the eye position relative to areas of the FOV can be made. In the event the wearer's eye is determined to be looking towards the right side of the FOV 3708 (as illustrated in FIG. 21, the eye is looking out of the page) a virtual target line may be established to project what in the environment the wearer may be looking towards or at. The virtual target line may be used in connection with an image captured by camera on the HWC 102 that images the surrounding environment in front of the wearer. In embodiments, the field of view of the camera capturing the surrounding environment matches, or can be matched (e.g. digitally), to the FOV 3708 such that making the comparison is made more clear. For example, with the camera capturing the image of the surroundings in an angle that matches the FOV 3708 the virtual line can be processed (e.g. in 2d or 3d, depending on the camera images capabilities and/or the processing of the images) by projecting what surrounding environment objects align with the virtual target line. In the event there are multiple objects along the virtual target line, focal planes may be established corresponding to each of the objects such that digital content may be placed in an area in the FOV 3708 that aligns with the virtual target line and falls at a focal plane of an intersecting object. The user then may see the digital content when he focuses on the object in the environment, which is at the same focal plane. In embodiments, objects in line with the virtual target line may be established by comparison to mapped information of the surroundings.

In embodiments, the digital content that is in line with the virtual target line may not be displayed in the FOV until the eye position is in the right position. This may be a predetermined process. For example, the system may be set up such that a particular piece of digital content (e.g. an advertisement, guidance information, object information, etc.) will appear in the event that the wearer looks at a certain object(s) in the environment. A virtual target line(s) may be developed that virtually connects the wearer's eye with an object(s) in the environment (e.g. a building, portion of a building, mark on a building, gps location, etc.) and the virtual target line may be continually updated depending on the position and viewing direction of the wearer (e.g. as determined through GPS, e-compass, IMU, etc.) and the position of the object. When the virtual target line suggests that the wearer's pupil is substantially aligned with the virtual target line or about to be aligned with the virtual target line, the digital content may be displayed in the FOV 3704.

In embodiments, the time spent looking along the virtual target line and/or a particular portion of the FOV 3708 may indicate that the wearer is interested in an object in the environment and/or digital content being displayed. In the event there is no digital content being displayed at the time a predetermined period of time is spent looking at a direction, digital content may be presented in the area of the FOV 3708. The time spent looking at an object may be interpreted as a command to display information about the object, for example. In other embodiments, the content may not relate to the object and may be presented because of the indication that the person is relatively inactive. In embodiments, the digital content may be positioned in proximity to the virtual target line, but not inline with it such that the wearer's view of the surroundings are not obstructed but information can augment the wearer's view of the surroundings. In embodiments, the time spent looking along a target line in the direction of displayed digital content may be an indication of interest in the digital content. This may be used as a conversion event in advertising. For example, an advertiser may pay more for an add placement if the wearer of the HWC 102 looks at a displayed advertisement for a certain period of time. As such, in embodiments, the time spent looking at the advertisement, as assessed by comparing eye position with the content placement, target line or other appropriate position may be used to determine a rate of conversion or other compensation amount due for the presentation.

Figure 22:
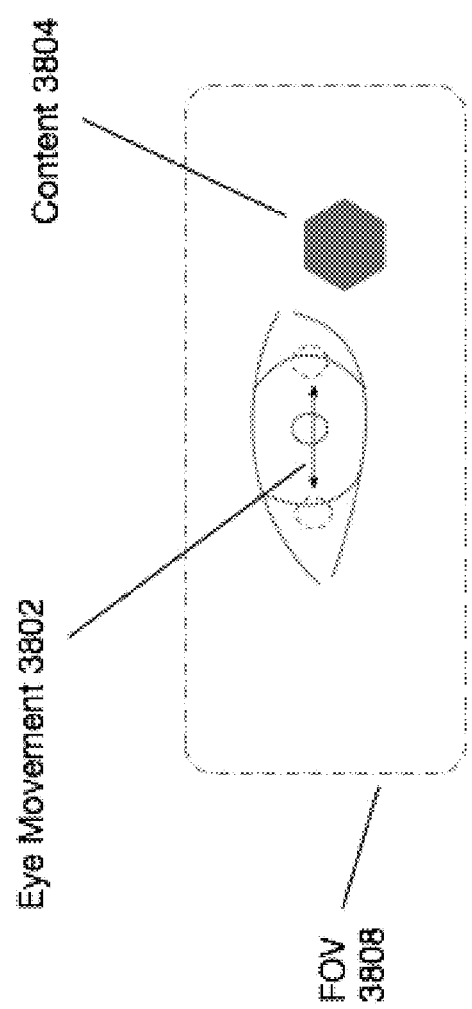
FIG. 22 illustrates content control with respect to eye movement based on eye imaging in accordance with the principles of the present disclosure.

An aspect of the disclosure relates to removing content from the FOV of the HWC 102 when the wearer of the HWC 102 apparently wants to view the surrounding environments clearly. FIG. 22 illustrates a situation where eye imagery suggests that the eye has or is moving quickly so the digital content 3804 in the FOV 3808 is removed from the FOV 3808. In this example, the wearer may be looking quickly to the side indicating that there is something on the side in the environment that has grabbed the wearer's attention. This eye movement 3802 may be captured through eye imaging techniques (e.g. as described herein) and if the movement matches a predetermined movement (e.g. speed, rate, pattern, etc.) the content may be removed from view. In embodiments, the eye movement is used as one input and HWC movements indicated by other sensors (e.g. IMU in the HWC) may be used as another indication. These various sensor movements may be used together to project an event that should cause a change in the content being displayed in the FOV.

Another aspect of the present disclosure relates to determining a focal plane based on the wearer's eye convergence. Eyes are generally converged slightly and converge more when the person focuses on something very close. This is generally referred to as convergence. In embodiments, convergence is calibrated for the wearer. That is, the wearer may be guided through certain focal plane exercises to determine how much the wearer's eyes converge at various focal planes and at various viewing angles. The convergence information may then be stored in a database for later reference. In embodiments, a general table may be used in the event there is no calibration step or the person skips the calibration step. The two eyes may then be imaged periodically to determine the convergence in an attempt to understand what focal plane the wearer is focused on. In embodiments, the eyes may be imaged to determine a virtual target line and then the eye's convergence may be determined to establish the wearer's focus, and the digital content may be displayed or altered based thereon.

Figure 23:
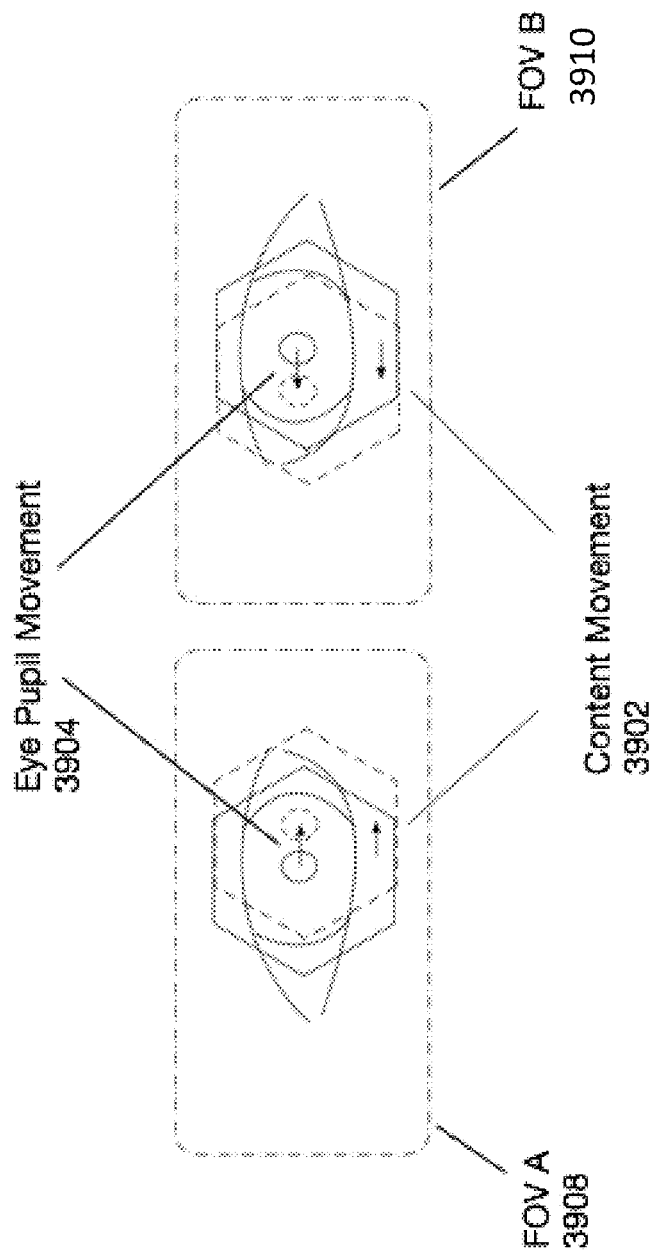
FIG. 23 illustrates eye imaging and eye convergence in accordance with the principles of the present disclosure.

FIG. 23 illustrates a situation where digital content is moved 3902 within one or both of the FOVs 3908 and 3910 to align with the convergence of the eyes as determined by the pupil movement 3904. By moving the digital content to maintain alignment, in embodiments, the overlapping nature of the content is maintained so the object appears properly to the wearer. This can be important in situations where 3D content is displayed.

An aspect of the present disclosure relates to controlling the HWC 102 based on events detected through eye imaging. A wearer winking, blinking, moving his eyes in a certain pattern, etc. may, for example, control an application of the HWC 102. Eye imaging (e.g. as described herein) may be used to monitor the eye(s) of the wearer and once a predetermined pattern is detected an application control command may be initiated.

An aspect of the disclosure relates to monitoring the health of a person wearing a HWC 102 by monitoring the wearer's eye(s). Calibrations may be made such that the normal performance, under various conditions (e.g. lighting conditions, image light conditions, etc.) of a wearer's eyes may be documented. The wearer's eyes may then be monitored through eye imaging (e.g. as described herein) for changes in their performance. Changes in performance may be indicative of a health concern (e.g. concussion, brain injury, stroke, loss of blood, etc.). If detected the data indicative of the change or event may be communicated from the HWC 102.

Aspects of the present disclosure relate to security and access of computer assets (e.g. the HWC itself and related computer systems) as determined through eye image verification. As discussed herein elsewhere, eye imagery may be compared to known person eye imagery to confirm a person's identity. Eye imagery may also be used to confirm the identity of people wearing the HWCs 102 before allowing them to link together or share files, streams, information, etc.

A variety of use cases for eye imaging are possible based on technologies described herein. An aspect of the present disclosure relates to the timing of eye image capture. The timing of the capture of the eye image and the frequency of the capture of multiple images of the eye can vary dependent on the use case for the information gathered from the eye image. For example, capturing an eye image to identify the user of the HWC may be required only when the HWC has been turned ON or when the HWC determines that the HWC has been put onto a wearer's head to control the security of the HWC and the associated information that is displayed to the user, wherein the orientation, movement pattern, stress or position of the earhorns (or other portions of the HWC) of the HWC can be used to determine that a person has put the HWC onto their head with the intention to use the HWC. Those same parameters may be monitored in an effort to understand when the HWC is dismounted from the user's head. This may enable a situation where the capture of an eye image for identifying the wearer may be completed only when a change in the wearing status is identified. In a contrasting example, capturing eye images to monitor the health of the wearer may require images to be captured periodically (e.g. every few seconds, minutes, hours, days, etc.). For example, the eye images may be taken in minute intervals when the images are being used to monitor the health of the wearer when detected movements indicate that the wearer is exercising. In a further contrasting example, capturing eye images to monitor the health of the wearer for long-term effects may only require that eye images be captured monthly. Embodiments of the disclosure relate to selection of the timing and rate of capture of eye images to be in correspondence with the selected use scenario associated with the eye images. These selections may be done automatically, as with the exercise example above where movements indicate exercise, or these selections may be set manually. In a further embodiment, the selection of the timing and rate of eye image capture is adjusted automatically depending on the mode of operation of the HWC. The selection of the timing and rate of eye image capture can further be selected in correspondence with input characteristics associated with the wearer including age and health status, or sensed physical conditions of the wearer including heart rate, chemical makeup of the blood and eye blink rate.

Figure 24:
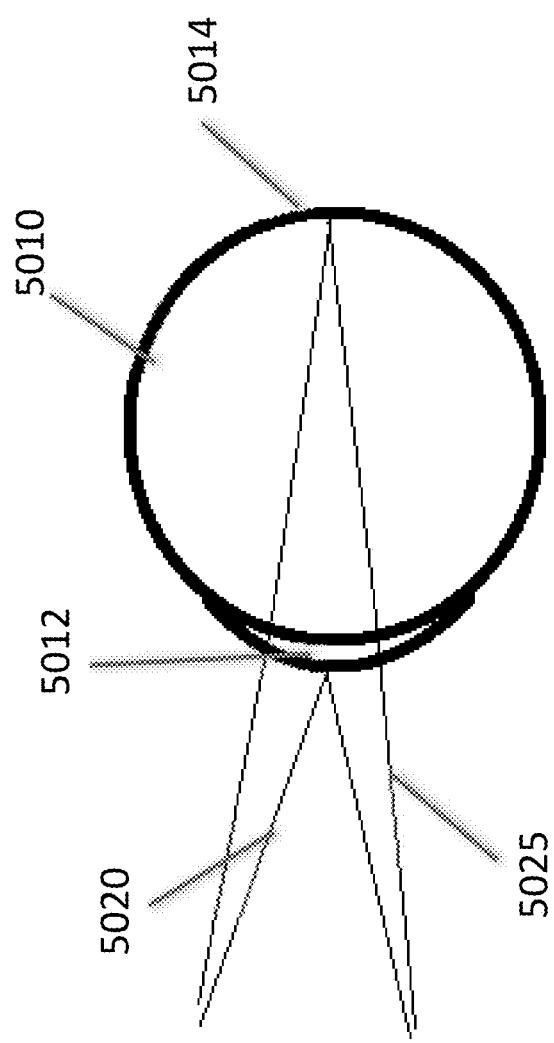
FIG. 24 illustrates light impinging an eye in accordance with the principles of the present disclosure.
Figure 25:
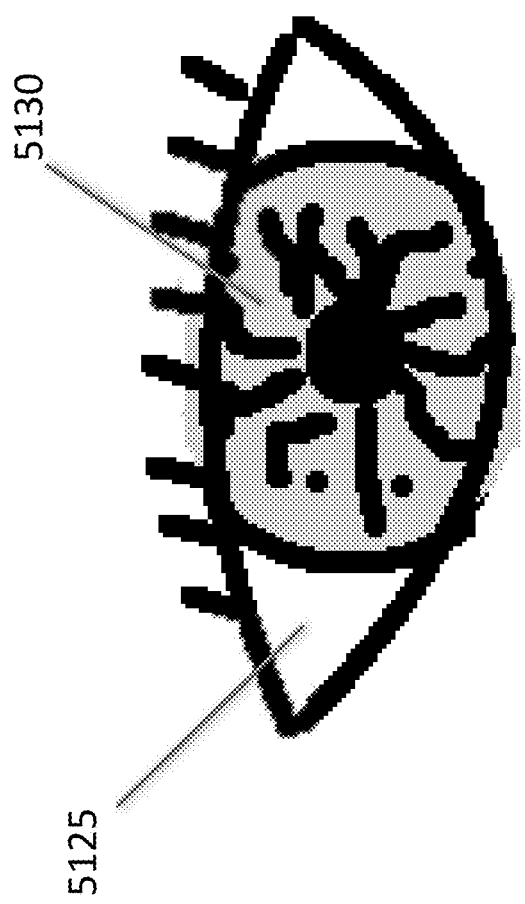
FIG. 25 illustrates a view of an eye in accordance with the principles of the present disclosure.

FIG. 24 illustrates a cross section of an eyeball of a wearer of an HWC with focus points that can be associated with the eye imaging system of the disclosure. The eyeball 5010 includes an iris 5012 and a retina 5014. Because the eye imaging system of the disclosure provides coaxial eye imaging with a display system, images of the eye can be captured from a perspective directly in front of the eye and inline with where the wearer is looking. In embodiments of the disclosure, the eye imaging system can be focused at the iris 5012 and/or the retina 5014 of the wearer, to capture images of the external surface of the iris 5012 or the internal portions of the eye, which includes the retina 5014. FIG. 24 shows light rays 5020 and 5025 that are respectively associated with capturing images of the iris 5012 or the retina 5014 wherein the optics associated with the eye imaging system are respectively focused at the iris 5012 or the retina 5014. Illuminating light can also be provided in the eye imaging system to illuminate the iris 5012 or the retina 5014. FIG. 25 shows an illustration of an eye including an iris 5130 and a sclera 5125. In embodiments, the eye imaging system can be used to capture images that include the iris 5130 and portions of the sclera 5125. The images can then be analyzed to determine color, shapes and patterns that are associated with the user. In further embodiments, the focus of the eye imaging system is adjusted to enable images to be captured of the iris 5012 or the retina 5014. Illuminating light can also be adjusted to illuminate the iris 5012 or to pass through the pupil of the eye to illuminate the retina 5014. The illuminating light can be visible light to enable capture of colors of the iris 5012 or the retina 5014, or the illuminating light can be ultraviolet (e.g. 340 nm), near infrared (e.g. 850 nm) or mid-wave infrared (e.g. 5000 nm) light to enable capture of hyperspectral characteristics of the eye.

Figure 26B:
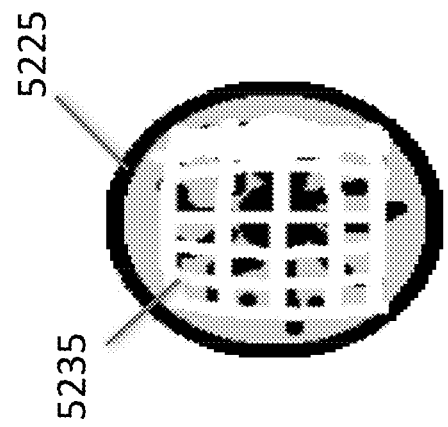
FIGS. 26a and 26b illustrate views of an eye with a structured light pattern in accordance with the principles of the present disclosure.
Figure 26A:
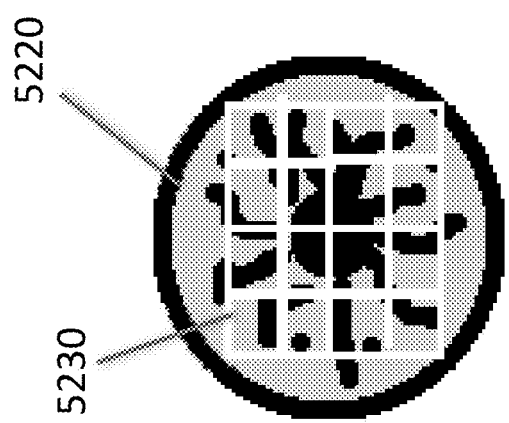

FIGS. 26*a* and 26*b* illustrate captured images of eyes where the eyes are illuminated with structured light patterns. In FIG. 26*a*, an eye 5220 is shown with a projected structured light pattern 5230, where the light pattern is a grid of lines. A light pattern of such as 5230 can be provided by the light source 5355 by including a diffractive or a refractive device to modify the light 5357 as are known by those skilled in the art. A visible light source can also be included for the second camera, which can include a diffractive or refractive to modify the light 5467 to provide a light pattern. FIG. 26*b* illustrates how the structured light pattern of 5230 becomes distorted to 5235 when the user's eye 5225 looks to the side. This distortion comes from the fact that the human eye is not completely spherical in shape, instead the iris sticks out slightly from the eyeball to form a bump in the area of the iris. As a result, the shape of the eye and the associated shape of the reflected structured light pattern is different depending on which direction the eye is pointed, when images of the eye are captured from a fixed position. Changes in the structured light pattern can subsequently be analyzed in captured eye images to determine the direction that the eye is looking.

The eye imaging system can also be used for the assessment of aspects of health of the user. In this case, information gained from analyzing captured images of the iris 5130 or sclera 5125 are different from information gained from analyzing captured images of the retina 5014. Where images of the retina 5014 are captured using light that illuminates the inner portions of the eye including the retina 5014. The light can be visible light, but in an embodiment, the light is infrared light (e.g. wavelength 1 to 5 microns) and the eye camera is an infrared light sensor (e.g. an InGaAs sensor) or a low resolution infrared image sensor that is used to determine the relative amount of light that is absorbed, reflected or scattered by the inner portions of the eye. Wherein the majority of the light that is absorbed, reflected or scattered can be attributed to materials in the inner portion of the eye including the retina where there are densely packed blood vessels with thin walls so that the absorption, reflection and scattering are caused by the material makeup of the blood. These measurements can be conducted automatically when the user is wearing the HWC, either at regular intervals, after identified events or when prompted by an external communication. In a preferred embodiment, the illuminating light is near infrared or mid infrared (e.g. 0.7 to 5 microns wavelength) to reduce the chance for thermal damage to the wearer's eye. In a further embodiment, the light source and the camera together comprise a spectrometer wherein the relative intensity of the light reflected by the eye is analyzed over a series of narrow wavelengths within the range of wavelengths provided by the light source to determine a characteristic spectrum of the light that is absorbed, reflected or scattered by the eye. For example, the light source can provide a broad range of infrared light to illuminate the eye and the camera can include: a grating to laterally disperse the reflected light from the eye into a series of narrow wavelength bands that are captured by a linear photodetector so that the relative intensity by wavelength can be measured and a characteristic absorbance spectrum for the eye can be determined over the broad range of infrared. In a further example, the light source can provide a series of narrow wavelengths of light (ultraviolet, visible or infrared) to sequentially illuminate the eye and camera includes a photodetector that is selected to measure the relative intensity of the series of narrow wavelengths in a series of sequential measurements that together can be used to determine a characteristic spectrum of the eye. The determined characteristic spectrum is then compared to known characteristic spectra for different materials to determine the material makeup of the eye. In yet another embodiment, the illuminating light is focused on the retina and a characteristic spectrum of the retina is determined and the spectrum is compared to known spectra for materials that may be present in the user's blood. For example, in the visible wavelengths 540 nm is useful for detecting hemoglobin and 660 nm is useful for differentiating oxygenated hemoglobin. In a further example, in the infrared, a wide variety of materials can be identified as is known by those skilled in the art, including: glucose, urea, alcohol and controlled substances.

Another aspect of the present disclosure relates to an intuitive user interface mounted on the HWC 102 where the user interface includes tactile feedback (otherwise referred to as haptic feedback) to the user to provide the user an indication of engagement and change. In embodiments, the user interface is a rotating element on a temple section of a glasses form factor of the HWC 102. The rotating element may include segments such that it positively engages at certain predetermined angles. This facilitates a tactile feedback to the user. As the user turns the rotating element it 'clicks' through its predetermined steps or angles and each step causes a displayed user interface content to be changed. For example, the user may cycle through a set of menu items or selectable applications. In embodiments, the rotating element also includes a selection element, such as a pressure-induced section where the user can push to make a selection.

Figure 28:
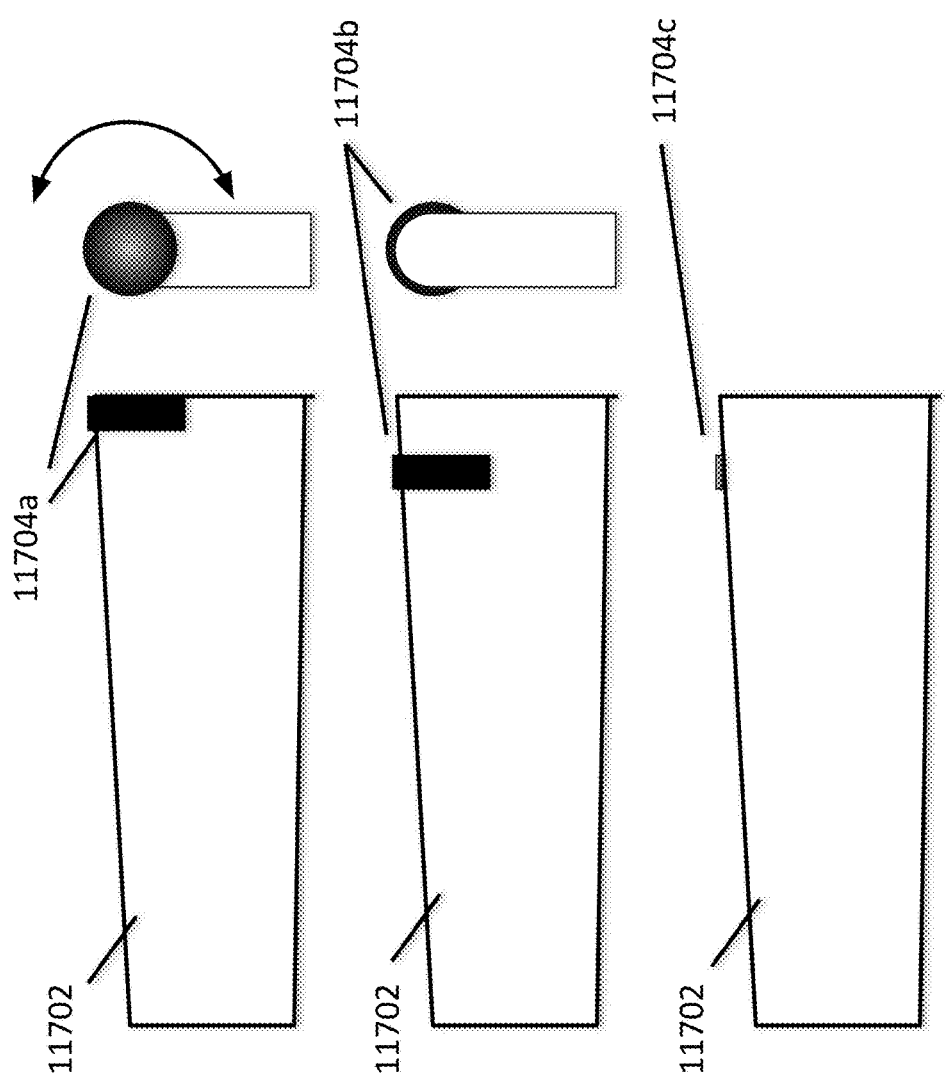
FIG. 28 illustrates a user interface in accordance with the principles of the present disclosure.

FIG. 27 illustrates a human head wearing a head-worn computer in a glasses form factor. The glasses have a temple section 11702 and a rotating user interface element 11704. The user can rotate the rotating element 11704 to cycle through options presented as content in the see-through display of the glasses. FIG. 28 illustrates several examples of different rotating user interface elements 11704*a*, 11704*b* and 11704*c*. Rotating element 11704*a* is mounted at the front end of the temple and has significant side and top exposure for user interaction. Rotating element 11704*b* is mounted further back and also has significant exposure (e.g. 270 degrees of touch). Rotating element 11704*c* has less exposure and is exposed for interaction on the top of the temple. Other embodiments may have a side or bottom exposure. In embodiments, an action similar to the rotary interface may be provided through a touch pad, strain gauge, capacitive user interface, etc. In addition, a touch pad, strain gauge, capacitive user interface, etc. may be shaped in a curve to more closely represent the feel of a rotary configuration.

Another aspect of the present disclosure relates to a haptic system in a head-worn computer. Creating visual, audio, and haptic sensations in coordination can increase the enjoyment or effectiveness of awareness in a number of situations. For example, when viewing a movie or playing a game while digital content is presented in a computer display of a head-worn computer, it is more immersive to include coordinated sound and haptic effects. When presenting information in the head-worn computer, it may be advantageous to present a haptic effect to enhance or be the information. For example, the haptic sensation may gently cause the user of the head-worn computer believe that there is some presence on the user's right side, but out of sight. It may be a very light haptic effect to cause the 'tingling' sensation of a presence of unknown origin. It may be a high intensity haptic sensation to coordinate with an apparent explosion, either out of sight or in-sight in the computer display. Haptic sensations can be used to generate a perception in the user that objects and events are close by. As another example, digital content may be presented to the user in the computer displays and the digital content may appear to be within reach of the user. If the user reaches out his hand in an attempt to touch the digital object, which is not a real object, the haptic system may cause a sensation and the user may interpret the sensation as a touching sensation. The haptic system may generate slight vibrations near one or both temples for example and the user may infer from those vibrations that he has touched the digital object. This additional dimension in sensory feedback can be very useful and create a more intuitive and immersive user experience.

Another aspect of the present disclosure relates to controlling and modulating the intensity of a haptic system in a head-worn computer. In embodiments, the haptic system includes separate piezo strips such that each of the separate strips can be controlled separately. Each strip may be controlled over a range of vibration levels and some of the separate strips may have a greater vibration capacity than others. For example, a set of strips may be mounted in the arm of the head-worn computer (e.g. near the user's temple, ear, rear of the head, substantially along the length of the arm, etc.) and the further forward the strip the higher capacity the strip may have. The strips of varying capacity could be arranged in any number of ways, including linear, curved, compound shape, two dimensional array, one dimensional array, three dimensional array, etc.). A processor in the head-worn computer may regulate the power applied to the strips individually, in sub-groups, as a whole, etc. In embodiments, separate strips or segments of varying capacity are individually controlled to generate a finely controlled multi-level vibration system. Patterns based on frequency, duration, intensity, segment type, and/or other control parameters can be used to generate signature haptic feedback. For example, to simulate the haptic feedback of an explosion close to the user, a high intensity, low frequency, and moderate duration may be a pattern to use. A bullet whipping by the user may be simulated with a higher frequency and shorter duration. Following this disclosure, one can imagine various patterns for various simulation scenarios.

Another aspect of the present disclosure relates to making a physical connection between the haptic system and the user's head. Typically, with a glasses format, the glasses touch the user's head in several places (e.g. ears, nose, forehead, etc.) and these areas may be satisfactory to generate the necessary haptic feedback. In embodiments, an additional mechanical element may be added to better translate the vibration from the haptic system to a desired location on the user's head. For example, a vibration or signal conduit may be added to the head-worn computer such that there is a vibration translation medium between the head-worn computers internal haptic system and the user's temple area.

Figure 29:
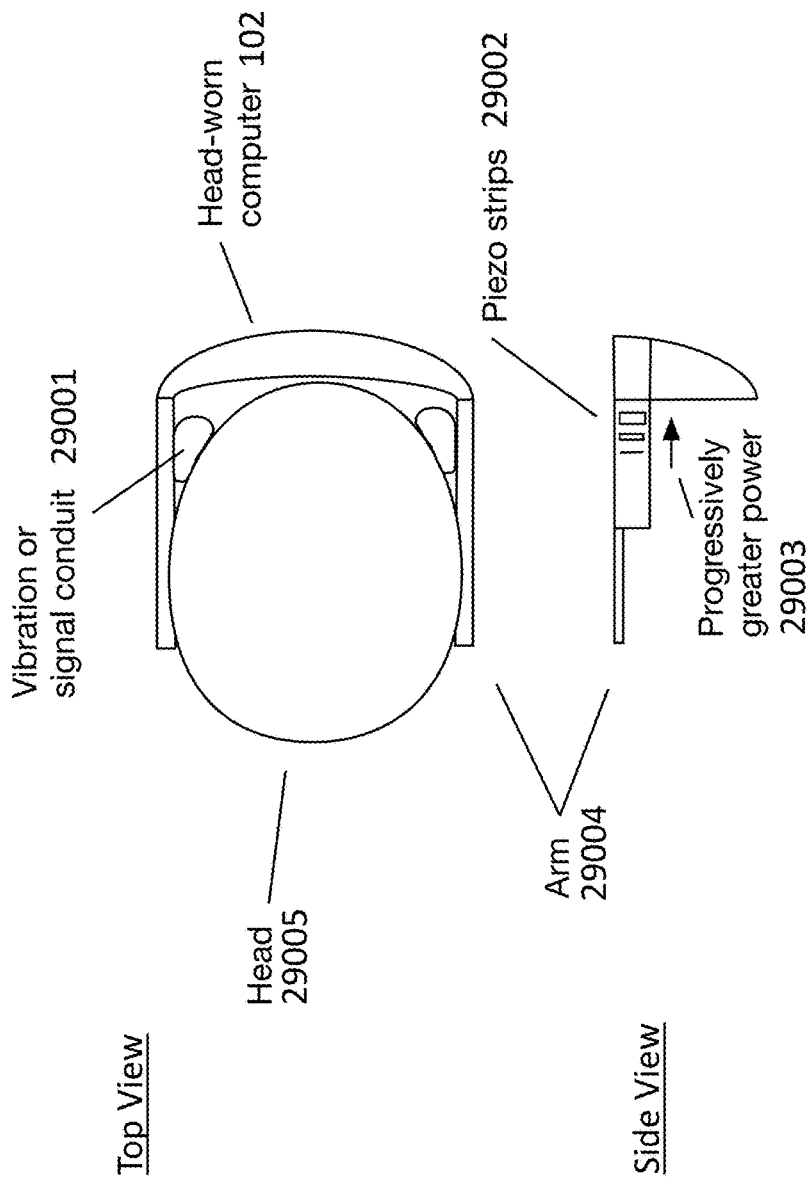

FIG. 29 illustrates a head-worn computer 102 with a haptic system comprised of piezo strips 29002. In this embodiment, the piezo strips 29002 are arranged linearly with strips of increasing vibration capacity from back to front of the arm 29004. The increasing capacity may be provided by different sized strips, for example. This arrangement can cause a progressively increased vibration power 29003 from back to front. This arrangement is provided for ease of explanation; other arrangements are contemplated by the inventors of the present application and these examples should not be construed as limiting. The head-worn computer 102 may also have a vibration or signal conduit 29001 that facilitates the physical vibrations from the haptic system to the head of the user 29005. The vibration conduit may be malleable to form to the head of the user for a tighter or more appropriate fit.

An aspect of the present disclosure relates to a head-worn computer, comprising: a frame adapted to hold a computer display in front of a user's eye; a processor adapted to present digital content in the computer display and to produce a haptic signal in coordination with the digital content display; and a haptic system comprised of a plurality of haptic segments, wherein each of the haptic segments is individually controlled in coordination with the haptic signal. In embodiments, the haptic segments comprise a piezo strip activated by the haptic signal to generate a vibration in the frame. The intensity of the haptic system may be increased by activating more than one of the plurality of haptic segments. The intensity may be further increased by activating more than 2 of the plurality of haptic segments. In embodiments, each of the plurality of haptic segments comprises a different vibration capacity. In embodiments, the intensity of the haptic system may be regulated depending on which of the plurality of haptic segments is activated. In embodiments, each of the plurality of haptic segments are mounted in a linear arrangement and the segments are arranged such that the higher capacity segments are at one end of the linear arrangement. In embodiments, the linear arrangement is from back to front on an arm of the head-worn computer. In embodiments, the linear arrangement is proximate a temple of the user. In embodiments, the linear arrangement is proximate an ear of the user. In embodiments, the linear arrangement is proximate a rear portion of the user's head. In embodiments, the linear arrangement is from front to back on an arm of the head-worn computer, or otherwise arranged.

An aspect of the present disclosure provides a head-worn computer with a vibration conduit, wherein the vibration conduit is mounted proximate the haptic system and adapted to touch the skin of the user's head to facilitate vibration sensations from the haptic system to the user's head. In embodiments, the vibration conduit is mounted on an arm of the head-worn computer. In embodiments, the vibration conduit touches the user's head proximate a temple of the user's head. In embodiments, the vibration conduit is made of a soft material that deforms to increase contact area with the user's head.

An aspect of the present disclosure relates to a haptic array system in a head-worn computer. The haptic array(s) that can correlate vibratory sensations to indicate events, scenarios, etc. to the wearer. The vibrations may correlate or respond to auditory, visual, proximity to elements, etc. of a video game, movie, or relationships to elements in the real world as a means of augmenting the wearer's reality. As an example, physical proximity to objects in a wearer's environment, sudden changes in elevation in the path of the wearer (e.g. about to step off a curb), the explosions in a game or bullets passing by a wearer. Haptic effects from a piezo array(s) that make contact the side of the wearer's head may be adapted to effect sensations that correlate to other events experienced by the wearer.

FIG. 29a illustrates a haptic system according to the principles of the present disclosure. In embodiments the piezo strips are mounted or deposited with varying width and thus varying force Piezo Elements on a rigid or flexible, non-conductive substrate attached, to or part of the temples of glasses, goggles, bands or other form factor. The non-conductive substrate may conform to the curvature of a head by being curved and it may be able to pivot (e.g. in and out, side to side, up and down, etc.) from a person's head. This arrangement may be mounted to the inside of the temples of a pair of glasses. Similarly, the vibration conduit, described herein elsewhere, may be mounted with a pivot. As can be seen in FIG. 29a, the piezo strips 29002 may be mounted on a substrate and the substrate may be mounted to the inside of a glasses arm, strap, etc. The piezo strips in this embodiment increase in vibration capacity as they move forward.

An aspect of the present disclosure relates to providing an intuitive user interface for a head-worn computer, wherein the user interface includes a rotary style physical interface (e.g. a dial, track, etc.) in combination with a direction selection device (e.g. a button, active touch surface, capacitive touch pad, etc.). The inventors have discovered that the combination of a rotary style interface with a separate actuator provides an intuitive physical interface to navigate a graphical user interface in a head-worn computer display. The inventors discovered that it is difficult to navigate within the head-worn computer's graphic user interface when the controls are mounted on the head-worn computer. The user cannot see the interface in this situation. The inventors also discovered that causing a rotary dial encoder style user interface with period stops (i.e. mechanical features in the rotary device that cause it to 'click' or otherwise pause into a next spot on as the rotary dial moves) allows the user interface to be configured such that a graphical selection element (e.g. cursor) in the graphical user interface 'snaps' from one selectable item to the next in correspondence to the mechanical stops of the rotary device. This makes moving from item to item feel mechanically connected to the action in the graphical user interface. In addition, the direction selection button can be used to regulate in which direction the selection element moves in the graphical user interface (GUI). For example, if the GUI includes a two-dimensional matrix of selectable items (e.g. icons), than the direction selection element may be activated once to cause the rotary device to move a cursor right and left, while an additional activation may then cause the cursor to move up and down. Without the separate direction control interface, the user may have to scroll through the items in one axis (e.g. row by row).

FIG. 30 illustrates a head-worn computer 102 with a rotary style physical user interface 30002 mounted on an arm of the head-worn computer 102 along with a direction selection control device 30004, which is also mounted on the arm of the head-worn computer 102. The placement of the various elements mounted on the head-worn computer as illustrated in FIG. 30 are provided for illustrative purposes only. The inventors envision that the physical user interfaces (e.g. dial 30002 and direction selector 30004) may be otherwise mounted on the head-worn computer 102. For example, either interface may be mounted on a top, bottom, side of a surface of the head-worn computer. In embodiments, while the two physical user interfaces may operate in coordination or cooperation within the GUI, the two may be placed in separate places on the head-worn computer 102. For example, they may be mounted on separate arms of the head-worn computer 102. As another example, the direction selector may be mounted on the top of the arm and the rotary dial may be mounted on the bottom. The direction selector may be mounted such that the it is 'out of the way' of the user's interactions with the dial, but in a proximity that makes it convenient to interact with. For example, the direction selector may be a button and it may be mounted on a top surface of the arm in a region generally above a bottom arm mounted dial interface, but the button may be offset (e.g. shifted forward or backwards from a centerline of the dial) such that the user can interact with the dial by grabbing the top of the arm with an index finger and the dial with the thumb without touching the direction selection button. However, the direction selection button may be close enough to a centerline of the dial that a small shift in the user's index finger allows an interaction with the direction selection button. FIG. 30 illustrates an embodiment where the dial 30002 is mounted on a bottom surface of the arm of the head-worn computer 102 and the direction selection button 30004 is mounted on a side of the same arm. In this configuration, the user may interact with the dial by grabbing the top of the arm with his index finger and the dial with his thumb. When the user wants to change the scroll direction of a cursor or other element in the GUI, he may slip his finger or thumb to the direction selection button 30004 for the interaction.

The rotary style physical interface 30002 may have mechanically derived stops or pause points (as discussed above). It also may have a mechanically derived selection activation system, such as an ability to accept a selection instruction in conjunction with the motion control of a graphical selection element. For example, the rotary device may be mechanically adapted such that the user can rotate a dial but also press through a centerline of the dial towards the center of the dial to effect a 'click' or selection. The rotary style physical interface need not be round, as illustrated in FIG. 30. It may be oval, rectangular, square, etc., so long as the mechanical action causes the user to feel that he is rotating through selections.

The direction selection device 30004 may be a mechanical device (e.g. button, switch, etc.), capacitive sensor, proximity detector, optical sensor or other interface adapted to accept a user's physical input. It may also be programmed such that different patterns of interaction cause different commands to be generated. For example, a single touch or activation may cause a direction of scroll to be changes and a double touch or activation may cause a GUI element selection to be made.

FIG. 30 also illustrates two GUI environments 30018 that may be presented in a display of the head-worn computer 102. GUI environment 30018a illustrates a set of selectable elements 30008 (e.g. application launch icons). As a user rotates the rotary style physical input device 30002 and the rotary device 'clicks' from stop to stop, the identity of which icon in the GUI to be selected hops horizontally. At the end of row, it may snap to the next row to make a continuation feel of the dial. The direction selection device 30004 controls which direction 30012 is followed when the user turns the rotary device. If the rotary device is hopping icons in a row format (i.e. horizontally), an activation of the direction selection device may cause the same rotary action to move the icon hopping in a column format (i.e. vertically).

GUI environment 30018b illustrates an application environment. Following the launch of an application the application environment may appear in the display of the head-worn computer and the rotary style input device and the direction selection device may affect the direction and degree of movement within the application environment. For example, following the launch of an application the rotary style input device may be programmed to cause an up and down scrolling within the application environment. In the event that the user would like to then scroll horizontally, she may activate the direction selection device to cause the rotary style input device to than cause a horizontal movement.

The inventors have also discovered that including haptic feedback in conjunction with interactions with the physical user interface devices can provide further guidance to the user. For example, when turning the rotary device or activating the direction selection device, a haptic system (e.g. as described herein) may be used to provide haptic feedback. The haptic system may have fine control over multiple haptic sensations (e.g. slight vibration, strong vibration, escalating vibration, de-escalating vibration, etc.) and the rotary movement or direction selection may cause a particular pattern to cause a particular sensation. Progressive movements of a dial interface may cause a particular pattern. A fast shift of the dial may cause a different type of haptic feedback than a slower interaction, etc.

Another aspect of the present disclosure relates to identifying the relative proximity of a user's fingers with respect to various user interface controls that are mounted on a head-worn computer such that a visual depiction of the proximity can be provided to the user in a display of the head-worn computer. The inventors have discovered that it can be difficult to identify where certain user control features are located when the controls are mounted on the head-worn computer because the only feedback the user receives, generally speaking, is that of his basic touch and memory of the layout of the interfaces. The inventors have further discovered that providing proximity detection near and around the various head-worn computer mounted user interfaces along with a visual depiction, in the head-worn computer display, of the detected proximity of the fingers with the various user interface elements provides guidance and a more intuitive user interface experience for the user.

Figure 31:
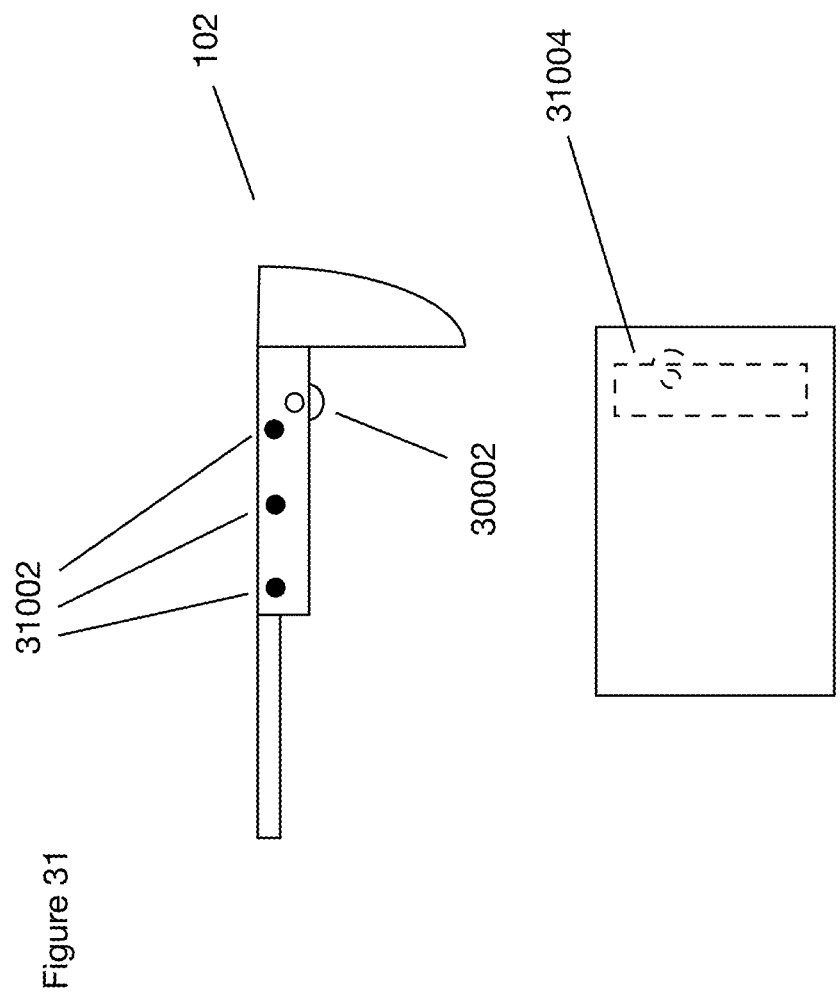

FIG. 31 illustrates a head-worn computer 102 with a physical user interface 30002 and a proximity detection system 31002. The proximity detection system 31002 may be arranged to sense a user's interaction with the head-worn computer 102. The information from the proximity detection system 31002 may be used to generate a representation 31004 of the head-worn computer 102, or portion thereof, with an indication of where the user's physical or proximate interaction for presentation in the display of the head-worn computer 102. The representation 31004 of the proximate interaction of the user with the head-worn computer 102 may be presented in a number of ways: horizontally, vertically, 2D, 3D, perspective 3D view, etc. The proximity detection system 31002 may have one or more detectors. Two or more detectors may be used to improve the sensitivity or coverage of the system. The detectors may be mounted on any of the head-worn computer surfaces. In embodiments, the proximity detectors are mounted on the surfaces that include user interface elements. As indicated herein, user interface elements may be mounted on any surface of the head-worn computer. In embodiments, the proximity detector is configured as a ring or other form that mounts around, partially around or in proximity to a user interface element. For example, a user control button may include a capacitive ring that detects interactions near the button.

Another aspect of the present disclosure relates to predicting the proximity of a user's interaction with a user interface mounted on a head-worn computer and causing a haptic feedback that helps guide the user to the user interface. The haptic system (e.g. as described herein) may produce variable output such that the intensity can be used to guide a user towards a user interface element. This may be done in coordination with a visual representation of the interaction proximity (e.g. as discussed above).

Another aspect of the present disclosure relates to an intuitive user interface for a head-worn computer that provides a physical interface and visual indication for the control of aspects of the head-worn computer such as volume of the audio and brightness of the image in a see-through display. For example, referring back to FIG. 30, a physical user interface 30002, such as a dial or capacitive touch surface, may be used to control a level of volume for the audio produced by the head-worn computer and/or control the brightness of the displayed content in a see-through computer display of the head-worn computer. Further, in embodiments, the direction selection device 30004 may be used to select between two or more controllable aspects of the head-worn display. An indication of what aspect is being controlled (e.g. the volume or brightness) and/or level of the aspect may be presented as content in the see-through display. For example, if a user presses the direction selection device 30004 an indication of which controllable is presently controllable is active aspect may be presented in the display so the user knows which aspect can be controlled with the physical user interface 30002. In addition, in embodiments, a level or setting of the controllable aspect may be presented in the display. The user may then be able to see an indication of the volume or brightness setting as they control it.

Figure 32:
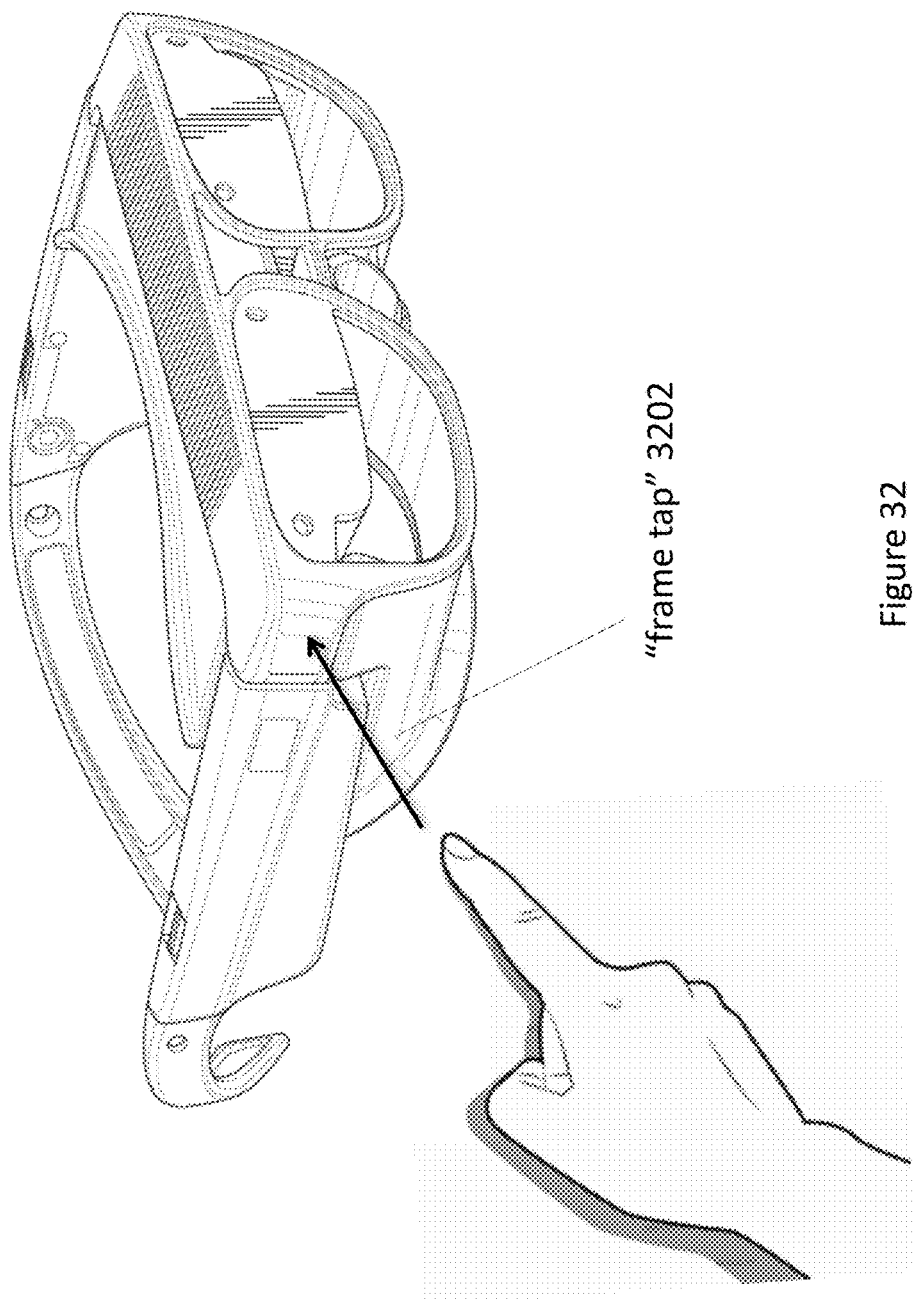
FIG. 32 illustrates a 'frame tap' user interface in accordance with the principles of the present disclosure.

Another aspect of the present disclosure relates to a 'frame tap' interface for a head-worn computer. The head-worn computer may have no user controls mounted on the head-worn computer or it may have one or more user controls mounted on it. In embodiments, the head-worn computer is equipped with an inertial measurement unit positioned and adapted to detect when the user 'taps' the head-worn computer as an indication that the user wants to control an aspect of the software operating on the head-worn computer. The inertial measurement unit may be associated with a processor and memory such that tap or touch signatures can be recognized. The tap or touch signatures may be updated based on the particular user's actions. This may be done through computer learning. A pallet of actions associated with types of taps (e.g. single tap, double tap, hard tap, light tap, front frame tap, temple tap, etc.) may be provided such that the user can make the associations he or she desires. In embodiments, the frame tap control may be one form of control and it may be used in connection with another form of control. For example, if a rotary selector is provided on the head-worn computer (e.g. as described herein elsewhere) the rotary selector may be used to move through a set of icons or within an application and then the frame tap may be used to select an item or launch an application. The frame tap may be used in connection with a rotary interface, touch interface, button interface, switch interface, capacitive interface, strain gauge user interface, etc. FIG. 32 illustrates a head-worn computer that performs an action based on a frame tap or touch.

Another aspect of the present disclosure relates to a head-worn computer with a strain gauge user interface. The strain gauge may be a device adapted to measure strain on a platform. The strain gauge may be mounted on a user interface, external user interface, head-worn computer, etc. The strain gauge may be connected to a processor and memory such that the processor can interpret user interactions with the strain gauge. The strain gauge user interface may be adapted as a single action device (i.e. it performs one user interface function), multiple action device, scroll device (e.g. initiating scroll graphical user interface actions with a swipe on strain gauge surface), etc. In embodiments, a strain gauge user interface arrangement may be used in connection with another form of user interface (e.g. as described herein elsewhere).

Figure 33:
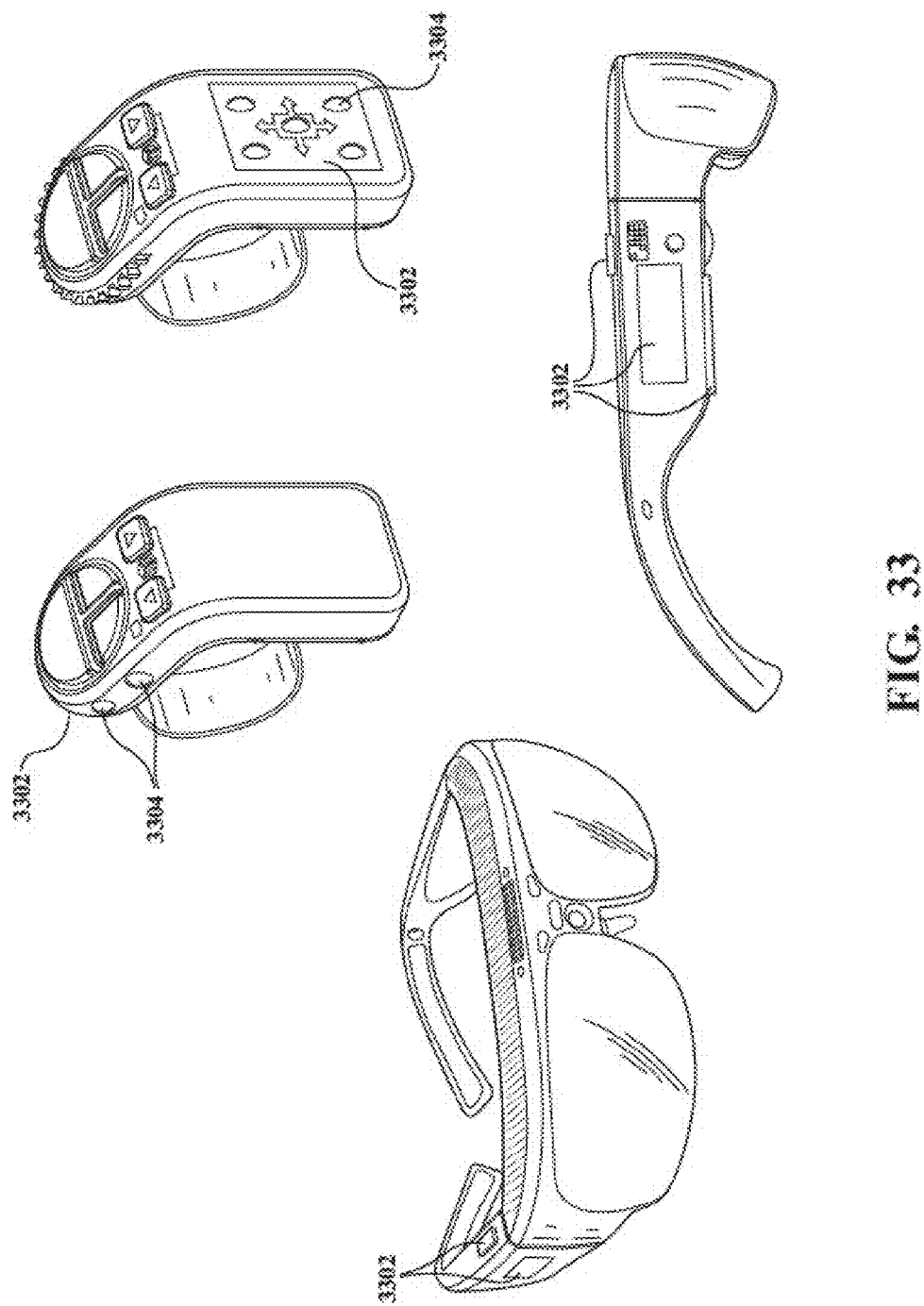
FIG. 33 illustrates strain gauge user interfaces on head-worn computers and an external user interface in accordance with the principles of the present disclosure.

FIG. 33 illustrates embodiments of devices with strain gauge user interfaces 3302. The examples show the strain gauge user interfaces mounted on a head-worn computer and an external user controller. In addition, in embodiments, the strain gauge user interface 3302 may have physical feature(s) 3304 that are easy to feel and find for the user and indicative of a control touch area. In embodiments, the strain gauge user interface may be associated with a proximity detection system that identifies where along the frame the user is touching (e.g. as described herein elsewhere).

Another aspect of the present disclosure relates to a detection that a head-worn computer has or is about to be mounted on the user's head. The detection system may be a proximity detection system, capacitive detection system, mechanical detection system, etc. For example, proximity sensors may be mounted in the frame of the head-worn computer at a place that touches or becomes close to the user's head once it is mounted (e.g. in the front frame that touches or comes close to the forehead, in a temple section, in an ear horn section, etc.). Once the proximity sensor, for example, detects the forehead, the head-worn computer may turn on. It may be advantageous to have several proximity detectors to properly indicate that the head-worn computer has been mounted on the user's head. For example, the user may pick up the computer by an arm of the computer, but since it is not yet mounted on the head, one may not want to activate the computer. In embodiments, a second proximity detector (e.g. in the other arm, in the forehead region) may be desirable such that the head-worn computer only infers that it has been mounted once more than one proximity detector has been activated. In embodiments, the proximity detectors may be used to turn the computer on before it is mounted on the head. For example, it may start once one in the arm has been activated indicating that the device is about to be mounted on the head.

Another aspect of the present disclosure relates to tracking a position of an external user interface. In embodiments, triangulation technologies may be included in the head-worn computer and the external user interface such that the external user interface can be tracked and located within the 3D space. Emitters may be in one of the devices and a receiver(s) may be in the other. For example, the external user interface may have an ultrasonic emitter and the head-worn computer may have more than one ultrasonic microphone. Each of the microphones may receive the same emitted signal but the microphones could be separated such that they each receive the signal at a different position. The head-worn computer may also have a processor that uses the signals from the separated microphones to calculate the 3D position of the external user interface.

Figure 34:
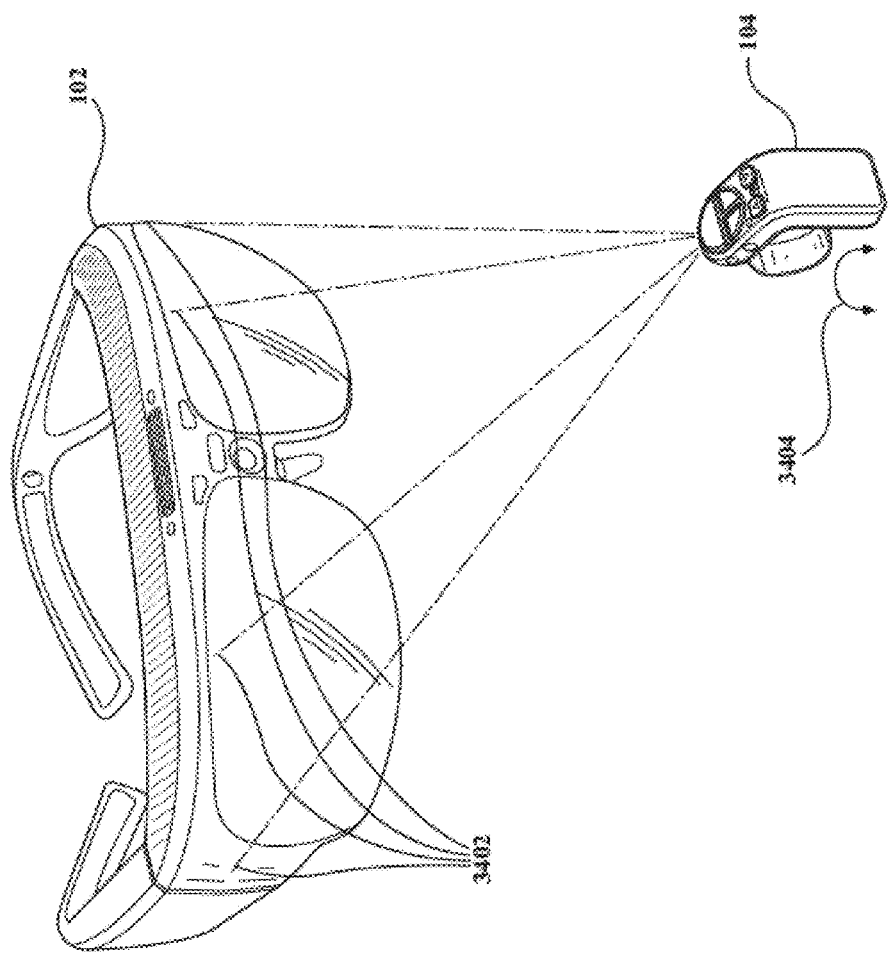
FIG. 34 illustrates a head-worn computer with four digital ultrasonic receivers positioned separately from one another.

FIG. 34 illustrates a head-worn computer 102 with four digital ultrasonic receivers positioned separately from one another 3402. The external user interface 104 includes a digital ultrasonic transmitter. The external user interface 104 may continually, or as needed, send an ultrasonic signal and the four separate receivers in the head-worn computer 102 may receive the signals at different positions 3402 on the head-worn computer. Each of the receivers may be adapted to identify a direction from which the signal originated. All four would then measure a different direction for the origin, since they are physically separated. A processor in the head-worn computer may then use the relative location of each receiver along with each receiver's origin direction measurement to calculate the position of the emitter in the external user interface.

In embodiments, the external user interface 104 may further include an inertial measurement unit (IMU), or other such movement detection system, to monitor movements of the external user interface 104. The IMU may be used to measure and predict rotational changes 3404 while the ultrasonic triangulation system measures and predicts translation and/or 3D location of the external user interface. IMU's may not typically be accurate at measuring translation, so the combination of the ultrasonic triangulation system and the internal IMU system can improve the control signals generated by movement of the external user interface.

In embodiments, the external user interface 104 may be worn on a user's finger, held in a user's hand, etc. and the motion of the external user interface may be interpreted and control signals generated to control software applications operating on the head-worn computer.

An aspect of the present disclosure relates to tracking the position of hand-held controllers by using a camera system, or other appropriate sensor system, on a head-worn computer to monitor one or more light emitters mounted at known positions on the hand-held controllers. The position and/or tracking of movement may be used as a marker for anchoring virtual content, instructions for the head-worn computer, etc. The head-worn computer may image the surrounding environment to identify and track the position of the emitters on the hand-held controller. In embodiments, the head-worn computer may image the environment with an internal camera system (e.g. a wide field of view camera, camera with a fisheye lens, stereo camera system, etc.) 3502 mounted on a head-worn computer 102. In embodiments, the camera system 3502 captures images of the hand-held controller and monitors the controller's position changes, through the relative locations of the emitters, and a processor interprets the position changes as software application instructions. In embodiments, the head-worn computer may have two or more cameras to capture the surrounding environment from different positions, or perspectives, from the head-worn computer. The multiple perspectives may be used to capture the emitters' positions to track and predict the motion of the hand-held controller via 3D modeling. In embodiments, the camera system may include a fisheye camera that adapts the camera to capture a very wide field of view in front of the user. The fisheye lens can also be used to distort the perspective of the captured image in such a way that it exaggerates the movements of the controller/emitters. The exaggeration can be used to more precisely track the controller's position because the exaggeration causes the image capture to be able to identify very small movements in the real-world as larger movements in the captured images.

The emitters may be arranged on the hand-held controller in a known pattern such that the head-worn computer can predict a position of the controller based on the relative positions of the emitters in the image capture process. This works well with a WFOV camera, fisheye lens, stereo camera, etc. The pattern of emitters will change in their position, orientation and perspective with respect to one another as captured from the camera system 3502 on the head-worn computer. In embodiments, the hand-held controller itself may have a known shape and size. The shape and size may be monitored by the head-worn computer as a prediction of the controller's position and movements. In embodiments, the known shape and size may be used in conjunction with the known emitter pattern, or the known shape and size may be used without emitter recognition.

In embodiments, the hand-held controller may have one or more emitters 3504 (e.g. IR producing LEDs, visible light producing LEDs, OLED's, etc.) in a known pattern and the camera system 3502 may image, and the processor may track, the movement of the emitters as indications of movement of the controller. Two or more emitters, at known positions, may be used on the controller so the processor in the head-worn computer can track the emitters and their relative positions to one another to predict the position and movement pattern of the controller. In embodiments, the emitters 3504 may have reflective properties, as oppose to emission properties, such that they reflect light that can be captured by the camera system 3502. In embodiments, the hand-held controller may include an inertial measurement unit (IMU) in addition to one or more emitters 3504. The IMU may be used to monitor a first form of movement (e.g. rotational movements, angular changes, angular rate of change) to generate software instructions and the camera system 3502 may image the emitter(s) so the processor can monitor a second form of movement (e.g. translations, linear movements, movements where the IMU is not a good predictor of the form of movement). The coordination of the IMU and camera system allow the controller to be tracked even if the camera system view of the emitters is occluded.

In embodiments, the emitters may be of a particular color (e.g. red, green, blue, IR) and the camera system on the head-worn computer may be filtered to better capture the color. The camera system may be filtered to eliminate the non-emitter colors. In embodiments, the filtering may be done digitally. For example, if the emitters are blue, the captured images may be digitally filtered to show only blue colors thereby making it easier to identify the emitters. The filtering may cover or cycle over multiple bands of light when multiple colors are emitted from the controller. In embodiments, the camera may capture a small band of IR light. The band selection may be based on the fact that the system design is to operate outdoors where the sun generates IR. To better highlight the IR of the emitter, the emission frequency may be aligned with an IR water absorption band (e.g. around 940 nm where the solar energy is low due to the absorption of water in the atmosphere). This would create an outdoor IR tracking system with minimized impact from solar radiation.

In embodiments, the hand-held controller may include a display (e.g. LED, LCD, OLED, etc.) and the display may display content (e.g. a pre-determined marker) that can be tracked by the head-worn computer camera system. The content would be a known content such that its size, proportions and perspectives in the captured images could be used to understand the position and movement of the controller. For example, a display may be used to display dots at known positions, a bar code, or other recognizable pattern. The pattern, its size and perspective may be used as an marker for anchoring virtual content (e.g. a light saber, a gun in a first person shooter game, a paint brush in a painting software application, a pen in a writing software application).

In embodiments, the emitter may be an audio source, creating audible or ultrasonic sound energy. This sound energy can be tracked and triangulated with a microphone array in the head worn computer.

In embodiments, the emitters and/or display on the hand-held controller may be regulated by a software application operating on the head-worn computer. For example, an application on the head-worn computer may communicate with the hand-held controller to activate, modulate, regulate, etc. the emitters and or content displayed on the display. Some applications on the head-worn computer may not use the pattern tracking features so they may not activate the emitters or marker on the display. Other applications may use the pattern tracking and activate the emitters and/or display content on the display. The applications may cause the deactivation of the emitters/content display when the tracking features are not needed.

Multiple controllers may be tracked at the same time, using different light/sound modulation or color or frequency or displayed images to uniquely identify them.

Figure 35:
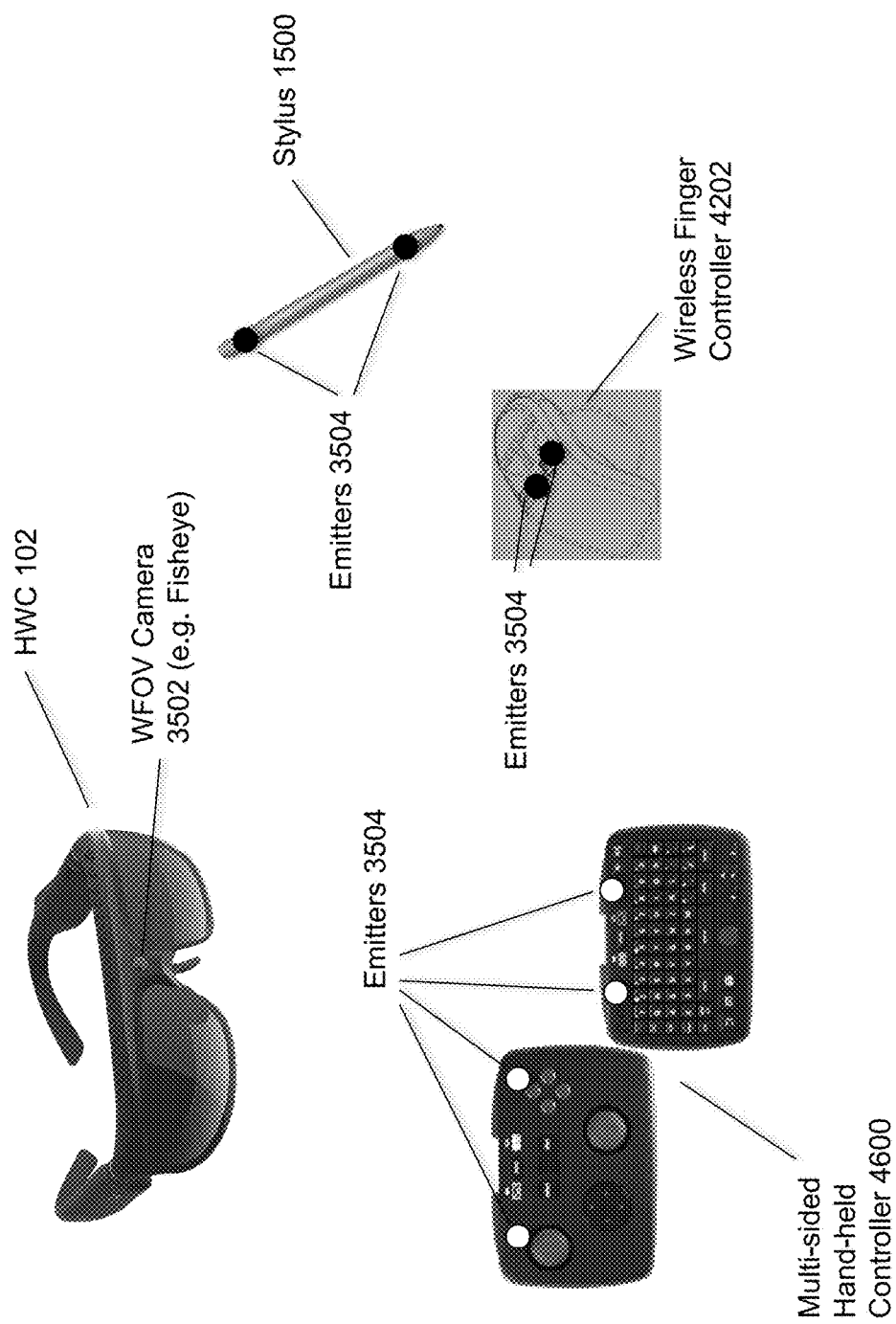
FIG. 35 illustrates various devices with tracking emitters.

FIG. 35 illustrates a hand-held control position monitor system in accordance with the principles of the present invention. The HWC 102 may include a camera system 3502. Although 3502 is illustrated as a single point on the HWC 102, the inventors appreciate that two or more cameras may be used and the two or more cameras may be separated physically such that they each capture images of the surrounding environment from significantly different perspectives. The separation being large enough to allow for a 3D modeling of the environment, hand held controller, emitters, etc. The camera system 3502 may include a fisheye lens to create a very wide-angle lens for a camera that produces strong visual distortion intended to create a wide panoramic or hemispherical image. The distortions created by the fisheye lens can increase the sensitivity of the tracking system by causing the camera to be more sensitive to movements of the emitters or the controller itself. The emitters will appear, from the camera's perspective, to move further than they actually move due to the distortions created by the lens. The distortion can be calibrated into the imaging system such that the system becomes more sensitive to the emitter's movements without sacrificing accuracy of the prediction of how the controller moved.

FIG. 35 further illustrates three different types of hand-held controllers as examples: a multi-sided hand-held controller 4600, a finger mounted controller 4202, and a stylus 1500. Each hand-held controller is illustrated with multiple emitters 3504 such that they can be tracked by the HWC's 102 camera system 3502 and can be used to interpret the movements of the hand-held controller. The emitters 3504 may be positioned or mounted on the hand-held controllers in an area that is typically available for image capture from the camera system 3502. For example, the multi-sided controller 4600 may have emitters 3504 on the keyboard side and the game controller side such that the emitters can be imaged when the controller is used in either of its modes. The emitters on one side may be of a first color and the emitters on the other side may be of a different color, such that the HWC 102 understands which side is being used by the user. The HWC 102 may than interpret the movement patterns of the hand-held controller differently for one side versus the other. For example, when the game controller is being used, the tracking system may be more sensitive to provide the user with an additional fine input control based on the movements of the controller. When the keyboard, track pad, or touch screen side is being used, the tracking may be less sensitive, deactivated, etc. to accommodate the inputs required for the software operating on the HWC 102. The finger-mounted controller 4202 may have emitters on the top, sides, etc., such that they can be imaged without interference from the user's fingers. Extra emitters may be used to create a pattern that can at least be partially recognized by the camera system 3502. The stylus 1500 may include emitter(s) on or towards each end of the stylus such that each end can be tracked for its movements. In embodiments, each of the plurality of emitters may emit a different pattern of light (e.g. pulse width modulation pattern, amplitude modulation, color, non-visible wavelength, shape, etc.) such that each can be identified from the other. This can be useful in further identifying position and movement of the hand-held controller.

The system illustrated in connection with FIG. 35 improves the accuracy of identifying the position and movement of the hand-held controller. The increased accuracy can improve the user control experience when controlling software applications on the HWC 102. In embodiments, the position and movement are used as a marker for the anchoring of virtual content presented in the HWC 102 see-through display. For example, the top of the hand-held controller may than be used as an anchor for a virtual sword, or other content, presented in the HWC. The processor of the HWC 102, or processor of the hand-held controller, may take input from an IMU in the hand-held controller along with image data captured by the camera system 3502 to predict the position and movement of the hand-held controller. This sensor fusion can provide better accuracy for the prediction of the position and movements of the hand-held controller. Then the virtual sword may be anchored to the hand held controller, or at a position relative to the hand-held controller, such that, from the user's perspective through the see-through display, she is wielding a sword that moves continually with the user's hand movements.

In embodiments, the HWC 102 may coordinate the activation of the emitters on the hand-held controller with capture activation of the camera on the HWC 102. This synchronization can save battery power in both the hand-held controller and the HWC 102 by not causing the emitters or camera system to be on for longer than needed. A pulse width modulation scheme may be used to generate the light from the emitters and a similar capture pattern of the camera may be used. This can also be used to minimize the appearance of the emitters when they are adapted to emit visible light. With close synchronization, the emitter light may be imperceptible or very dimly perceptible by the human eye because the pulse width modulation pattern is so fast that the eye cannot properly perceive the emitters actual intensity in the short 'on' period. However, the capture process, if properly synchronized, may still capture the high intensity short 'on' pulse to continue to properly track the emitters and hand-held controller.

Figure 36A:
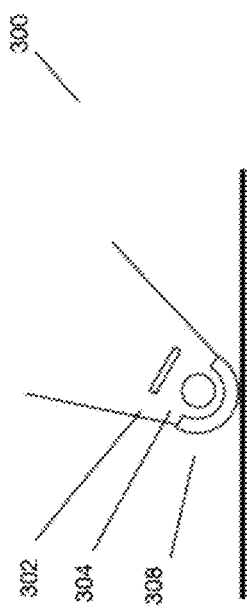
FIGS. 36a to 36c illustrate distance control systems in accordance with the principles of the present disclosure.
Figure 36B:
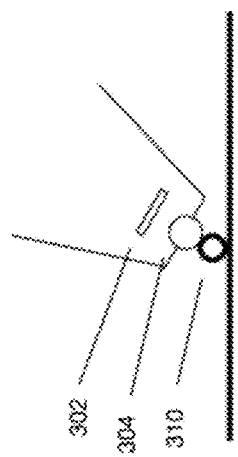
Figure 36C:
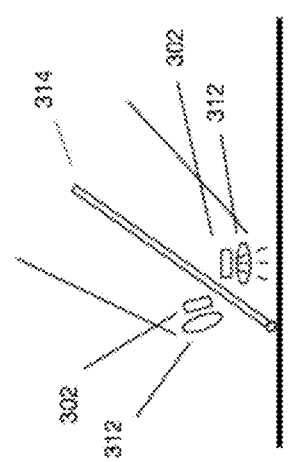

FIGS. 36A-C illustrate several embodiments of lens and camera arrangements 300 for the pen 1500. One aspect relates to maintaining a constant distance between the camera and the writing surface to enable the writing surface to be kept in focus for better tracking of movements of the pen 1500 over the writing surface. Another aspect relates to maintaining an angled surface following the circumference of the writing tip of the pen 1500 such that the pen 1500 can be rolled or partially rolled in the user's hand to create the feel and freedom of a conventional writing instrument.

FIG. 36A illustrates an embodiment of the writing lens end of the pen 1500. The configuration includes a ball lens 304, a camera or image capture surface 302, and a domed cover lens 308. In this arrangement, the camera views the writing surface through the ball lens 304 and dome cover lens 308. The ball lens 304 causes the camera to focus such that the camera views the writing surface when the pen 1500 is held in the hand in a natural writing position, such as with the pen 1500 in contact with a writing surface. In embodiments, the ball lens 304 should be separated from the writing surface to obtain the highest resolution of the writing surface at the camera 302. In embodiments, the ball lens 304 is separated by approximately 1 to 3 mm. In this configuration, the domed cover lens 308 provides a surface that can keep the ball lens 304 separated from the writing surface at a constant distance, such as substantially independent of the angle used to write on the writing surface. For instance, in embodiments the field of view of the camera in this arrangement would be approximately 60 degrees.

The domed cover lens, or other lens 308 used to physically interact with the writing surface, will be transparent or transmissive within the active bandwidth of the camera 302. In embodiments, the domed cover lens 308 may be spherical or other shape and comprised of glass, plastic, sapphire, diamond, and the like. In other embodiments where low resolution imaging of the surface is acceptable. The pen 1500 can omit the domed cover lens 308 and the ball lens 304 can be in direct contact with the surface.

FIG. 36B illustrates another structure where the construction is somewhat similar to that described in connection with FIG. 36A; however this embodiment does not use a dome cover lens 308, but instead uses a spacer 310 to maintain a predictable distance between the ball lens 304 and the writing surface, wherein the spacer may be spherical, cylindrical, tubular or other shape that provides spacing while allowing for an image to be obtained by the camera 302 through the lens 304. In a preferred embodiment, the spacer 310 is transparent. In addition, while the spacer 310 is shown as spherical, other shapes such as an oval, doughnut shape, half sphere, cone, cylinder or other form may be used.

FIG. 36C illustrates yet another embodiment, where the structure includes a post 314, such as running through the center of the lensed end of the pen 1500. The post 314 may be an ink deposition system (e.g. ink cartridge), graphite deposition system (e.g. graphite holder), or a dummy post whose purpose is mainly only that of alignment. The selection of the post type is dependent on the pen's use. For instance, in the event the user wants to use the pen 1500 as a conventional ink depositing pen as well as a fully functional external user interface 104, the ink system post would be the best selection. If there is no need for the 'writing' to be visible on the writing surface, the selection would be the dummy post. The embodiment of FIG. 36C includes camera(s) 302 and an associated lens 312, where the camera 302 and lens 312 are positioned to capture the writing surface without substantial interference from the post 314. In embodiments, the pen 1500 may include multiple cameras 302 and lenses 312 such that more or all of the circumference of the tip 314 can be used as an input system. In an embodiment, the pen 1500 includes a contoured grip that keeps the pen aligned in the user's hand so that the camera 302 and lens 312 remains pointed at the surface.

Another aspect of the pen 1500 relates to sensing the force applied by the user to the writing surface with the pen 1500. The force measurement may be used in a number of ways. For example, the force measurement may be used as a discrete value, or discontinuous event tracking, and compared against a threshold in a process to determine a user's intent. The user may want the force interpreted as a 'click' in the selection of an object, for instance. The user may intend multiple force exertions interpreted as multiple clicks. There may be times when the user holds the pen 1500 in a certain position or holds a certain portion of the pen 1500 (e.g. a button or touch pad) while clicking to affect a certain operation (e.g. a 'right click'). In embodiments, the force measurement may be used to track force and force trends. The force trends may be tracked and compared to threshold limits, for example. There may be one such threshold limit, multiple limits, groups of related limits, and the like. For example, when the force measurement indicates a fairly constant force that generally falls within a range of related threshold values, the microprocessor 210 may interpret the force trend as an indication that the user desires to maintain the current writing style, writing tip type, line weight, brush type, and the like. In the event that the force trend appears to have gone outside of a set of threshold values intentionally, the microprocessor may interpret the action as an indication that the user wants to change the current writing style, writing tip type, line weight, brush type, and the like. Once the microprocessor has made a determination of the user's intent, a change in the current writing style, writing tip type, line weight, brush type, and the like. may be executed. In embodiments, the change may be noted to the user (e.g. in a display of the HWC 102), and the user may be presented with an opportunity to accept the change.

Figure 37A:
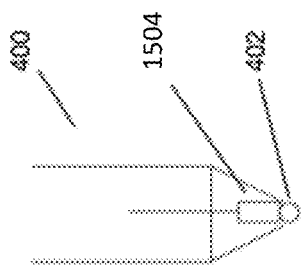
FIGS. 37a to 37c illustrate force interpretation systems in accordance with the principles of the present disclosure.

FIG. 37A illustrates an embodiment of a force sensing surface tip 400 of a pen 1500. The force sensing surface tip 400 comprises a surface connection tip 402 (e.g. a lens as described herein elsewhere) in connection with a force or pressure monitoring system 1504. As a user uses the pen 1500 to write on a surface or simulate writing on a surface the force monitoring system 1504 measures the force or pressure the user applies to the writing surface and the force monitoring system communicates data to the microprocessor 210 for processing. In this configuration, the microprocessor 210 receives force data from the force monitoring system 1504 and processes the data to make predictions of the user's intent in applying the particular force that is currently being applied. In embodiments, the processing may be provided at a location other than on the pen (e.g. at a server in the HWC system 100, on the HWC 102). For clarity, when reference is made herein to processing information on the microprocessor 210, the processing of information contemplates processing the information at a location other than on the pen. The microprocessor 210 may be programmed with force threshold(s), force signature(s), force signature library and/or other characteristics intended to guide an inference program in determining the user's intentions based on the measured force or pressure. The microprocessor 210 may be further programmed to make inferences from the force measurements as to whether the user has attempted to initiate a discrete action (e.g. a user interface selection 'click') or is performing a constant action (e.g. writing within a particular writing style). The inferencing process is important as it causes the pen 1500 to act as an intuitive external user interface 104.

Figure 37B:
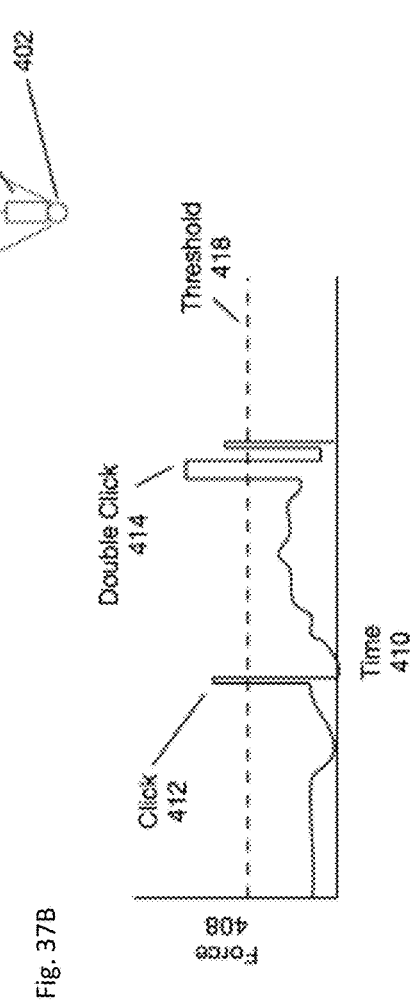

FIG. 37B illustrates a force 408 versus time 410 trend chart with a single threshold 418. The threshold 418 may be set at a level that indicates a discrete force exertion indicative of a user's desire to cause an action (e.g. select an object in a GUI). Event 412, for example, may be interpreted as a click or selection command because the force quickly increased from below the threshold 418 to above the threshold 418. The event 414 may be interpreted as a double click because the force quickly increased above the threshold 418, decreased below the threshold 418 and then essentially repeated quickly. The user may also cause the force to go above the threshold 418 and hold for a period indicating that the user is intending to select an object in the GUI (e.g. a GUI presented in the display of the HWC 102) and 'hold' for a further operation (e.g. moving the object).

While a threshold value may be used to assist in the interpretation of the user's intention, a signature force event trend may also be used. The threshold and signature may be used in combination or either method may be used alone. For example, a single-click signature may be represented by a certain force trend signature or set of signatures. The single-click signature(s) may require that the trend meet a criteria of a rise time between x any y values, a hold time of between a and b values and a fall time of between c and d values, for example. Signatures may be stored for a variety of functions such as click, double click, right click, hold, move, etc. The microprocessor 210 may compare the real-time force or pressure tracking against the signatures from a signature library to make a decision and issue a command to the software application executing in the GUI.

Figure 37C:
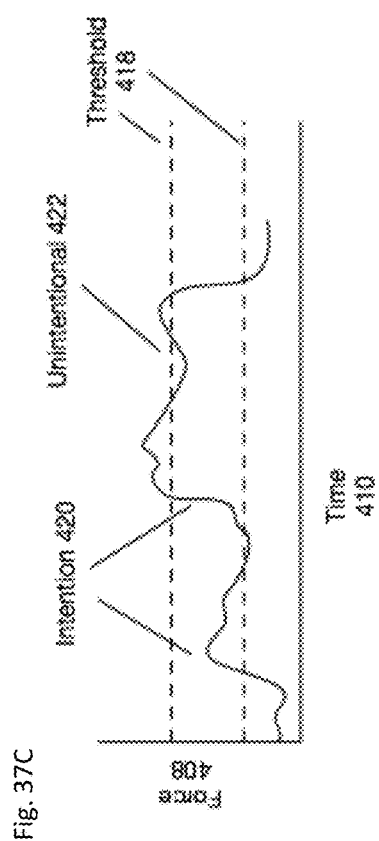

FIG. 37C illustrates a force 408 versus time 410 trend chart with multiple thresholds 418. By way of example, the force trend is plotted on the chart with several pen force or pressure events. As noted, there are both presumably intentional events 420 and presumably non-intentional events 422. The two thresholds 418 of FIG. 37C create three zones of force: a lower, middle and higher range. The beginning of the trend indicates that the user is placing a lower zone amount of force. This may mean that the user is writing with a given line weight and does not intend to change the weight, the user is writing. Then the trend shows a significant increase 420 in force into the middle force range. This force change appears, from the trend to have been sudden and thereafter it is sustained. The microprocessor 210 may interpret this as an intentional change and as a result change the operation in accordance with preset rules (e.g. change line width, increase line weight, etc.). The trend then continues with a second apparently intentional event 420 into the higher-force range. During the performance in the higher-force range, the force dips below the upper threshold 418. This may indicate an unintentional force change and the microprocessor may detect the change in range however not affect a change in the operations being coordinated by the pen 1500. As indicated above, the trend analysis may be done with thresholds and/or signatures.

Generally, in the present disclosure, instrument stroke parameter changes may be referred to as a change in line type, line weight, tip type, brush type, brush width, brush pressure, color, and other forms of writing, coloring, painting, and the like.

Another aspect of the pen 1500 relates to selecting an operating mode for the pen 1500 dependent on contextual information and/or selection interface(s). The pen 1500 may have several operating modes. For instance, the pen 1500 may have a writing mode where the user interface(s) of the pen 1500 (e.g. the writing surface end, quick launch buttons 1522, touch sensor 1520, motion based gesture, and the like) is optimized or selected for tasks associated with writing. As another example, the pen 1500 may have a wand mode where the user interface(s) of the pen is optimized or selected for tasks associated with software or device control (e.g. the HWC 102, external local device, remote device 112, and the like). The pen 1500, by way of another example, may have a presentation mode where the user interface(s) is optimized or selected to assist a user with giving a presentation (e.g. pointing with the laser pointer 1524 while using the button(s) 1522 and/or gestures to control the presentation or applications relating to the presentation). The pen may, for example, have a mode that is optimized or selected for a particular device that a user is attempting to control. The pen 1500 may have a number of other modes and an aspect of the present disclosure relates to selecting such modes.

FIG. 38A illustrates an automatic user interface(s) mode selection based on contextual information. The microprocessor 210 may be programmed with IMU thresholds 514 and 512. The thresholds 514 and 512 may be used as indications of upper and lower bounds of an angle 504 and 502 of the pen 1500 for certain expected positions during certain predicted modes. When the microprocessor 1510 determines that the pen 1500 is being held or otherwise positioned within angles 502 corresponding to writing thresholds 514, for example, the microprocessor 1510 may then institute a writing mode for the pen's user interfaces. Similarly, if the microprocessor 1510 determines (e.g. through the IMU 1512) that the pen is being held at an angle 504 that falls between the predetermined wand thresholds 512, the microprocessor may institute a wand mode for the pen's user interface. Both of these examples may be referred to as context based user interface mode selection as the mode selection is based on contextual information (e.g. position) collected automatically and then used through an automatic evaluation process to automatically select the pen's user interface(s) mode.

As with other examples presented herein, the microprocessor 1510 may monitor the contextual trend (e.g. the angle of the pen over time) in an effort to decide whether to stay in a mode or change modes. For example, through signatures, thresholds, trend analysis, and the like, the microprocessor may determine that a change is an unintentional change and therefore no user interface mode change is desired.

Figure 38B:
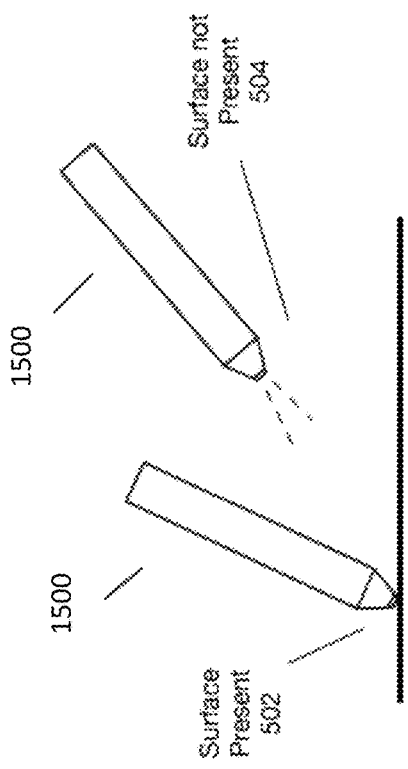

FIG. 38B illustrates an automatic user interface(s) mode selection based on contextual information. In this example, the pen 1500 is monitoring (e.g. through its microprocessor) whether or not the camera 1508 at the writing surface end is imaging a writing surface in close proximity to the writing surface end of the pen 1500. If the pen 1500 determines that a writing surface is within a predetermined relatively short distance, the pen 1500 may decide that a writing surface is present 502 and the pen may go into a writing mode user interface(s) mode. In the event that the pen 1500 does not detect a relatively close writing surface 504, the pen may predict that the pen is not currently being used to as a writing instrument and the pen may go into a non-writing user interface(s) mode.

Figure 38C:
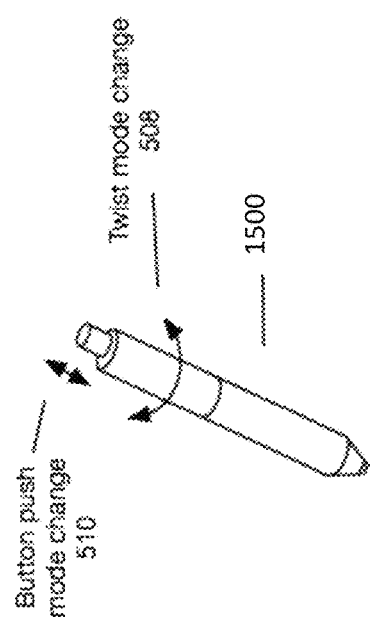

FIG. 38C illustrates a manual user interface(s) mode selection. The user interface(s) mode may be selected based on a twist of a section 508 of the pen 1500 housing, clicking an end button 510, pressing a quick launch button 1522, interacting with touch sensor 1520, detecting a predetermined action at the pressure monitoring system (e.g. a click), detecting a gesture (e.g. detected by the IMU), etc. The manual mode selection may involve selecting an item in a GUI associated with the pen 1500 (e.g. an image presented in the display of HWC 102).

In embodiments, a confirmation selection may be presented to the user in the event a mode is going to change. The presentation may be physical (e.g. a vibration in the pen 1500), through a GUI, through a light indicator, etc.

Figure 39:
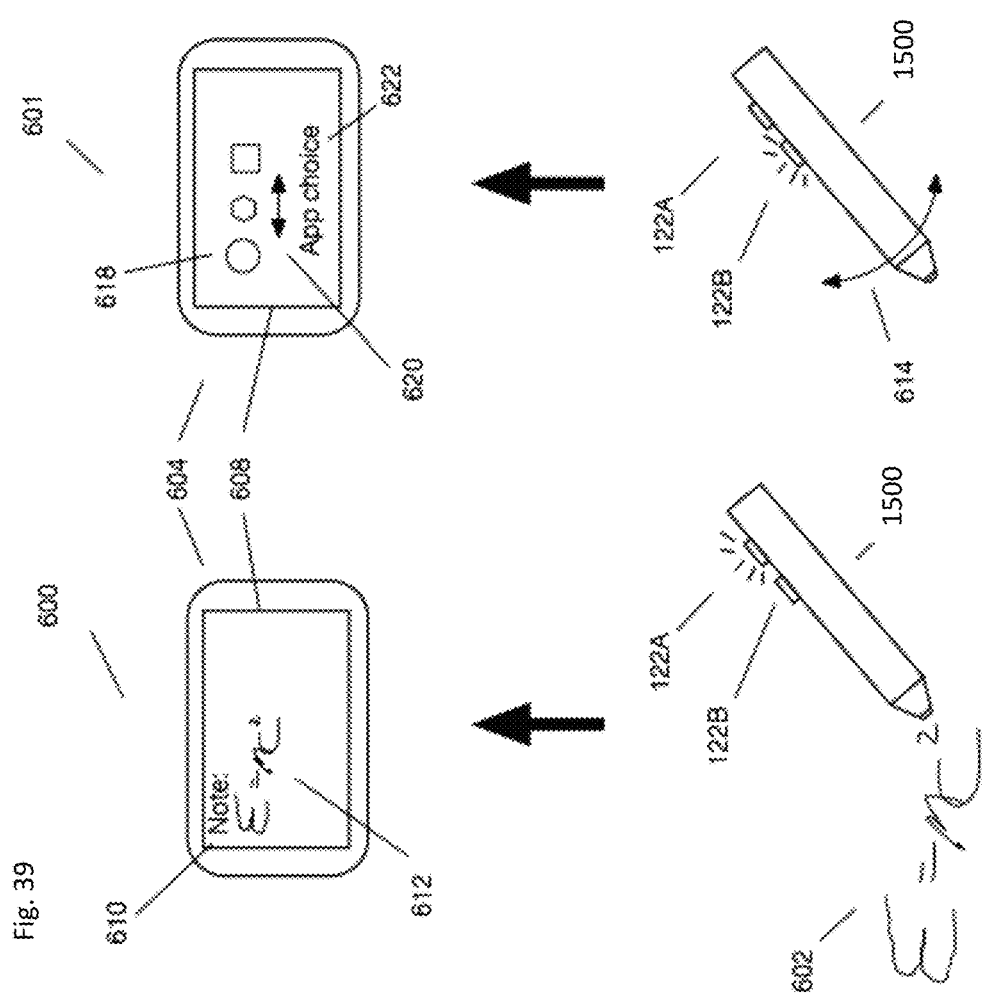
FIG. 39 illustrates interaction systems in accordance with the principles of the present disclosure.

FIG. 39 illustrates a couple pen use-scenarios 600 and 601. There are many use scenarios and we have presented a couple in connection with FIG. 39 as a way of illustrating use scenarios to further the understanding of the reader. As such, the use-scenarios should be considered illustrative and non-limiting.

Use scenario 600 is a writing scenario where the pen 1500 is used as a writing instrument. In this example, quick launch button 122A is pressed to launch a note application 610 in the GUI 608 of the HWC 102 display 604. Once the quick launch button 122A is pressed, the HWC 102 launches the note program 610 and puts the pen into a writing mode. The user uses the pen 1500 to scribe symbols 602 on a writing surface, the pen records the scribing and transmits the scribing to the HWC 102 where symbols representing the scribing are displayed 612 within the note application 610.

Use scenario 601 is a gesture scenario where the pen 1500 is used as a gesture capture and command device. In this example, the quick launch button 122B is activated and the pen 1500 activates a wand mode such that an application launched on the HWC 102 can be controlled. Here, the user sees an application chooser 618 in the display(s) of the HWC 102 where different software applications can be chosen by the user. The user gestures (e.g. swipes, spins, turns, etc.) with the pen to cause the application chooser 618 to move from application to application. Once the correct application is identified (e.g. highlighted) in the chooser 618, the user may gesture or click or otherwise interact with the pen 1500 such that the identified application is selected and launched. Once an application is launched, the wand mode may be used to scroll, rotate, change applications, select items, initiate processes, and the like, for example.

In an embodiment, the quick launch button 122A may be activated and the HWC 102 may launch an application chooser presenting to the user a set of applications. For example, the quick launch button may launch a chooser to show all communication programs (e.g. SMS, Twitter, Instagram, Facebook, email, etc.) available for selection such that the user can select the program the user wants and then go into a writing mode. By way of further example, the launcher may bring up selections for various other groups that are related or categorized as generally being selected at a given time (e.g. Microsoft Office products, communication products, productivity products, note products, organizational products, and the like)

Another aspect of the present disclosure relates to tracking pen movements with the assistance of a camera and displayed content in a HWC 102. In embodiments, content is presented in a see-through display of a head-worn computer to provide a virtual guide for the wearer who wants to make motions with a pen, finger, or other interface and have the motions interpreted for pattern recognition. As described in connection with pen embodiments disclosed herein elsewhere, an IMU or pen-tip camera may be used to monitor the motion of a pen in order to predict what patterns are being drawn. The IMU and/or pen tip camera may suffer from electronic or optical drift and the drift may cause inaccuracies in the pattern prediction. In embodiments, to augment the IMU and/or pen tip camera motion predictions the virtual guide is provided to compensate for the drift. The pen motions may be captured by a camera on-board the HWC 102 while the wearer is writing with the guidance of the virtual line. Knowing that the wearer is using the virtual line as a guide, the relative position between the pen tip and virtual line can be used to reduce or eliminate drift issues.

In embodiments, digital content is presented to a wearer of the HWC 102 and the wearer moves the pen 1500 along a writing surface guided by the digital content for pattern recordation, recognition and presentation assistance. In embodiments, a camera in the HWC 102 images and tracks the positions of the pen 1500 for pattern recordation and recognition assistance. In embodiments, both the digital content and the camera capturing the pen positions are used for pattern recordation and recognition assistance. In embodiments, the digital content, camera capture, in-pen camera capture, in-pen IMU, etc. may be used in combination for pattern recordation and recognition assistance. In embodiments, the relative positions of the pen strokes to the virtual line may be presented in the HWC 102 displays in relation to the virtual line. For example, the wearer of the HWC 102 may be scribing without ink in relation to the virtual line that he perceives and as presented in the HWC 102 display, the on-board HWC 102 camera may capture the scribing, a processor may interpret the imaged scribing in relation to the line such that the scribing can be converted into digital content to be displayed in the HWC 102 display in relation to the virtual line.

Figure 40:
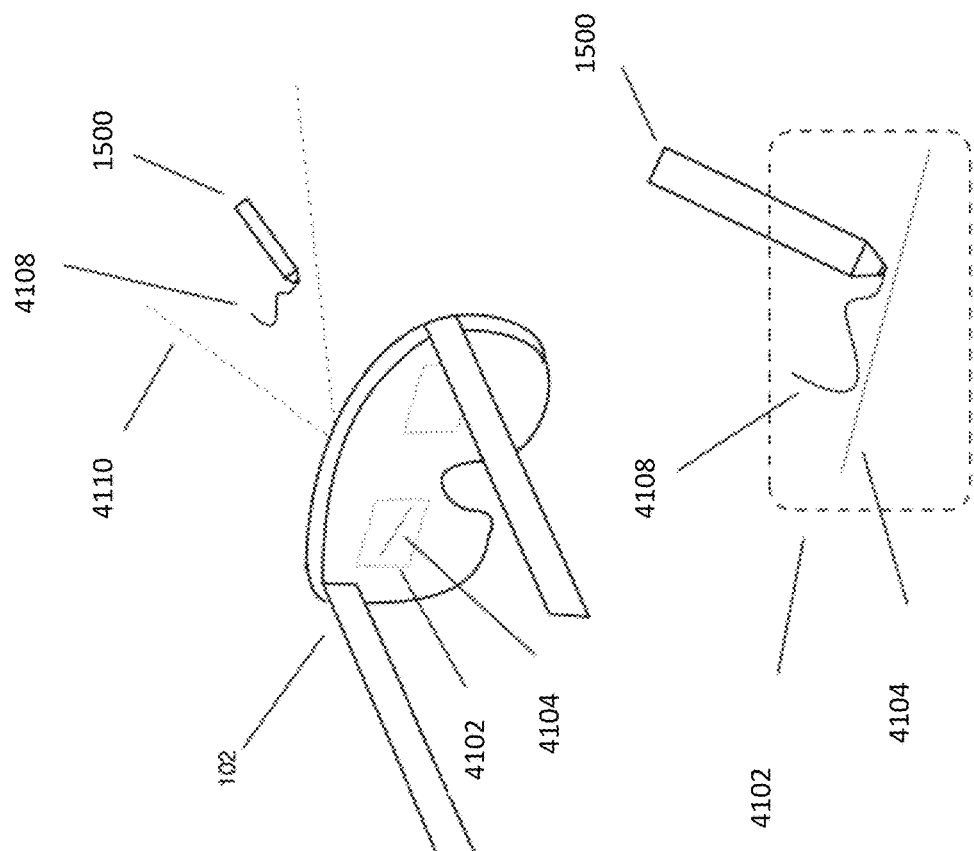
FIG. 40 illustrates a pattern recognition system and process in accordance with the principles of the present disclosure.

FIG. 40 illustrates a system where a camera in the HWC 102 is used to track pen 1500 motions and digital content is presented to the wearer of the HWC 102 to assist the wearer with writing within a structure. In this embodiment, digital content in the form of a line 4104 is presented in an FOV 4102 of the HWC 102. The wearer can see through the FOV 4102 so the line 4104 appears to augment the surrounding environment's view for the wearer. The line may be 'fixed' to a spot in the environment such that when the wearer turns his head and hence changes the position of the HWC 102, the line appears to stay in position with respect to the environment. In embodiments, the camera in the HWC 102 may image the environment and track the relative movement of the HWC 102 with respect to the environment such that the line 4104 can be positioned and moved within the FOV in accordance with the imaged movements to maintain visual alignment of the line with a point, object, marker, etc. in the environment. This configuration presents a virtual line in the environment that does not appear to move as the wearer's head moves. The virtual line can provide the wearer with guidance on where to make pen strokes. The line can be thought of as a line on a piece of paper so the wearer can write, or make strokes in a writing pattern, along the virtual line to make prediction of the lines pattern more accurate and overcome drift errors that may otherwise be apparent when attempting to record the movements and predict the patterns.

With the virtual line presented and virtually connected to a position in the environment, the wearer can use the line for guidance when making writing patterns. The HWC 102 camera can also be used to track the movements of the pen 1500 relative to the position of the virtual line. This may be used to better predict the patterns indicated by the wearer's pen strokes. As described herein elsewhere, the pen 1500 may track its motions through a pen tip camera and IMU. In embodiments, the pen tip camera and IMU may track the pen's motion and the camera may be used to track the motion of the pen relative to the virtual line. Each of these inputs may be used to track, record and predict what it being written.

In embodiments, the camera in the HWC 102 captures images of the wearer's pen's motion while the wearer is using the pen to make patterns with the virtual line as a guide. The virtual line may then be overlaid on the captured images of the motion to assist with the pattern analysis. In embodiments, once the overlay is made, one can see or analyze how the pen pattern moved with respect to the position of the virtual line as the wearer may be viewed the virtual line. The pattern analysis may involve interpreting the IMU motion detection, in-pen motion detection, and/or the pen's motion as captured through the HWC 102 camera relative to the virtual line. For example, if the IMU indicates that the pen shifted away from the wearer but the position of the pen relative to the virtual line indicates the pen was not moving, the portion of IMU data that indicated the shift may be discounted in the prediction analysis. The virtual line pattern analysis may be done in real-time, after the fact, etc. The pattern recognition may be done on a processor on-board the HWC 102, remote from the HWC 102, or partially on-board and remotely.

In embodiments, the virtual line may take any number of forms. For example, the virtual line may be a line, part of a virtual note, part of a virtual message template, etc. The line may also change positions and shapes depending on the wearer's needs. For example, the wearer may want to trace a pattern that is being displayed as digital content and the digital content may be presented as a consolidated image, part of an image, image in a line-by-line presentation format, etc. In embodiments, this system may be used for lessons on writing, painting, drawing, etc.

An aspect of the present disclosure relates to a user interface with a quick launch interface adapted to quickly launch an application, portion of an application, function, display control command, head-worn computer function, etc. In embodiments, an external user interface for a head-worn device is provided (e.g. as described herein elsewhere) and the external user interface includes a button, switch, touch pad, etc. that when actuated (e.g. the button pressed), an action is initiated on the head-worn computer (e.g. launching or activating a software application or clearing the see-through display). In embodiments, the external user interface may be in a form of a pen, pen attachment, watch, watch attachment, application specific device (e.g. steering wheel attachment), programmable device, mouse, wireless finger mounted mouse, phone, music player, etc. (some of which are described herein elsewhere).

As a further example of an external user interface that includes a quick launch activation system, a finger mounted wireless controller (also generally referred to as a wireless finger mouse, wireless air mouse or WAM) may be provided. The WAM may include a gyro and/or inertial movement detection system (e.g. an IMU) and such system may communicate signals or commands to the head-worn computer based on its movements. This system may be used to interpret gestures, continuously control the movement of a mouse element on the see-through display, control a view of content being displayed on the see-through display, etc. The WAM may also be mechanically adapted to be mounted on a person's finger (e.g. the index finger) such that its buttons and other physical interfaces can be controlled with the person's thumb. The quick launch physical interface (e.g. button) may be positioned on the WAM such that the thumb can actuate it. Once actuated, the program, action, function, etc. associated with the interface may be initiated.

The quick launch system and associated head-worn computer may be configured such that quick launch commands are not acted upon or modified before being executed based on a situation aware system, head-worn computer setting, external user interface setting, etc. For example, the head-worn computer may include sensors that collect information that may be interpreted to determine an activity (e.g. a forward speed may be calculated and, in a case where the speed is over 10 mph, it may be determined that the person is driving in a car), and the commands may be ignored or modified based on the activity. In the event that the situation demands a clear view of the surroundings (e.g. driving a car), a quick launch command that would otherwise cause content to be presented in the see-through display may be ignored or the content displayed may be modified to maintain a high degree of see through. In certain situations, this can prevent an obscured view by an inadvertent activation of the quick launch command. In a similar fashion, a quick launch button's commands may be altered or otherwise interpreted to cause a predetermined action based on the situation or setting. For example, irrespective of the command associated with the quick launch interface, activation of the interface may cause the clearing of content from the see-through interface when the situation appears to demand a clear view of the surrounding. As described elsewhere herein, the quick launch interface may be programmed to cause the see-through display to clear or substantially clear (e.g. only displaying content towards an edge of the display such that it is 'out of the way' of the surrounding view).

In embodiments, the quick launch system may be adapted to launch an application, function, display control command, etc. when the actuator is interacted with in a particular way and then send a different command when the interaction is terminated. For example, the system may be adapted to cause content to be displayed in the see-through display only when a button is held. When the button is released, the content may be removed. This system allows the user to only display content when he has activated the interface and he can quickly remove the content, by releasing, when he is done with the content or wants a clear view of the surroundings. In embodiments, the system may be programmed in reverse (i.e. content is removed with the button is held). The quick launch system may be programmable and/or pre-programmed to set which actuation system on the external device is used and what the pattern of interaction that causes the action is. In embodiment, an actuator may be programmed to cause the launch command after the actuator is held for a period of time, actuated multiple times (e.g. double click), or other interaction pattern.

In embodiments, the quick launch system may have a 'hold' function where a predetermined interaction causes the launch and then a second predetermined action causes a cancellation of the launch or modification of the launch. For example, a double click of the actuator may cause the display of content in the see-through display and a second double click or a single click may cause the removal of the content from the see-through display.

Another aspect of the present disclosure relates to a finger mounted external user interface (i.e. a type of external user interface 104) with a sensor positioned and adapted to sense the presence of a user's finger. The sensor can provide feedback to an on-board processor of the finger mounted external user interface and the processor can adjust the interface's functionality based on the presence or non-presence of the finger. In embodiments, the sensor facilitated system can act like a 'dead man switch' where the interface stops controlling a related device (e.g. HWC) when no finger is detected. This can prevent unintentional operation. For example, if a user of a HWC 102 has connected a finger interface to the HWC 102 such that the finger interface controls aspects of the HWC 102 and the user dismounts the interface and puts it down (e.g. on a table or seat) it won't inadvertently control the HWC 102 because no finger will be detected. In embodiments, such a finger control interface may also have a security system such that only authorized users can properly use the interface to control a related device. For example, the finger controller may have a touch pad and the touch pad may be adapted to image or otherwise read a fingerprint for authorization. In embodiments, the user may have a predetermined period to mount the device after proper authorization. For example, the user may have his finger print authorized and then have ten seconds to mount the device such that the finger sensor senses the presence of a finger.

A finger mounted user interface device according to the principles of the present disclosure may have a housing adapted to be mounted on a finger of a user; a finger touch sensor positioned to touch the finger of the user, when the finger mounted user interface is worn by the user; and the finger touch sensor may be in communication with a processor in the finger mounted user interface, wherein the processor may regulate a function of the finger mounted user interface based on the finger touch sensor's indication of a presence or non-presence of the finger of the user.

The processor may be further adapted to communicate control commands to a head-worn computer. The housing may include a strap to further secure the housing to the finger of the user. The processor may be further adapted to control a head-worn computer when the finger touch sensor's indication is that a finger is present. The processor may be further adapted to stop controlling a head-worn computer when the finger touch sensor's indication is that a finger is not present. The finger touch sensor may be a capacitively activated sensor, mechanically activated sensor, proximity sensor, etc. The function regulated by the processor may control a function based on inertial measurements indicative of movements of the device. The function regulated by the processor may control a function based on movements of the device.

Figure 41:
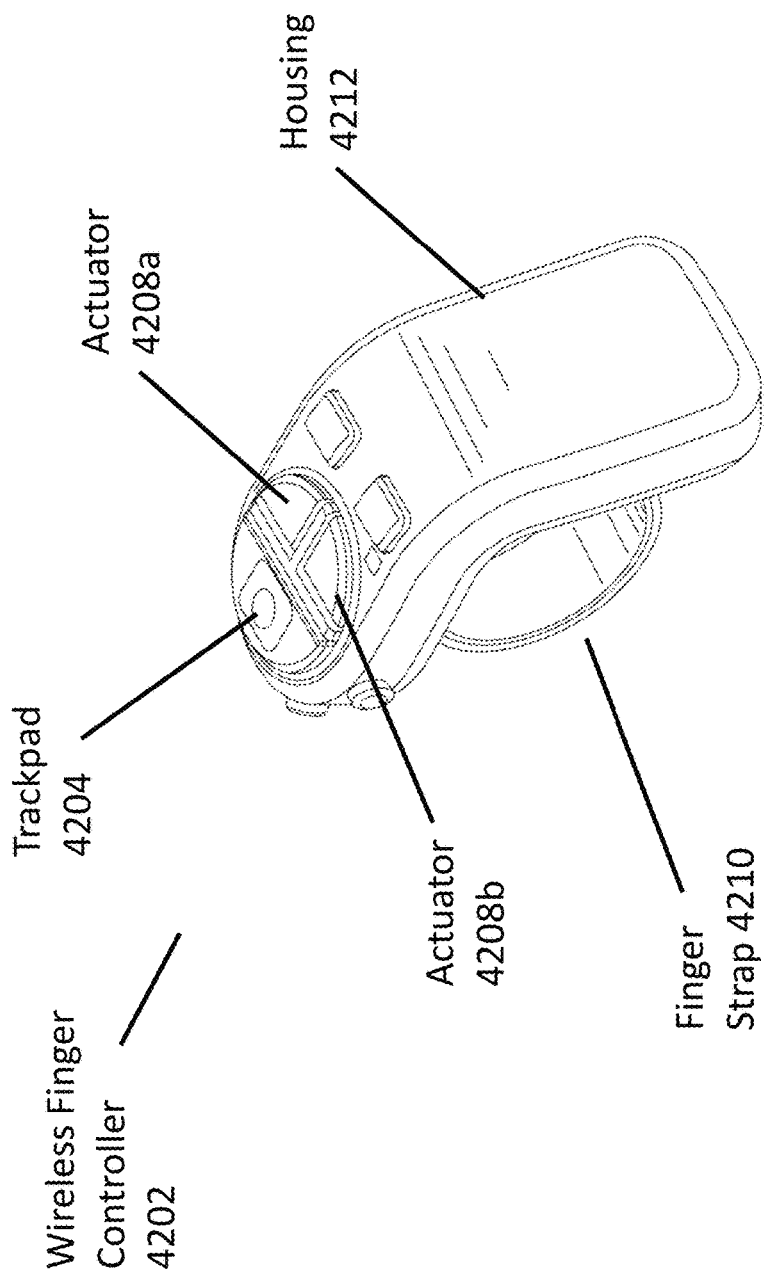
FIG. 41 illustrates a wireless finger mountable controller in according to the principles of the present disclosure.

FIG. 41 illustrates a wireless finger mounted controller 4202 in accordance with the principles of the present disclosure. The controller 4202 has a housing 4212 mechanically adapted to sit on top of a finger (e.g. the index finger). The housing includes a strap 4210 that can be slipped over the finger to secure the housing 4212 on the finger. With the controller 4202 mounted on the user's finger, the user may use his thumb, or other digit, to interact with the various components on the controller (e.g. track pad 4204, actuators 4208*a* and 4208*b* or actuators on the front of the device). The user may also interact with the controller 4202 and hence generate control signals for a related device (e.g. HWC 102) by moving the controller in 2D or 3D space. Gyros, inertial measurement units (IMUs), etc. in the controller 4202 may detect user movements to generate the control signals.

Figure 42:
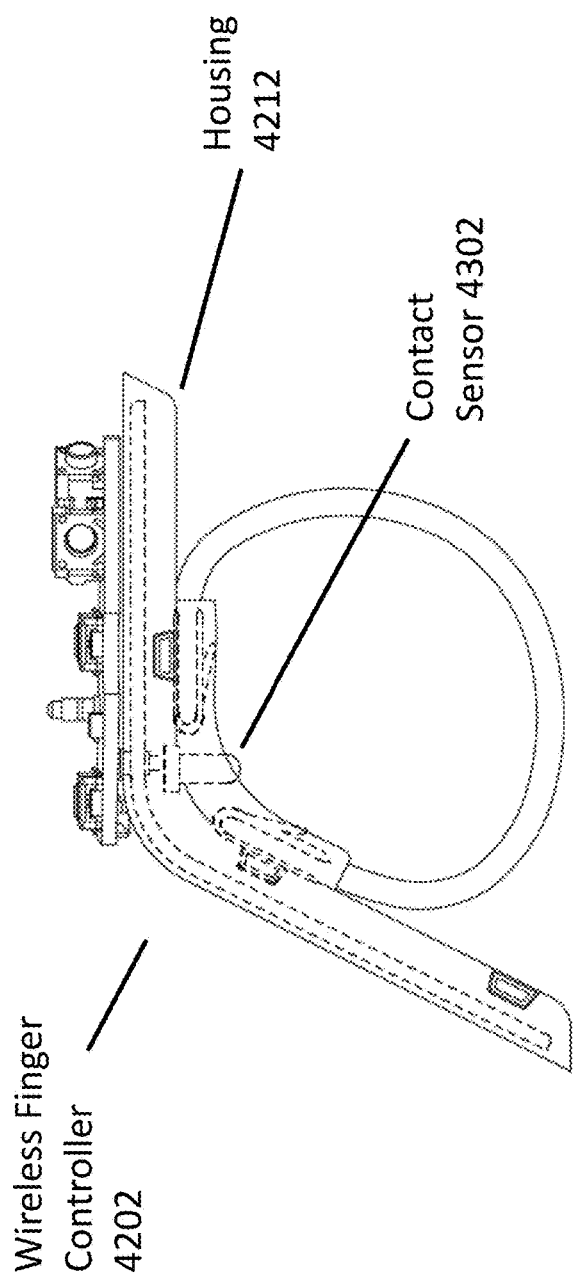
FIG. 42 illustrates a wireless finger mountable controller with a finger contact sensor in according to the principles of the present disclosure.

FIG. 42 illustrates a side view of the controller 4202 with internal portions in dashed lines. The top of the housing 4212 is also removed in this view to expose the circuit board on top and some of the internal components. As illustrated, a contact sensor 4302 may extend through the housing 4212 into the region where the user's finger fits. The contact sensor 4302 may be a capacitive touch sensor, mechanical touch sensor, etc. The contact sensor may be adapted to sense the presence or non-presence of the user's finger. A processor in the controller 4202 may be connected to the contact sensor 4304 such that the processor can alter functionality of the controller 4202 based on the presence or non-presence of the user's finger. For example, the controller may be shut off or its controlling functions may be turned off if no finger is detected.

Figure 43:
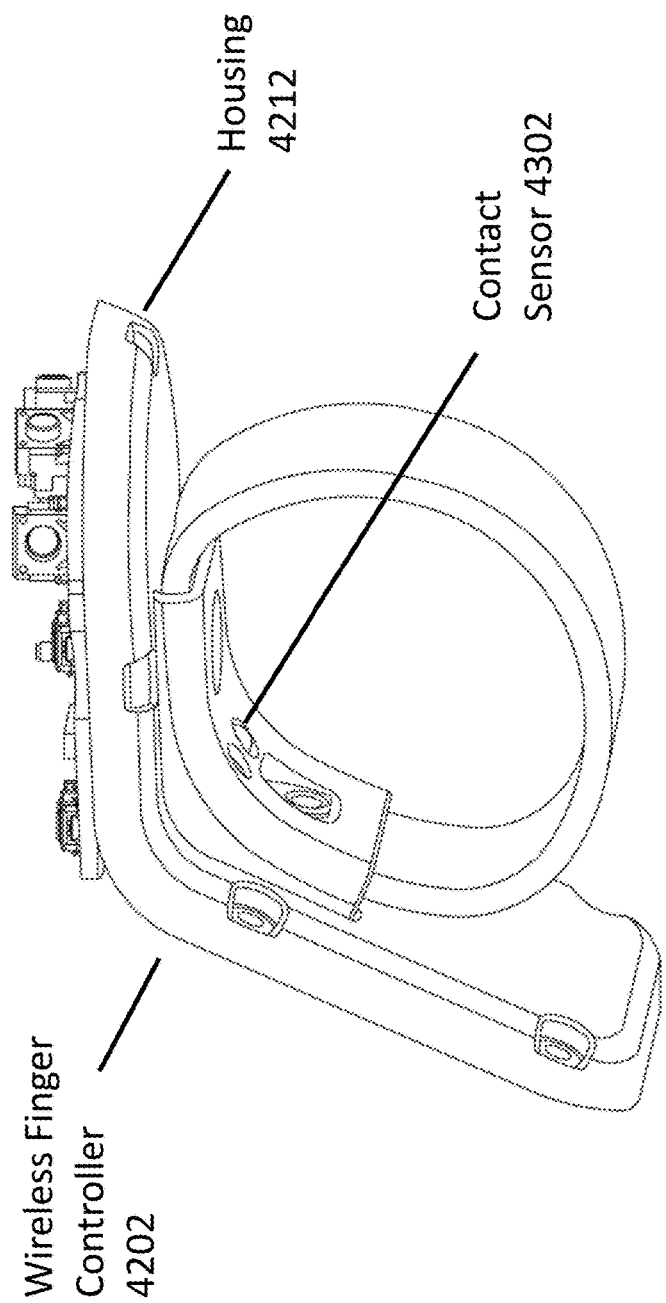
FIG. 43 illustrates a wireless finger mountable controller with a finger contact sensor in according to the principles of the present disclosure.

FIG. 43 illustrates another view of the finger controller 4202 showing the contact sensor 4302 extending through the housing 4212. In embodiments, a proximity sensor may be positioned inside of the housing such that the sensor does not extend through the housing while still sensing a finger within its proximity.

Another aspect of the present disclosure relates to intuitive control systems for head-worn computing. As described herein, a finger mounted controller can provide intuitive control for the user of a head-worn computer. A finger mounted controller may include interactive control elements (e.g. buttons, touch pads, track pads, etc.) to facilitate input of user instructions. The finger mounted controller may also have motion and position sensors (e.g. gyros, inertial measurement units (IMU), etc.) to provide the user with another form of control, which could be based on one, two or three dimensional motion sensing control instructions. For example, when moving through a 3D space in a head-worn computer display it may be easiest for the user to move his hand or finger, even with slight movements, which can cause the orientation within the space to change. The inventors have appreciated that, in certain situations, the movement based control system may interfere with a button or other touch based control system. For example, when a user touches a touched based control element (e.g. a button) the force or motion of touching the button may cause the motion based control system to sense a movement and generate an unintentional control command. This can cause, for example, a cursor to move downward, based on a sensed movement, while the user is attempting to select an element in content in the display of the HWC, which can cause the user to not click on the element. This can cause frustration for the user. In embodiments, a touch sensor is positioned to detect the user's attempted interaction with the touch based control element and then a processor in the finger mounted control device can turn off or ignore control commands initiated by any movement based control system. So, continuing with the example above, the movement based control system would be removed from consideration when the user interacts with a touch based control element on the housing of the finger mounted controller and the user would be able to properly interact with the element presented in the HWC display.

In embodiments, a finger mounted user interface device may include a housing adapted to be mounted on a finger of a user; one or more user interactive control elements mounted within the housing and accessible by the user when the device is worn by the user; a touch sensor positioned to sense the presence of a thumb or finger of the user in proximity of the user interactive control element, wherein the proximity is indicative that the user is interacting with the interactive control element; and a processor adapted to alter a control schema of the finger mounted user interface device based on the proximity of the thumb or finger. The user interactive control element may be a button, track pad, etc. The touch sensor may be a capacitive touch sensor, mechanical touch sensor, proximity sensor, etc. In embodiments, a capacitive touch sensor forms at least a portion of a ring around the interactive control element. The processor may alter the control schema by not responding to data indicative of the housing moving. The movements of the housing may be measured by an IMU, gyros, etc.

Figure 44:
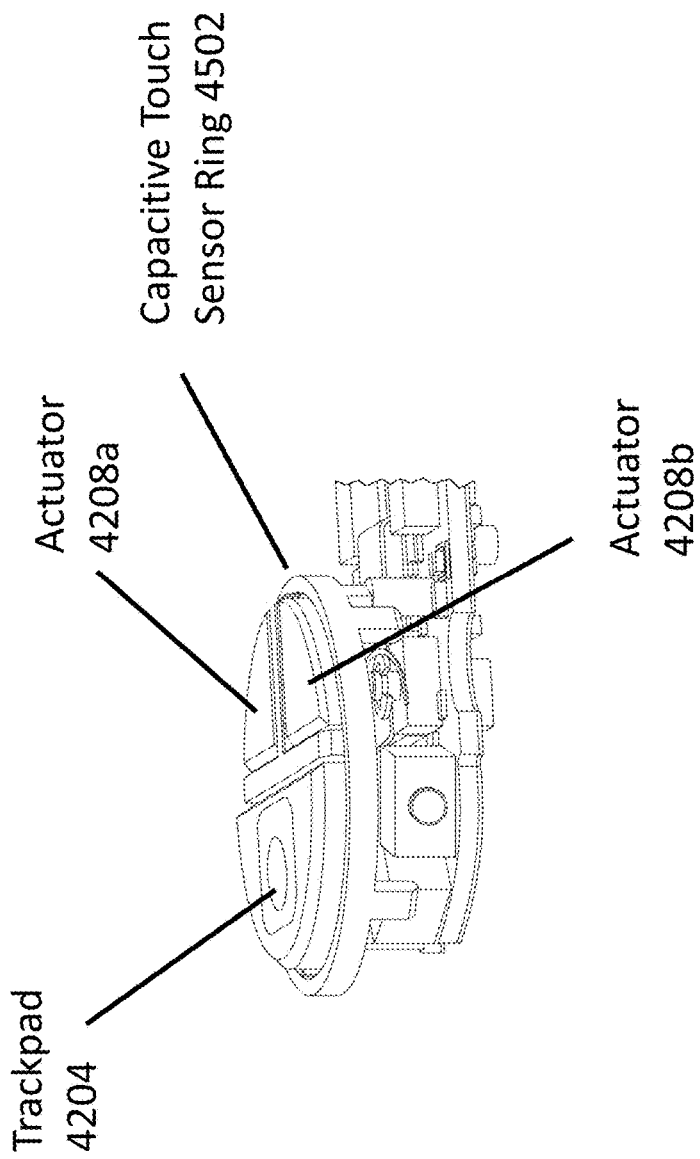
FIG. 44 illustrates certain components of a wireless finger mountable controller with a finger contact sensor in according to the principles of the present disclosure.

FIG. 44 illustrates certain components of the wireless finger controller 4202. Trackpad 4204 and actuators 4208a and 4208b are interactive control elements mounted within the housing 4212 and positioned to be interacted with by the user. In embodiments, the housing 4212 is mounted on the index finger of the user and the user uses his thumb to interact with the buttons, actuators, touch pad, track pad, and other interactive control elements. As illustrates, this system also includes a capacitive touch sensor ring 4502. The capacitive touch sensor is positioned to detect the user's thumb (or finger if a finger is used to interact with the control elements instead of the thumb) in proximity to the interactive control elements as a prediction that the user is going to or is interacting touching the control elements. The touching of the capacitive touch sensor 4502 can alert the processor to ignore motion based control system when the capacitive touch sensor is indicating the user is interacting with or going to interact with the control elements to improve the user's control experience.

Another aspect of the present disclosure relates to a multi-sided hand-held control device for control of a head-worn computer. The multi-sided controller may include a detection system to detect which of the multiple sides is in a proper position to accept desired user interactions. For example, the controller may have a keyboard on one side and a game controller on the second side. When the game controller side is up, the game control system may then be activated and the keyboard side may be deactivated under the schema where it is the upward facing control that is the one the user is intending to interact with. With this control schema, the user can interact with the game controls without inadvertently interacting with the keys of the keyboard. Another aspect of the multi-sided controller relates to detection of its motion and using its motion as an additional control input. For example, with the keyboard in the up position and activated as a user interaction, a motion detection system (e.g. IMU) may monitor the motion of the controller and use the motion to control an aspect of a computer program. The motion input may be used to control a cursor, 3D aspect of an interface, game, etc. With the keyboard activated, the user may then be able to input characters through the keyboard and move the cursor in a graphical user interface in a see-through head-worn computer display. This intuitive interaction with the head-worn computer can create a very desirable system for a user of the head-worn computer. Such a system can become second nature for a user because of the physical keys, motion control, and inadvertent control interaction restrictions in the same hand-held device.

Figure 45:
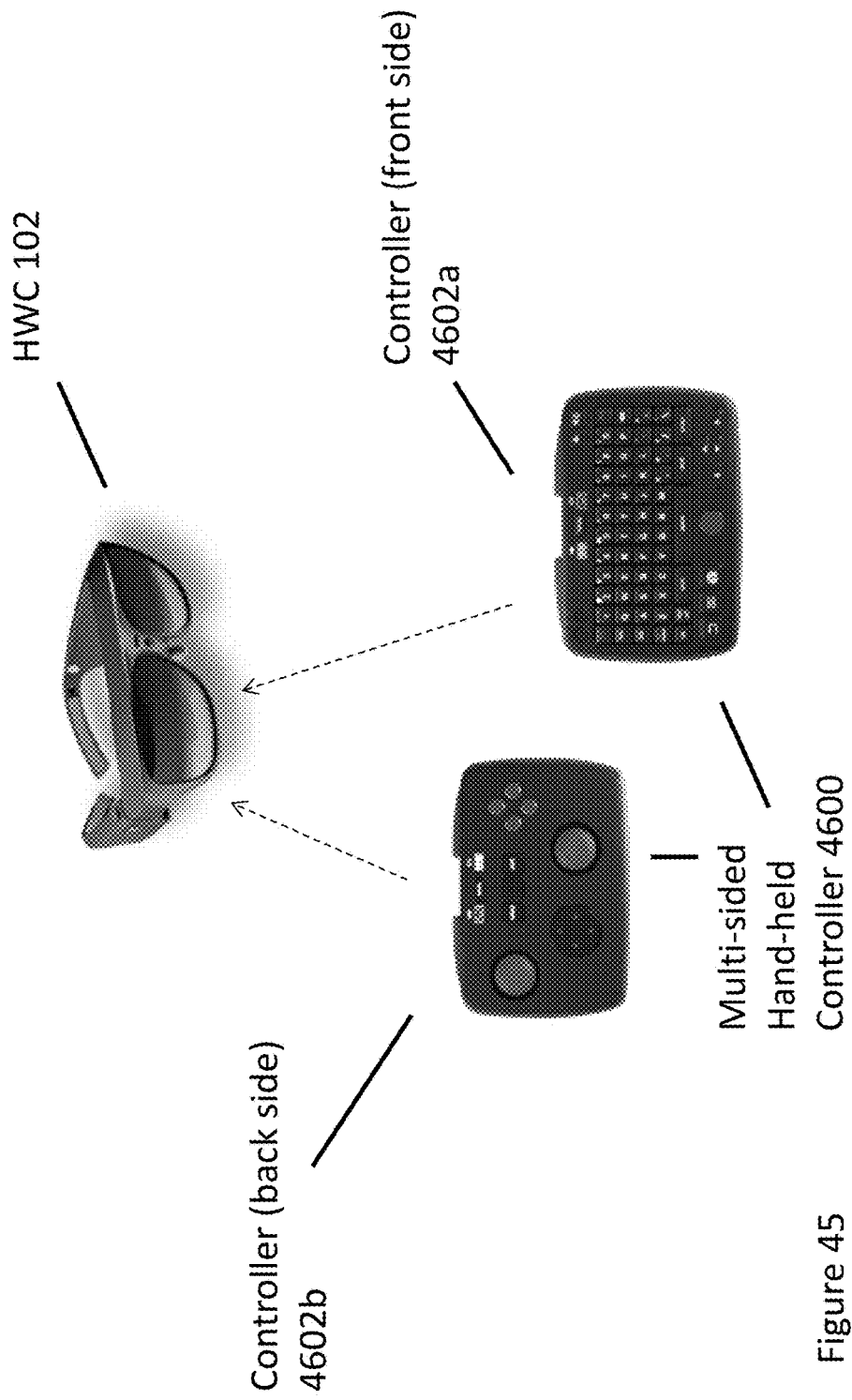
FIG. 45 illustrates a multi-sided hand-held control device according to the principles of the present disclosure.

FIG. 45 illustrates two different sides of a multi-sided hand-held head-worn computer controller 4600. As can be seen, the hand-held controller 1600 has a different control interface on the front side 4602a and the backside 4602b. In this example, the front side 4602a includes a keyboard and other commonly used interfaces that might be used when inputting text into an application. And the second side 4602b includes a gaming interface with joystick type input and other commonly used interfaces that might be used when playing a game. The controller 4600 is adapted to communicate user interactions with the HWC 102. In embodiments, the first and second sides have other user control interfaces, such as touch surfaces, touch pads, finger print detection systems, pre-programmed buttons, etc. and each type of control interface may be configured on either the first or second side and the control schema may be defined for the particular desires of a user.

The controller 4600 may include a positional detection system (e.g. IMU) to detect which side of the multi-sided controller is in an appropriate position for user interaction. For example, controller 4600 may be mechanically configured such that it is the topside position that is the intended interaction position, so the positional detection system may detect which side is on top. Once the topside is detected a control system may activate the topside interface such that it is ready to receive user interaction and communicate control signals. The control system may further deactivate the bottom side control surface to avoid inadvertent interactions with the bottom control surface.

In embodiments, the positional detection system and the control system may be adapted to identify which of the sides of the controller is apparently desired for the user's interactions and then activate that side of the control system's interface ("the active control side"). In embodiments, the control system may also deactivate all or part of the control interfaces on the other side(s) ("the non-active control side"). For example, as stated above, the second side's control interface may be deactivated. However, in embodiments, only portions of the second side's control interface may be deactivated. For example, the second side may have a number of buttons, joystick type controllers, touch interface surfaces, dials, etc. and when the first side is fully activated only some of the second side's interfaces may be activated (e.g. the touch interface surface or the joystick type controller). This can enable the user to, for example, type on a keyboard on the top while also being able to use a touch pad on the back or a joystick on the back while not having an issue with inadvertently touching other interfaces (e.g. certain buttons) on the back.

In embodiments, the controller may detect motion (e.g. with an IMU) of the controller itself and use the motion for control of the head-worn computer. The motion control may provide cursor control for the wearer of the head-worn computer, 3D motion control of an application or game running on the head-worn computer, gesture input for the head-worn computer, etc. For example, to provide a highly intuitive control system for a head-worn computer, the user may be able to type on the keyboard that is in the top side position, while some or all second side controls are deactivated, and then move the controller in 3D space to control the position of a cursor in the see-through display of the head-worn computer. Similarly, the user may be able to use the physical interface controls like a joystick on the game controller side of the controller, while not worrying about inadvertently interacting with the backside controls, and also move the controller in 3D space to control an aspect of a game operating on the head-worn computer. In embodiments, the user may use the controller as a gesture input device where certain motions are programmed to cause certain actions in a game or other application operating on the head-worn computer. For example, the user may flip the controller to the side to clear the see-through display, change applications, cause a call to be answered, launch a particular application, cause a transaction to be completed (e.g. bill pay), file to be transferred, person to be identified, etc.

In embodiments, a fingerprint identification system may be included in the hand-held controller and fingerprint personal identification may be used to securely access the controller and/or the head-worn computer. In embodiments, the fingerprint identification may be used in conjunction with eye image personal identification.

While many of the embodiments herein describe see-through computer displays, the scope of the disclosure is not limited to see-through computer displays. In embodiments, the head-worn computer may have a display that is not see-through. For example, the head-worn computer may have a sensor system (e.g. camera, ultrasonic system, radar, etc.) that images the environment proximate the head-worn computer and then presents the images to the user such that the user can understand the local environment through the images as opposed to seeing the environment directly. In embodiments, the local environment images may be augmented with additional information and content such that an augmented image of the environment is presented to the user. In general, in this disclosure, such see-through and non-see through systems may be referred to as head-worn augmented reality systems, augmented reality displays, augmented reality computer displays, etc. In embodiments, the frame tap interface may be associated with a haptic feedback system (e.g. as described herein elsewhere) such that the frame tap is coordinated with haptic feedback for the user. In embodiments, the rotary or other style interface may also be associated with a haptic feedback system.

Although embodiments of HWC have been described in language specific to features, systems, computer processes and/or methods, the appended claims are not necessarily limited to the specific features, systems, computer processes and/or methods described. Rather, the specific features, systems, computer processes and/or and methods are disclosed as non-limited example implementations of HWC. All documents referenced herein are hereby incorporated by reference.

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, all the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, all the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable transitory and/or non-transitory media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, stand-alone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable transitory and/or non-transitory media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

The invention claimed is:

1. A head-worn computer, comprising:
a camera system positioned to capture a surrounding environment in front of a user wearing the head-worn computer;
a processor adapted to identify a position of a plurality of light emitters mounted on a hand-held controller from images captured by the camera system;
the processor further adapted to track the position of the plurality of light emitters as the hand-held controller moves in the surrounding environment and interpret the tracked position as positional changes of the hand-held controller;
the processor further adapted to use the position of the plurality of light emitters as markers in three dimensional space, the markers used as an anchor for virtual content presented in a see-through display of the head-worn computer; and
wherein the camera system comprises a fisheye lens to increase a sensitivity of the processor by causing real-world movements of the plurality of light emitters to be exaggerated so small real-world movements become larger movements in the captured images.

2. The head-worn computer of claim 1, wherein the camera system comprises two or more cameras mounted separately on the head-worn computer such that each camera views the plurality of light emitters from a different perspective such that a 3D model is used to map the position of the hand-held controller.

3. The head-worn computer of claim 1, wherein the plurality of light emitters are mounted in a pre-determined pattern on the hand-held controller such that the camera system predicts a position of the hand-held controller based on a perspective view of the plurality of light emitters in the pre-determined pattern.

4. The head-worn computer of claim 1, further comprising, an inertial measurement unit (IMU), wherein the position of the hand-held controller is based on the position of the plurality of light emitters as markers and output from the IMU.

5. A head-worn computer, comprising:
- a camera system positioned to capture a surrounding environment in front of a user wearing the head-worn computer;
- a processor adapted to identify a position of a plurality of light emitters mounted on a hand-held controller in images captured by the camera system;
- the processor further adapted to track the position of the plurality of light emitters as the hand-held controller moves in the surrounding environment and interpret the track as positional changes of the hand-held controller;
- the processor further adapted to use the position of the plurality of light emitters as a prediction of the position of the hand-held controller in three dimensional space, the predicted position used as a control input for a software application operating on the head-worn computer; and
- wherein the camera system comprises a fisheye lens to increase a sensitivity of the processor by causing real-world movements of the plurality of light emitters to be exaggerated so small real-world movements become larger movements in the captured images.

* * * * *